(12) United States Patent
Xiong et al.

(10) Patent No.: US 10,904,133 B2
(45) Date of Patent: Jan. 26, 2021

(54) DATA PACKET SENDING METHOD, MOBILE ROUTER, AND NETWORK DEVICE

(71) Applicant: Huawei Technologies Co., Ltd., Shenzhen (CN)

(72) Inventors: Chunshan Xiong, Shenzhen (CN); Jianning Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 16/203,300

(22) Filed: Nov. 28, 2018

(65) Prior Publication Data

US 2019/0097916 A1 Mar. 28, 2019

Related U.S. Application Data

(63) Continuation of application No. 15/217,680, filed on Jul. 22, 2016, now Pat. No. 10,193,792, which is a continuation of application No. PCT/CN2014/071332, filed on Jan. 24, 2014.

(51) Int. Cl.
| | |
|---|---|
| *H04L 12/28* | (2006.01) |
| *H04L 12/721* | (2013.01) |
| *H04L 12/64* | (2006.01) |
| *H04L 12/707* | (2013.01) |
| *H04L 12/741* | (2013.01) |

(52) U.S. Cl.
CPC .......... *H04L 45/14* (2013.01); *H04L 12/6418* (2013.01); *H04L 45/24* (2013.01); *H04L 45/74* (2013.01)

(58) Field of Classification Search
CPC .......... H04L 29/0653; H04L 29/06095; H04L 49/3009; H04L 49/309; H04L 45/74
See application file for complete search history.

(56) References Cited

U.S. PATENT DOCUMENTS

| | | | |
|---|---|---|---|
| 6,765,892 B1 | 7/2004 | Leung et al. | |
| 7,751,405 B1 * | 7/2010 | Kompella | ............... H04L 45/50 370/395.2 |
| 8,432,924 B2 | 4/2013 | Wu et al. | |
| 8,780,800 B2 | 7/2014 | Bachmann et al. | |

(Continued)

FOREIGN PATENT DOCUMENTS

| | | |
|---|---|---|
| CN | 1681261 A | 10/2005 |
| CN | 1881935 A | 12/2006 |

(Continued)

*Primary Examiner* — Siren Wei
(74) *Attorney, Agent, or Firm* — Slater Matsil, LLP

(57) ABSTRACT

A data packet sending method including obtaining a first data packet from a first home address and sent by a mobile node, determining, according to routing control policy information, whether to enable routing control for the first data packet, backing up the first data packet, in response to determining to enable routing control for the first data packet, sending a backup first data packet to a designated routing node according to the home address status information in the routing control policy information, and sending the first data packet to a destination node via a current mobile router of the destination node through a tunnel with the current mobile router of the destination node.

20 Claims, 17 Drawing Sheets

(56) References Cited

U.S. PATENT DOCUMENTS

| | | | |
|---|---|---|---|
| 2004/0022261 A1* | 2/2004 | Ishwar | H04L 12/54 |
| | | | 370/428 |
| 2004/0090941 A1 | 5/2004 | Faccin et al. | |
| 2005/0226144 A1 | 10/2005 | Okita | |
| 2005/0289244 A1 | 12/2005 | Sahu et al. | |
| 2006/0018291 A1* | 1/2006 | Patel | H04L 63/0407 |
| | | | 370/335 |
| 2006/0291422 A1 | 12/2006 | Rochford | |
| 2010/0027474 A1 | 2/2010 | Hirano et al. | |
| 2010/0174828 A1* | 7/2010 | Jeong | H04W 8/082 |
| | | | 709/238 |
| 2011/0122815 A1* | 5/2011 | Velev | H04L 45/22 |
| | | | 370/328 |
| 2012/0188945 A1 | 7/2012 | Cui | |
| 2013/0070776 A1 | 3/2013 | Sato | |
| 2015/0110070 A1* | 4/2015 | Liu | H04W 60/00 |
| | | | 370/331 |

FOREIGN PATENT DOCUMENTS

| | | |
|---|---|---|
| CN | 101247314 A | 8/2008 |
| CN | 101478750 A | 7/2009 |
| CN | 102035691 A | 4/2011 |
| CN | 102546406 A | 7/2012 |
| CN | 103108370 A | 5/2013 |
| EP | 2117178 A1 | 11/2009 |
| EP | 2203005 A1 | 6/2010 |
| JP | 2005303501 A | 10/2005 |
| WO | 2008114496 A1 | 9/2008 |
| WO | 2013082245 A1 | 6/2013 |
| WO | 2013178013 A1 | 12/2013 |

\* cited by examiner

DATA PACKET SENDING METHOD, MOBILE ROUTER, AND NETWORK DEVICE

CROSS-REFERENCE TO RELATED APPLICATIONS

This application is a continuation of U.S. patent application Ser. No. 15/217,680, filed on Jul. 22, 2016, which is a continuation of International Application No. PCT/CN2014/071332, filed on Jan. 24, 2014. All of the afore-mentioned patent applications are hereby incorporated by reference in their entireties.

TECHNICAL FIELD

The present invention relates to the field of communications technologies, and in particular, to a data packet sending method, a mobile router, and a network device.

BACKGROUND

DMM (distributed mobility management) emerges to resolve problems of conventional centralized mobility management such as a single point of failure and router redundancy.

Route optimization (RO) is a default feature of DMM, that is, a network supporting DMM performs route optimization automatically. FIG. 1 shows a scenario in which an MN (mobile node) and a destination node are mobile nodes. A home mobile router (indicated by 1 in FIG. 1) serving the MN allocates an HoA (home address) to the MN, and the MN is currently attached to a current mobile router (indicated by 2 in the figure) serving the MN. Likewise, 4 in FIG. 1 indicates a home mobile router serving the destination node, 3 in FIG. 1 indicates a current mobile router serving the destination node, and 5 in FIG. 1 indicates the MN, and 6 indicates the destination node. Because the MN is currently attached to the current mobile router serving the MN, the MN under the home mobile router serving the MN is marked with a dashed line. This also applies to the destination node.

When route optimization of DMM is not used, a data routing path between the MN and the destination node is shown by a dashed arrow in FIG. 1, where data coming from the MN is forwarded by the current mobile router serving the MN to the home mobile router serving the MN, then sent by the home mobile router serving the MN to the home mobile router serving the destination node, then forwarded by the home mobile router serving the destination node to the current mobile router serving the destination node, and finally forwarded to the destination node. As can be seen, the path is not optimized, a transmission delay is increased, and a single point of failure easily occurs.

After route optimization of DMM is used, through an optimized tunnel of DMM shown by a solid arrow in FIG. 1, data between the MN and the destination node may be directly sent by the current mobile router serving the MN to the current mobile router serving the destination node, and then forwarded to the destination node, where the optimized tunnel of DMM may be implemented by a protocol, such as GTP (General Data Transfer Platform), PMIP (Proxy Mobile IP), or GRE (Generic Routing Encapsulation).

In the network supporting DMM, route optimization is a default feature of DMM, and the network performs route optimization automatically. However, in some cases, it may be necessary to send data to a designated network node. In the prior art, without route optimization, data needs to pass through a relatively long and complicated path before arriving at an end point, or with route optimization, data is directly sent from a source node to a destination node, and cannot arrive at an intermediate network node. Evidently, in the prior art, an objective of sending data to a designated network node cannot be achieved.

SUMMARY

Embodiments provide a data packet sending method, a mobile router, and a network device for solving a technical problem in the prior art that data cannot be sent to a designated network node.

According to a first aspect of embodiments, a data packet sending method is provided, where the method includes obtaining a first data packet coming from a first home address and forwarded by a mobile node MN, and determining, according to routing control policy information, whether to enable routing control for the first data packet, where the routing control policy information includes indication information about whether routing control is enabled, and in a case in which the indication information indicates that routing control is enabled, the routing control policy information further includes home address status information. The method also includes, if a determining result is yes, sending the first data packet to a designated routing node through a tunnel with the designated routing node according to the home address status information in the routing policy information. Additionally, the method includes obtaining a first processed data packet returned by the designated routing node, and sending the first processed data packet to a current mobile router of a destination node, so that the current mobile router of the destination node sends the first processed data packet to the destination node, where the first processed data packet is obtained by the designated routing node by processing the first data packet.

With reference to the first aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the first possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the first aspect or any possible implementation manner of the first possible implementation manner to the third possible implementation manner, in a fourth possible implementation manner, the sending the first data packet to a designated routing node through a tunnel with the designated routing node includes detecting whether the tunnel with the designated routing node exists, and when detecting that the tunnel with the designated routing node exists, sending the first data packet to the designated routing node through the tunnel with the designated routing node, or when detecting that the tunnel with the designated routing node does not exist, establishing the tunnel with the designated routing node, and sending the first data packet to the designated routing node through the tunnel with the designated routing node.

With reference to the first aspect or any possible implementation manner of the first possible implementation manner to the fourth possible implementation manner, in a fifth possible implementation manner, the sending the first processed data packet to a current mobile router of a destination node through a tunnel with the current mobile router of the destination node includes determining whether the tunnel with the current mobile router of the destination node is established, and if the tunnel with the current mobile router of the destination node is established, sending the first processed data packet to the current mobile router of the destination node through the tunnel with the current mobile router of the destination node, or if the tunnel with the current mobile router of the destination node is not established, establishing the tunnel with the current mobile router of the destination node, and sending the first processed data packet to the current mobile router of the destination node through the tunnel with the current mobile router of the destination node.

With reference to the first aspect or any possible implementation manner of the first possible implementation manner to the fifth possible implementation manner, in a sixth possible implementation manner, before the obtaining a first data packet coming from a first home address and forwarded by a mobile node MN, the method further includes receiving a routing control request, where the routing control request includes the routing control policy information.

With reference to the sixth possible implementation manner, in a seventh possible implementation manner, after the receiving a routing control request, the method further includes if the indication information in the routing control policy information carried in the routing control request indicates that routing control is enabled, establishing the tunnel with the designated routing node according to the home address status information in the routing control policy information carried in the routing control request.

With reference to the sixth possible implementation manner, in an eighth possible implementation manner, after the receiving a routing control request, the method further includes if the indication information in the routing control policy information carried in the routing control request indicates that routing control is disabled, releasing the tunnel with the designated routing node.

With reference to any possible implementation manner of the sixth possible implementation manner to the eighth possible implementation manner, in a ninth possible implementation manner, after the receiving a routing control request, the method further includes forwarding the routing control request to a home location manager of the mobile node and a home mobile router of the mobile node, so that the home location manager of the mobile node and the home mobile router of the mobile node update locally stored information according to the information included in the routing control request.

According to a second aspect of embodiments, a data packet sending method is provided, where the method includes receiving, by a designated routing node, a first data packet coming from a mobile router of an MN, where the first data packet is sent by the mobile router of the MN through a tunnel with the designated routing node after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information. The method also includes obtaining, by the designated routing node, a first processed data packet by processing the first data packet and sending, by the designated routing node, the first processed data packet to the mobile router of the MN, so that the mobile router of the MN sends the first processed data packet to a current mobile router of a destination node.

With reference to the second aspect, in a first possible implementation manner, before the receiving, by a designated routing node, a first data packet coming from an MN, the method further includes receiving, by the designated routing node, the routing control policy information sent by the mobile router of the MN, where the routing control policy information includes the indication information indicating that routing control is enabled and the home address status information.

With reference to the second aspect, in a second possible implementation manner, before the receiving, by a designated routing node, a first data packet coming from a mobile router of an MN, the method further includes establishing, by the designated routing node, the tunnel with the mobile router of the MN according to an establishment request sent by the mobile router of the MN.

With reference to the second aspect, in a third possible implementation manner, the method further includes, after the MN moves from a source mobile router to a target mobile router, releasing, by the designated routing node, a tunnel with the source mobile router.

According to a third aspect of embodiments, a data packet sending method is provided, where the method includes obtaining a first data packet coming from a first home address and forwarded by an MN, and determining, according to routing control policy information, whether to enable routing control for the first data packet, where the routing control policy information includes indication information about whether routing control is enabled, and in a case in which the indication information indicates that routing control is enabled, the routing control policy information further includes home address status information, if a determining result is yes, backing up the first data packet, and sending a backup first data packet to the designated routing node according to the home address status information in the routing policy, and sending the first data packet to a current mobile router of a destination node through a tunnel with the current mobile router of the destination node, so that the current mobile router of the destination node sends the first data packet to the destination node.

With reference to the third aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the first possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the third aspect or any possible implementation manner of the first possible implementation manner to the third possible implementation manner, in a fourth possible implementation manner, the sending the first data packet to a current mobile router of a destination node through a tunnel with the current mobile router of the destination node includes determining whether the tunnel is established with the current mobile router of the destination node, and if the tunnel is established with the current mobile router of the destination node, sending the first data packet to the current mobile router of the destination node through the tunnel with the current mobile router of the destination node, or if the tunnel is not established with the current mobile router of the destination node, establishing the tunnel with the current mobile router of the destination node, and sending the first data packet to the current mobile router of the destination node through the tunnel with the current mobile router of the destination node.

With reference to the third aspect or any possible implementation manner of the first possible implementation manner to the fourth possible implementation manner, in a fifth possible implementation manner, before the obtaining a first data packet coming from a first home address and forwarded by an MN, the method further includes receiving a routing control request, where the routing control request includes the routing control policy information.

With reference to the fifth possible implementation manner, in a sixth possible implementation manner, after the receiving a routing control request, the method further includes forwarding the routing control request to a home location manager of the mobile node and a home mobile router of the mobile node, so that the home location manager of the mobile node and the home mobile router of the mobile node update locally stored information according to the information included in the routing control request.

According to a fourth aspect of embodiments, a data packet sending method is provided, where the method includes obtaining a first data packet coming from a first home address and forwarded by an MN, and determining, according to routing control policy information, whether to enable routing control for the first data packet, where the routing control policy information includes indication information about whether routing control is enabled, and in a case in which the indication information indicates that routing control is enabled, the routing control policy information further includes home address status information, and if a determining result is yes, sending the first data packet to the designated routing node through a tunnel with the designated routing node according to the home address status information in the routing policy, so that the designated routing node sends a first processed data packet to a current mobile router of a destination node through a tunnel with the current mobile router of the destination node and that the current mobile router of the destination node sends the first processed data packet to the destination node, where the first processed data packet is obtained by the designated routing node by processing the first data packet.

With reference to the fourth aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the second possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the fourth aspect or any possible implementation manner of the first possible implementation manner to the third possible implementation manner, in a fourth possible implementation manner, the sending the first data packet to a designated routing node through a tunnel with the designated routing node includes detecting whether the tunnel with the designated routing node exists, and when detecting that the tunnel with the designated routing node exists, sending the first data packet to the designated routing node through the tunnel with the designated routing node, or when detecting that the tunnel with the designated routing node does not exist, establishing the tunnel with the designated routing node, and sending the first data packet to the designated routing node through the tunnel with the designated routing node.

With reference to the fourth aspect or any possible implementation manner of the first possible implementation manner to the fourth possible implementation manner, in a fifth possible implementation manner, before the obtaining a first data packet coming from a first home address and forwarded by an MN, the method further includes receiving a routing control request, where the routing control request includes the routing control policy information.

With reference to the fifth possible implementation manner, in a sixth possible implementation manner, after the receiving a routing control request, the method further includes, if the indication information in the routing control policy information carried in the routing control request indicates that routing control is enabled, establishing the tunnel with the designated routing node according to the home address status information in the routing control policy information carried in the routing control request.

With reference to the sixth possible implementation manner, in a seventh possible implementation manner, after the establishing the tunnel with the designated routing node according to the home address status information in the routing control policy information carried in the routing control request, the method further includes sending a path switch instruction to the current mobile router of the destination node according to the indication information in the routing control policy information carried in the routing control request and an address of the current mobile router of the destination node, so that the current mobile router of the destination node establishes the tunnel between the current mobile router of the destination node and the designated routing node and that the current mobile router of the destination node releases a tunnel between the current mobile router of the destination node and a current mobile router of the mobile node.

With reference to any possible implementation manner of the fifth possible implementation manner to the seventh possible implementation manner, in an eighth possible implementation manner, after receiving a routing control request, the method further includes, if the indication information in the routing control policy information carried in the routing control request indicates that routing control is disabled, releasing the tunnel with the designated routing node.

With reference to any possible implementation manner of the fifth possible implementation manner to the eighth possible implementation manner, in a ninth possible implementation manner, after the receiving a routing control request, the method further includes forwarding the routing control request to a home location manager of the mobile node and a home mobile router of the mobile node, so that the home location manager of the mobile node and the home mobile router of the mobile node update locally stored information according to the information included in the routing control request.

With reference to the fourth aspect or any possible implementation manner of the first possible implementation manner to the ninth possible implementation manner, in a tenth possible implementation manner, after the sending the first data packet to a designated routing node through a tunnel with the designated routing node, the method further includes, if the indication information in the routing control policy information carried in the routing control request indicates that routing control is disabled, requesting to obtain the address of the current mobile router of the destination node from a home location manager of the destination node, and sending the path switch instruction to the current mobile router of the destination node, so that the current mobile router of the destination node establishes the tunnel between the current mobile router of the destination node and the current mobile router of the mobile node according to the path switch instruction.

According to a fifth aspect of embodiments, a data packet sending method is provided and includes receiving, by a designated routing node, a first data packet coming from a mobile router of an MN, where the first data packet is sent by the mobile router of the MN through a tunnel with the designated routing node after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information, and sending, by the designated routing node, a first processed data packet to a current mobile router of a destination node through a tunnel with the current mobile router of the destination node, where the first processed data packet is obtained by the designated routing node by processing the first data packet.

With reference to the fifth aspect, in a first possible implementation manner, before the receiving, by a designated routing node, a first data packet coming from an MN, the method further includes receiving, by the designated routing node, the routing control policy information sent by the mobile router of the MN, where the routing control policy information includes the indication information about whether routing control is enabled.

With reference to the first possible implementation manner, in a second possible implementation manner, before the receiving, by a designated routing node, a first data packet coming from a mobile router of a mobile node MN, the method further includes, if the indication information in the routing control policy information indicates that routing control is enabled, establishing, by the designated routing node, the tunnel with the current mobile router of the destination node, and updating the routing control policy information to the current mobile router of the destination node.

With reference to the first possible implementation manner, in a third possible implementation manner, after the receiving, by the designated routing node, the routing control policy information sent by the mobile router of the MN, the method further includes, if the indication information in the routing control policy information indicates that routing control is disabled, releasing, by the designated routing node, the tunnel with the current mobile router of the destination node.

With reference to the fifth aspect or any possible implementation manner of the first possible implementation manner to the third possible implementation manner, in a fourth possible implementation manner, the method further includes, after the MN moves from a source mobile router to a target mobile router, releasing, by the designated routing node, a tunnel with the source mobile router.

According to a sixth aspect of embodiments, a mobile router is provided and includes a first transceiver module, configured to obtain a first data packet coming from a first home address and forwarded by a mobile node MN, if a determining result is yes, send the first data packet to the designated routing node through a tunnel with the designated routing node according to home address status information in the routing policy information, and obtain a first processed data packet returned by the designated routing node, and send the first processed data packet to a current mobile router of a destination node, so that the current mobile router of the destination node sends the first processed data packet to the destination node, where the first processed data packet is obtained by the designated routing node by processing the first data packet, and a first determining module, configured to determine, according to the routing control policy information, whether to enable routing control for the first data packet, where the routing control policy information includes indication information about whether routing control is enabled, and in a case in which the indication information indicates that routing control is enabled, the routing control policy information further includes the home address status information.

With reference to the sixth aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the first possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the sixth aspect or any possible implementation manner of the first possible implementation manner to the third possible implementation manner, in a fourth possible implementation manner, the first transceiver module is specifically configured to detect whether the tunnel with the designated routing node exists, and when detecting that the tunnel with the designated routing node exists, send the first data packet to the designated routing node through the tunnel with the designated routing node, or when detecting that the tunnel with the designated routing node does not exist, establish the tunnel with the designated routing node, and send the first data packet to the designated routing node through the tunnel with the designated routing node.

With reference to the sixth aspect or any possible implementation manner of the first possible implementation manner to the fourth possible implementation manner, in a fifth possible implementation manner, the first transceiver module is specifically configured to determine whether the tunnel with the current mobile router of the destination node is established, and if the tunnel with the current mobile router of the destination node is established, send the first processed data packet to the current mobile router of the destination node through the tunnel with the current mobile router of the destination node, or if the tunnel with the current mobile router of the destination node is not established, establish the tunnel with the current mobile router of the destination node, and send the first processed data packet to the current mobile router of the destination node through the tunnel with the current mobile router of the destination node.

With reference to the sixth aspect or any possible implementation manner of the first possible implementation manner to the fifth possible implementation manner, in a sixth possible implementation manner, the first transceiver module is further configured to receive a routing control request, where the routing control request includes the routing control policy information.

With reference to the sixth possible implementation manner, in a seventh possible implementation manner, the mobile router further includes a first establishing module, configured to, if the indication information in the routing control policy information carried in the routing control request indicates that routing control is enabled, establish the tunnel with the designated routing node according to the home address status information in the routing control policy information carried in the routing control request.

With reference to the sixth possible implementation manner, in an eighth possible implementation manner, the mobile router further includes a first releasing module, configured to, if the indication information in the routing control policy information carried in the routing control request indicates that routing control is disabled, release the tunnel with the designated routing node.

With reference to any possible implementation manner of the sixth possible implementation manner to the eighth possible implementation manner, in a ninth possible implementation manner, the first transceiver module is further configured to forward the routing control request to a home location manager of the mobile node and a home mobile router of the mobile node, so that the home location manager of the mobile node and the home mobile router of the mobile node update locally stored information according to the information included in the routing control request.

According to a seventh aspect of embodiments, a network device is provided and includes a second transceiver module, configured to receive a first data packet coming from a mobile router of an MN, where the first data packet is sent by the mobile router of the MN through a tunnel with the network device after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information, and send a first processed data packet to the mobile router of the MN, so that the mobile router of the MN sends the first processed data packet to a current mobile router of a destination node, and a processing module, configured to process the first data packet to obtain the first processed data packet.

With reference to the seventh aspect, in a first possible implementation manner, the second transceiver module is further configured to receive the routing control policy information sent by the mobile router of the MN, where the routing control policy information includes the indication information indicating that routing control is enabled and the home address status information.

With reference to the seventh aspect, in a second possible implementation manner, the network device further includes a second establishing module, configured to establish the tunnel with the mobile router of the MN according to an establishment request sent by the mobile router of the MN.

With reference to the seventh aspect, in a third possible implementation manner, the network device further includes a second releasing module, configured to release a tunnel with a source mobile router after the MN moves from the source mobile router to a target mobile router.

According to an eighth aspect of embodiments, a mobile router is provided and includes a third transceiver module, configured to obtain a first data packet coming from a first home address and forwarded by a mobile node MN, and determine, according to routing control policy information, whether to enable routing control for the first data packet, where the routing control policy information includes indication information about whether routing control is enabled, and in a case in which the indication information indicates that routing control is enabled, the routing control policy information further includes home address status information, and send a backup first data packet to the designated routing node according to the home address status information in the routing policy, and send the first data packet to a current mobile router of a destination node through a tunnel with the current mobile router of the destination node, so that the current mobile router of the destination node sends the first data packet to the destination node, and a backup module, configured to back up the first data packet if a determining result is yes.

With reference to the eighth aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the second possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the eighth aspect or any possible implementation manner of the first possible implementation manner to the third possible implementation manner, in a fourth possible implementation manner, the third transceiver module is specifically configured to determine whether the tunnel is established with the current mobile router of the destination node, and if the tunnel is established with the current mobile router of the destination node, send the first data packet to the current mobile router of the destination node through the tunnel with the current mobile router of the destination node, or if the tunnel is not established with the current mobile router of the destination node, establish the tunnel with the current mobile router of the destination node, and send the first data packet to the current mobile router of the destination node through the tunnel with the current mobile router of the destination node.

With reference to the eighth aspect or any possible implementation manner of the first possible implementation manner to the fourth possible implementation manner, in a fifth possible implementation manner, the third transceiver module is further configured to receive a routing control request, where the routing control request includes the routing control policy information.

With reference to the fifth possible implementation manner, in a sixth possible implementation manner, the third transceiver module is further configured to forward the routing control request to a home location manager of the mobile node and a home mobile router of the mobile node, so that the home location manager of the mobile node and the home mobile router of the mobile node update locally stored information according to the information included in the routing control request.

According to a ninth aspect of embodiments, a mobile router is provided and includes a fourth transceiver module, configured to obtain a first data packet coming from a first home address and forwarded by a mobile node MN, and if a determining result is yes, send the first data packet to the designated routing node through a tunnel with the designated routing node according to home address status information in the routing policy, so that the designated routing node sends a first processed data packet to a current mobile router of a destination node through a tunnel with the current mobile router of the destination node and that the current mobile router of the destination node sends the first processed data packet to the destination node, where the first processed data packet is obtained by the designated routing node by processing the first data packet, and a second determining module, configured to determine, according to the routing control policy information, whether to enable routing control for the first data packet, where the routing control policy information includes indication information about whether routing control is enabled, and in a case in which the indication information indicates that routing control is enabled, the routing control policy information further includes the home address status information.

With reference to the ninth aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the first possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the ninth aspect or any possible implementation manner of the first possible implementation manner to the third possible implementation manner, in a fourth possible implementation manner, the fourth transceiver module is specifically configured to detect whether the tunnel with the designated routing node exists, and when detecting that the tunnel with the designated routing node exists, send the first data packet to the designated routing node through the tunnel with the designated routing node, or when detecting that the tunnel with the designated routing node does not exist, establish the tunnel with the designated routing node, and send the first data packet to the designated routing node through the tunnel with the designated routing node.

With reference to the ninth aspect or any possible implementation manner of the first possible implementation manner to the fourth possible implementation manner, in a fifth possible implementation manner, the fourth transceiver module is further configured to receive a routing control request, where the routing control request includes the routing control policy information.

With reference to the fifth possible implementation manner, in a sixth possible implementation manner, the mobile router further includes a third establishing module, configured to, if the indication information in the routing control policy information carried in the routing control request indicates that routing control is enabled, establish the tunnel with the designated routing node according to the home address status information in the routing control policy information carried in the routing control request.

With reference to the sixth possible implementation manner, in a seventh possible implementation manner, the fourth transceiver module is further configured to send a path switch instruction to the current mobile router of the destination node according to the indication information in the routing control policy information carried in the routing control request and an address of the current mobile router of the destination node, so that the current mobile router of the destination node establishes the tunnel between the current mobile router of the destination node and the designated routing node and that the current mobile router of the destination node releases a tunnel between the current mobile router of the destination node and a current mobile router of the mobile node.

With reference to any possible implementation manner of the fifth possible implementation manner to the seventh possible implementation manner, in an eighth possible implementation manner, the mobile router further includes a third releasing module, configured to, if the indication information in the routing control policy information carried in the routing control request indicates that routing control is disabled, release the tunnel with the designated routing node.

With reference to any possible implementation manner of the fifth possible implementation manner to the eighth possible implementation manner, in a ninth possible implementation manner, the fourth transceiver module is further configured to forward the routing control request to a home location manager of the mobile node and a home mobile router of the mobile node, so that the home location manager of the mobile node and the home mobile router of the mobile node update locally stored information according to the information included in the routing control request.

With reference to any possible implementation manner of the first possible implementation manner to the ninth possible implementation manner, in a tenth possible implementation manner, the fourth transceiver module is further configured to, if the indication information in the routing control policy information carried in the routing control request indicates that routing control is disabled, request to obtain the address of the current mobile router of the destination node from a home location manager of the destination node, and send the path switch instruction to the current mobile router of the destination node, so that the current mobile router of the destination node establishes the tunnel between the current mobile router of the destination node and the current mobile router of the mobile node according to the path switch instruction.

According to a tenth aspect of embodiments, a network device is provided and includes a receiving module, configured to receive a first data packet coming from a mobile router of a mobile node MN, where the first data packet is sent by the mobile router of the MN through a tunnel with the network device after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information, and a sending module, configured to send a first processed data packet to a current mobile router of a destination node through a tunnel with the current mobile router of the destination node, where the first processed data packet is obtained by the network device by processing the first data packet.

With reference to the tenth aspect, in a first possible implementation manner, the receiving module is further configured to receive the routing control policy information sent by the mobile router of the MN, where the routing control policy information includes the indication information about whether routing control is enabled.

With reference to the first possible implementation manner, in a second possible implementation manner, the network device further includes a fourth establishing module, configured to, if the indication information in the routing control policy information indicates that routing control is enabled, establish the tunnel with the current mobile router of the destination node, and update the routing control policy information to the current mobile router of the destination node.

With reference to the first possible implementation manner, in a third possible implementation manner, the network device further includes a fourth releasing module, configured to, if the indication information in the routing control policy information indicates that routing control is disabled, release the tunnel with the current mobile router of the destination node.

With reference to the tenth aspect or any possible implementation manner of the first possible implementation manner to the third possible implementation manner, in a fourth possible implementation manner, the network device further includes a fourth releasing module, configured to release a tunnel with a source mobile router after the MN moves from the source mobile router to a target mobile router.

According to an eleventh aspect of embodiments, a mobile router is provided and includes a first memory, configured to store an instruction, a first interface, configured to obtain a first data packet coming from a first home address and forwarded by a mobile node MN, if a determining result is yes, send the first data packet to the designated routing node through a tunnel with the designated routing node according to home address status information in the routing policy information, and obtain a first processed data packet returned by the designated routing node, and send the first processed data packet to a current mobile router of a destination node, so that the current mobile router of the destination node sends the first processed data packet to the destination node, where the first processed data packet is obtained by the designated routing node by processing the first data packet, and a first processor, configured to execute the instruction, and determine, according to the routing control policy information, whether to enable routing control for the first data packet, where the routing control policy information includes indication information about whether routing control is enabled, and in a case in which the indication information indicates that routing control is enabled, the routing control policy information further includes the home address status information.

With reference to the eleventh aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the first possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the eleventh aspect or any possible implementation manner of the first possible implementation manner to the third possible implementation manner, in a fourth possible implementation manner, the first processor is specifically configured to execute the instruction, detect whether the tunnel with the designated routing node exists, and when detecting that the tunnel with the designated routing node does not exist, establish the tunnel with the designated routing node, and the first interface is specifically configured to send the first data packet to the designated routing node through the tunnel with the designated routing node.

With reference to the eleventh aspect or any possible implementation manner of the first possible implementation manner to the fourth possible implementation manner, in a fifth possible implementation manner, the first processor is specifically configured to execute the instruction, determine whether the tunnel with the current mobile router of the destination node is established, and if the tunnel with the current mobile router of the destination node is not established, establish the tunnel with the current mobile router of the destination node, and the first interface is specifically configured to send the first processed data packet to the current mobile router of the destination node through the tunnel with the current mobile router of the destination node.

With reference to the eleventh aspect or any possible implementation manner of the first possible implementation manner to the fifth possible implementation manner, in a sixth possible implementation manner, the first interface is further configured to receive a routing control request, where the routing control request includes the routing control policy information.

With reference to the sixth possible implementation manner, in a seventh possible implementation manner, the first processor is further configured to execute the instruction, and if the indication information in the routing control policy information carried in the routing control request indicates that routing control is enabled, establish the tunnel with the designated routing node according to the home address status information in the routing control policy information carried in the routing control request.

With reference to the sixth possible implementation manner, in an eighth possible implementation manner, the first processor is specifically configured to execute the instruction, and if the indication information in the routing control policy information carried in the routing control request indicates that routing control is disabled, release the tunnel with the designated routing node.

With reference to any possible implementation manner of the sixth possible implementation manner to the eighth possible implementation manner, in a ninth possible implementation manner, the first interface is further configured to forward the routing control request to a home location manager of the mobile node and a home mobile router of the mobile node, so that the home location manager of the mobile node and the home mobile router of the mobile node update locally stored information according to the information included in the routing control request.

According to a twelfth aspect of embodiments, a network device is provided and includes a second memory, configured to store an instruction, a second interface, configured to receive a first data packet coming from a mobile router of a mobile node MN, where the first data packet is sent by the mobile router of the MN through a tunnel with the network device after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information, and send a first processed data packet to the mobile router of the MN, so that the mobile router of the MN sends the first processed data packet to a current mobile router of a destination node, and a second processor, configured to execute the instruction, and process the first data packet to obtain the first processed data packet.

With reference to the twelfth aspect, in a first possible implementation manner, the second interface is further configured to receive the routing control policy information sent by the mobile router of the MN, where the routing control policy information includes the indication information indicating that routing control is enabled and the home address status information.

With reference to the twelfth aspect, in a second possible implementation manner, the second processor is further configured to execute the instruction, and establish the tunnel with the mobile router of the MN according to an establishment request sent by the mobile router of the MN.

With reference to the twelfth aspect, in a third possible implementation manner, the second processor is further configured to execute the instruction, and after the MN moves from a source mobile router to a target mobile router, release a tunnel with the source mobile router.

According to a thirteenth aspect of embodiments, a mobile router is provided and includes a third memory, configured to store an instruction, a third interface, configured to obtain a first data packet coming from a first home address and forwarded by a mobile node MN, and determine, according to routing control policy information, whether to enable routing control for the first data packet, where the routing control policy information includes indication information about whether routing control is enabled, and in a case in which the indication information indicates that routing control is enabled, the routing control policy information further includes home address status information, and send a backup first data packet to the designated routing node according to the home address status information in the routing policy, and send the first data packet to a current mobile router of a destination node through a tunnel with the current mobile router of the destination node, so that the current mobile router of the destination node sends the first data packet to the destination node, and a third processor, configured to execute the instruction, and if a determining result is yes, back up the first data packet.

With reference to the thirteenth aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the first possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the thirteenth aspect or any possible implementation manner of the first possible implementation manner to the third possible implementation manner, in a fourth possible implementation manner, the third processor is specifically configured to execute the instruction, determine whether the tunnel is established with the current mobile router of the destination node, and if the tunnel is not established with the current mobile router of the destination node, establish the tunnel with the current mobile router of the destination node, and the third interface is specifically configured to send the first data packet to the current mobile router of the destination node through the tunnel with the current mobile router of the destination node.

With reference to the thirteenth aspect or any possible implementation manner of the first possible implementation manner to the fourth possible implementation manner, in a fifth possible implementation manner, the third interface is further configured to receive a routing control request, where the routing control request includes the routing control policy information.

With reference to the fifth possible implementation manner, in a sixth possible implementation manner, the third interface is specifically configured to forward the routing control request to a home location manager of the mobile node and a home mobile router of the mobile node, so that the home location manager of the mobile node and the home mobile router of the mobile node update locally stored information according to the information included in the routing control request.

According to a fourteenth aspect of embodiments, a mobile router is provided and includes a fourth memory, configured to store an instruction, a fourth interface, configured to obtain a first data packet coming from a first home address and forwarded by a mobile node MN, and if a determining result is yes, send the first data packet to the designated routing node through a tunnel with the designated routing node according to home address status information in the routing policy, so that the designated routing node sends a first processed data packet to a current mobile router of a destination node through a tunnel with the current mobile router of the destination node and that the current mobile router of the destination node sends the first processed data packet to the destination node, where the first processed data packet is obtained by the designated routing node by processing the first data packet, and a fourth processor, configured to execute the instruction, and determine, according to the routing control policy information, whether to enable routing control for the first data packet, where the routing control policy information includes indication information about whether routing control is enabled, and in a case in which the indication information indicates that routing control is enabled, the routing control policy information further includes the home address status information.

With reference to the fourteenth aspect, in a first possible implementation manner, that routing control is enabled indicates that routing control is enabled for a data packet containing a designated home address of the MN, and that routing control is disabled indicates that routing control is disabled for a designated home address of the MN, or that routing control is enabled indicates that routing control is enabled for all data packets of the MN, and that routing control is disabled indicates that routing control is disabled for all data packets of the MN.

With reference to the first possible implementation manner, in a second possible implementation manner, the routing control policy information further includes a home address of the MN, and the indication information includes status information of the MN, and if the status information of the MN indicates that routing control is enabled, and the home address status information indicates that routing control is enabled, the indication information indicates that routing control is enabled for a data packet containing the corresponding home address of the MN, or if the status information of the MN indicates that routing control is enabled, and the home address status information indicates that routing control is disabled, the indication information indicates that routing control is disabled for a data packet containing the corresponding home address of the MN.

With reference to the first possible implementation manner, in a third possible implementation manner, the indication information includes status information of the MN, and if the status information of the MN indicates that routing control is enabled, the indication information indicates that routing control is enabled for all data packets of the MN, or if the status information of the MN indicates that routing control is disabled, the indication information indicates that routing control is disabled for all data packets of the MN.

With reference to the fourteenth aspect or any possible implementation manner of the first possible implementation manner to the third possible implementation manner, in a fourth possible implementation manner, the fourth processor is specifically configured to execute the instruction, detect whether the tunnel with the designated routing node exists, and when detecting that the tunnel with the designated routing node does not exist, establish the tunnel with the designated routing node, and the fourth interface is specifically configured to send the first data packet to the designated routing node through the tunnel with the designated routing node.

With reference to the fourteenth aspect or any possible implementation manner of the first possible implementation manner to the fourth possible implementation manner, in a fifth possible implementation manner, the fourth interface is further configured to receive a routing control request, where the routing control request includes the routing control policy information.

With reference to the fifth possible implementation manner, in a sixth possible implementation manner, the fourth processor is further configured to execute the instruction, and, if the indication information in the routing control policy information carried in the routing control request indicates that routing control is enabled, establish the tunnel with the designated routing node according to the home address status information in the routing control policy information carried in the routing control request.

With reference to the sixth possible implementation manner, in a seventh possible implementation manner, the fourth interface is further configured to send a path switch instruction to the current mobile router of the destination node according to the indication information in the routing control policy information carried in the routing control request and an address of the current mobile router of the destination node, so that the current mobile router of the destination node establishes the tunnel between the current mobile router of the destination node and the designated routing node and that the current mobile router of the destination node releases a tunnel between the current mobile router of the destination node and a current mobile router of the mobile node.

With reference to any possible implementation manner of the fifth possible implementation manner to the seventh possible implementation manner, in an eighth possible implementation manner, the fourth processor is further configured to execute the instruction, and if the indication information in the routing control policy information carried in the routing control request indicates that routing control is disabled, release the tunnel with the designated routing node.

With reference to any possible implementation manner of the fifth possible implementation manner to the eighth possible implementation manner, in a ninth possible implementation manner, the fourth interface is further configured to forward the routing control request to a home location manager of the mobile node and a home mobile router of the mobile node, so that the home location manager of the mobile node and the home mobile router of the mobile node update locally stored information according to the information included in the routing control request.

With reference to any possible implementation manner of the fifth possible implementation manner to the ninth possible implementation manner, in a tenth possible implementation manner, the fourth interface is further configured to, if the indication information in the routing control policy information carried in the routing control request indicates that routing control is disabled, request to obtain the address of the current mobile router of the destination node from a home location manager of the destination node, and send the path switch instruction to the current mobile router of the destination node, so that the current mobile router of the destination node establishes the tunnel between the current mobile router of the destination node and the current mobile router of the mobile node according to the path switch instruction.

According to a fifteenth aspect of embodiments, a network device is provided and includes a fifth memory, configured to store an instruction, a fifth interface, configured to receive a first data packet coming from a mobile router of a mobile node MN, where the first data packet is sent by the mobile router of the MN through a tunnel with the network device after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information, and a fifth processor, configured to execute the instruction, and control the fifth interface to send a first processed data packet to a current mobile router of a destination node through a tunnel with the current mobile router of the destination node, where the first processed data packet is obtained by the network device by processing the first data packet.

With reference to the fifteenth aspect, in a first possible implementation manner, the fifth interface is further configured to receive the routing control policy information sent by the mobile router of the MN, where the routing control policy information includes the indication information about whether routing control is enabled.

With reference to the first possible implementation manner, in a second possible implementation manner, the fifth processor is further configured to execute the instruction, and if the indication information in the routing control policy information indicates that routing control is enabled, establish the tunnel with the current mobile router of the destination node, and update the routing control policy information to the current mobile router of the destination node.

With reference to the first possible implementation manner, in a third possible implementation manner, the fifth processor is further configured to execute the instruction, and if the indication information in the routing control policy information indicates that routing control is disabled, release the tunnel with the current mobile router of the destination node.

With reference to the fifteenth aspect or any possible implementation manner of the first possible implementation manner to the third possible implementation manner, in a fourth possible implementation manner, the fifth processor is further configured to execute the instruction, and after the MN moves from a source mobile router to a target mobile router, release a tunnel with the source mobile router.

In the embodiments of embodiments, the routing control policy information is set, where the routing control policy information may be used to indicate whether routing control is enabled, after the data packet coming from the first home address and forwarded by the MN is obtained, if it is determined to enable routing control, first, the first data packet may be sent to the designated routing node according to the home address status information included in the routing control policy information, and then the first processed data packet processed by the designated routing node is sent to the destination node. In this way, the first data packet may pass through a designated network node in a sending process, and the designated network node may perform some processing on the first data packet, which solves a technical problem in the prior art that data cannot arrive at a designated network node in a sending process. In addition, after the method in the embodiments is used, the first data packet directly arrives at the designated network node, and after being processed, is then directly sent to the destination node. This is still equivalent to route optimization, unlike the prior art in which multiple nodes are generally passed through without route optimization. The path that the first data packet passes through is relatively optimized, and during transmission, an error probability is relatively low.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
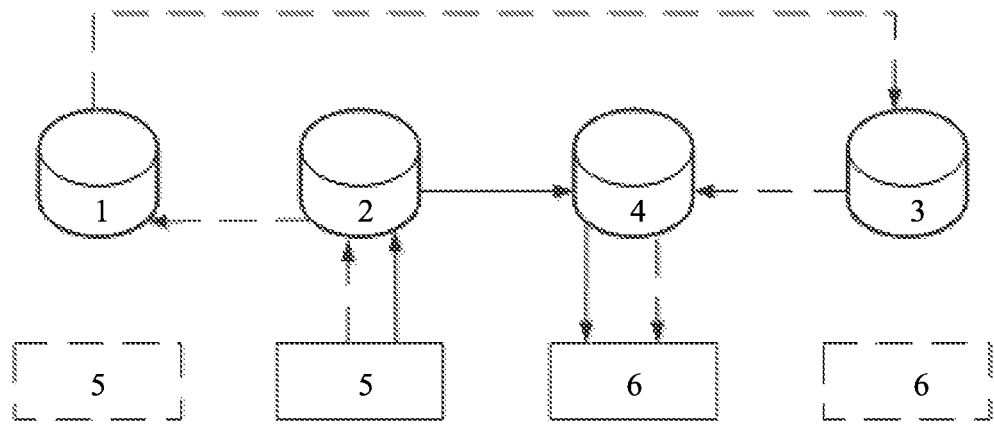
FIG. 1 is a schematic diagram of route optimization of DMM in the prior art.

A data packet sending method in an embodiment may be applied to a mobile router. The method may include obtaining a first data packet coming from a first home address and forwarded by a mobile node (MN), and determining, according to routing control policy information, whether to enable routing control for the first data packet, where the routing control policy information includes indication information about whether routing control is enabled, and in a case in which the indication information indicates that routing control is enabled, the routing control policy information further includes home address status information, if a determining result is yes, sending the first data packet to a designated routing node through a tunnel with the designated routing node according to the home address status information in the routing policy information, and obtaining a first processed data packet returned by the designated routing node, and sending the first processed data packet to a current mobile router of a destination node, so that the current mobile router of the destination node sends the first processed data packet to the destination node, where the first processed data packet is obtained by the designated routing node by processing the first data packet.

In the embodiment, the routing control policy information is included, where the routing control policy information may be used to indicate whether routing control is enabled, after the data packet coming from the first home address and forwarded by the MN is obtained, if it is determined to enable routing control, first, the first data packet may be sent to the designated routing node according to the home address status information included in the routing control policy information, and then the first processed data packet processed by the designated routing node is sent to the destination node. In this way, the first data packet may pass through a designated network node in a sending process, and the designated network node may perform some processing on the first data packet, which solves a technical problem in the prior art that data cannot arrive at a designated network node in a sending process. In addition, after the method in the embodiment is used, the first data packet directly arrives at the designated network node, and after being processed, is then directly sent to the destination node. This is still equivalent to route optimization, unlike the prior art in which multiple nodes are generally passed through without route optimization. The path that the first data packet passes through is relatively optimized, and during transmission, an error probability is relatively low.

To make the objectives, technical solutions, and advantages of the embodiments clearer, the following clearly and completely describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope of embodiments.

Technologies described in this specification may be applied to various communications systems, for example, current 2G and 3G communications systems and a next-generation communications system, for example, a Global System for Mobile Communications (GSM Code Division Multiple Access (CDMA) system, a Time Division Multiple Access (TDMA) system, Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the embodiments, for ease of description, XX of an MN may refer to an XX serving the MN. Likewise, XX of a destination node refers to an XX serving the destination node. For example, a mobile router of the MN may specifically refer to a mobile router serving the MN, for example, may be a home mobile router of the MN, or may be a current mobile router of the MN. A mobile router of the destination node may specifically refer to a mobile router serving the destination node, for example, may be a home mobile router of the destination node, or may be a current mobile router of the destination node. Generally, the following expressions are used, a home XXX of the MN, for example, a home location manager of the MN, a current XXX of the MN, for example, the current mobile router of the MN, a home XXX of the destination node, for example, a home location manager of the destination node, a current XXX of the destination node, for example, the current mobile router of the destination node, and the like. The current mobile router of the MN may refer to a mobile router to which the MN is currently attached. A current location manager of the MN may refer to a location manager serving the mobile router to which the MN is currently attached. This also applies to the destination node.

Preferably, in the embodiments, the destination node may also be an MN. Generally, the destination node may also be referred to as a CN (Correspondent Node), but both are referred to as the destination node in all the embodiments for avoiding confusion with a concept of a core network (CN).

In a description process of the embodiments, all MNs may be understood as source nodes, and an MN used as a destination node is directly referred to as a destination node.

The home location manager is generally responsible for collecting and storing information such as a location and a status of a corresponding network node.

In the embodiments, the designated routing node may be a router, for example, may be specifically a mobile router, or may be a fixed router. Alternatively, the designated routing node may be a network device of another type, for example, a dedicated network device such as an interception device or a charging device, which is not limited in the embodiments.

The following further describes the embodiments in detail with reference to accompanying drawings in this specification.

First Aspect of Embodiments

Figure 2:
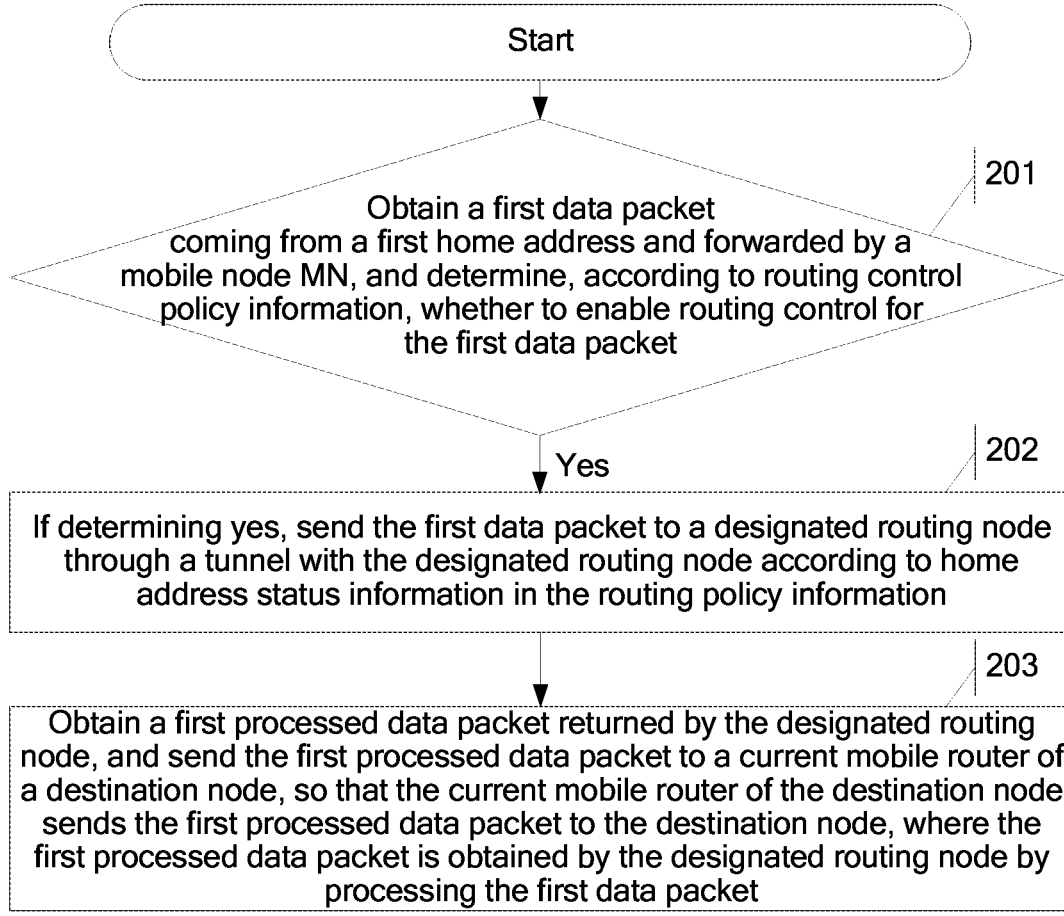
FIG. 2 is a main flowchart of a first data packet sending method according to an embodiment.

Referring to FIG. 2, an embodiment provides a data packet sending method. The method may be applied to a mobile router. Herein the mobile router is a mobile router of the MN, namely, a mobile router serving the MN. A main procedure of the method is as follows.

Step 201: Obtain a first data packet coming from a first home address and forwarded by an MN, and determine, according to routing control policy information, whether to enable routing control for the first data packet, where the routing control policy information includes indication information about whether routing control is enabled, and in a case in which the indication information indicates that routing control is enabled, the routing control policy information further includes home address status information.

Step 202: If a determining result is yes, send the first data packet to the designated routing node through a tunnel with the designated routing node according to the home address status information in the routing policy information.

Step 203: Obtain a first processed data packet returned by the designated routing node, and send the first processed data packet to a current mobile router of a destination node, so that the current mobile router of the destination node sends the first processed data packet to the destination node.

In the embodiment, the home address status information, for example, may include address information of the designated routing node.

In the embodiment, the current mobile router of the destination node is a current mobile router serving the destination node. In the embodiment, "current mobile router" is a mobile router currently attached to. Specifically, the current mobile router of the destination node is a mobile router to which the destination node is currently attached.

Preferably, the embodiment is described from two perspectives, an IP (Internet Protocol) granularity and an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the perspective of the IP granularity, the routing control policy information further includes a home address of the MN, and the indication information includes status information of the MN. Specifically, the home address status information included in the routing control policy information may be included in the indication information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

That is, in this case, both enabling routing control and disabling routing control are intended for a certain IP address, and specifically, intended for a certain home address of the MN.

Preferably, in the embodiment, the MN has one or more home addresses.

Preferably, in the embodiment, when described from the perspective of the MN granularity, the indication information includes status information of the MN.

In this case, if the status information of the MN indicates that routing control is enabled, the indication information indicates that routing control is enabled for all data packets of the MN.

In this case, if the status information of the MN indicates that routing control is disabled, the indication information indicates that routing control is disabled for all data packets of the MN.

That is, in this case, both enabling routing control and disabling routing control are intended for the MN.

Preferably, in the embodiment, in step 202, the sending the first data packet to a designated routing node through a tunnel with the designated routing node includes detecting whether the tunnel with the designated routing node exists, and when detecting that the tunnel with the designated routing node exists, sending the first data packet to the designated routing node through the tunnel with the designated routing node, or when detecting that the tunnel with the designated routing node does not exist, establishing the tunnel with the designated routing node, and sending the first data packet to the designated routing node through the tunnel with the designated routing node.

That is, before the first data packet is sent to the designated routing node, detection may be performed first. If it is detected that the tunnel with the designated routing node exists, the first data packet is sent to the designated routing node. In this way, success of sending the first data packet may be ensured as much as possible, and a packet loss is avoided.

Preferably, in the embodiment, in step 202, the sending the first data packet to the current mobile router of the destination node through a tunnel with the current mobile router of the destination node includes determining whether the tunnel with the current mobile router of the destination node is established, and if the tunnel with the current mobile router of the destination node is established, sending the first processed data packet to the current mobile router of the destination node through the tunnel with the current mobile router of the destination node, or if the tunnel with the current mobile router of the destination node is not established, establishing the tunnel with the current mobile router of the destination node, and sending the first processed data packet to the current mobile router of the destination node through the tunnel with the current mobile router of the destination node.

That is, before the first processed data packet is sent to the current mobile router of the destination node, detection may be performed first. If it is detected that the tunnel with the current mobile router of the destination node exists, the first processed data packet is sent to the designated routing node. In this way, success of sending the first processed data packet may be ensured as much as possible, and a packet loss is avoided.

Preferably, in the embodiment, before step 201, the method may further include receiving a routing control request, where the routing control request includes the routing control policy information.

Preferably, in the embodiment, after the routing control request is received, the method may further include if the indication information in the routing control policy information carried in the routing control request indicates that routing control is enabled, establishing the tunnel with the designated routing node according to the home address status information in the routing control policy information carried in the routing control request. Therefore, in step 202, the first data packet can be sent to the designated routing node through the tunnel with the designated routing node.

Preferably, in the embodiment, after the routing control request is received, the method may further include if the indication information in the routing control policy information carried in the routing control request indicates that routing control is disabled, releasing the tunnel with the designated routing node. In this way, a subsequent data packet may be prevented from continuing to pass through a path of the designated routing node.

Preferably, in the embodiment, after the routing control request is received, the method may further include forwarding the routing control request to a home location manager of the mobile node and a home mobile router of the mobile node, so that the home location manager of the mobile node and the home mobile router of the mobile node update locally stored information according to the information included in the routing control request.

Second Aspect of Embodiments

Figure 3:
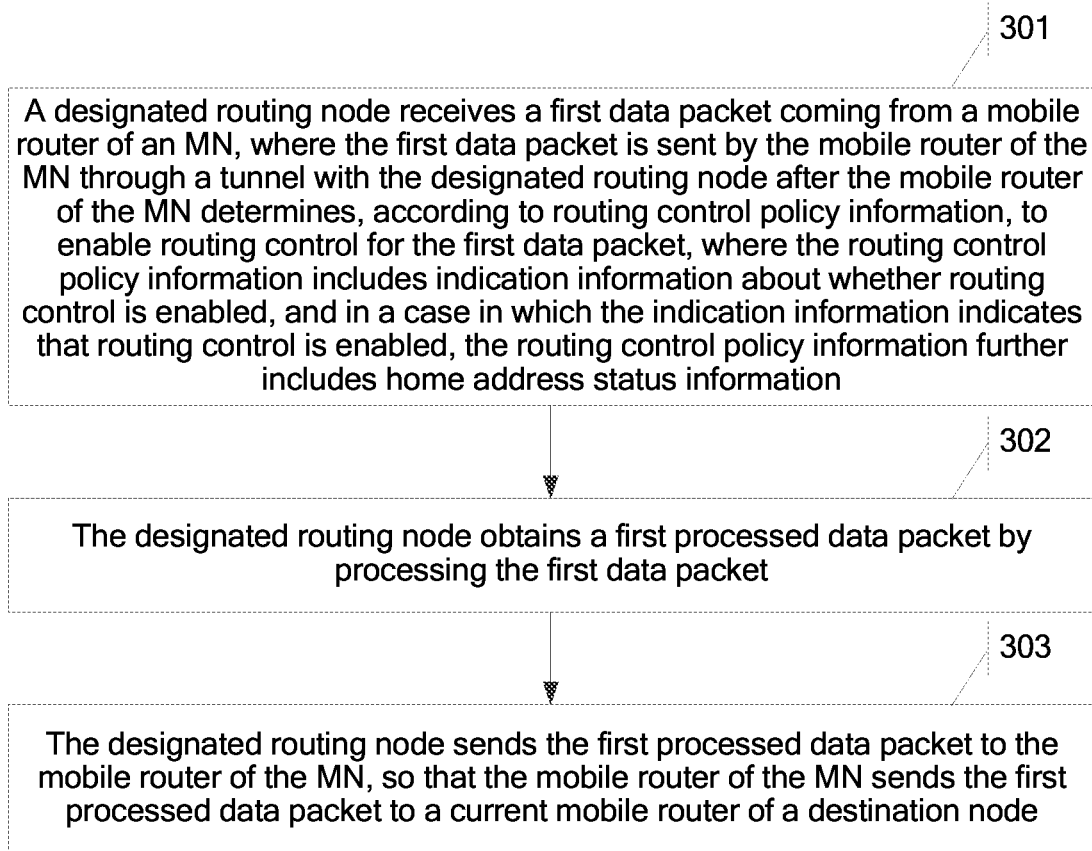
FIG. 3 is a main flowchart of a second data packet sending method according to an embodiment.

Referring to FIG. 3, an embodiment provides a data packet sending method. A main procedure of the method is as follows.

Step 301: A designated routing node receives a first data packet coming from a mobile router of a mobile node MN, where the first data packet is sent by the mobile router of the MN through a tunnel with the designated routing node after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information of.

Step 302: The designated routing node obtains a first processed data packet by processing the first data packet.

Step 303: The designated routing node sends the first processed data packet that is processed to the mobile router of the MN, so that the mobile router of the MN sends the first processed data packet to a current mobile router of a destination node.

Preferably, in the embodiment, before step 301, that is, before the designated routing node receives the first data packet coming from the MN, the method may further include the designated routing node receives the routing control policy information sent by the mobile router of the MN, where the routing control policy information includes the indication information indicating that routing control is enabled and the home address status information. In this case, the mobile router of the MN may be a home mobile router of the MN, or may be a current mobile router of the MN.

Preferably, in the embodiment, before step 301, that is, before the designated routing node receives the first data packet coming from the MN, the method may further include the designated routing node establishes the tunnel with the mobile router of the MN according to an establishment request sent by the mobile router of the MN. That is, the tunnel between the mobile router of the MN and the designated routing node may be established by the mobile router of the MN, or may be established by the designated routing node after the mobile router of the MN sends the establishment request to the designated routing node.

Preferably, in the embodiment, the method may further include after the MN moves from a source mobile router to a target mobile router, the designated routing node releases a tunnel with the source mobile router.

For example, the MN is originally attached to a mobile router 1, and currently moves to a mobile router 2. Therefore, the designated routing node may release a tunnel with the mobile router 1 to avoid a data packet sending error.

For the two data packet sending methods in FIG. 2 and FIG. 3, the following describes several specific embodiments.

In all embodiments of the present application, C-MR indicates a mobile router currently attached to, H-MR indicates a home mobile router, H-LM indicates a home location manager, C-LM indicates a current location manager, HoA indicates a home address, and MN indicates a mobile node.

It should be noted that, in Embodiment 1 to Embodiment 25, 1 indicates a home location manager of the MN. If the MN has two home location managers, two is in the figures indicate a first home location manager of the MN and a second home location manager of the MN. 2 indicates a home mobile router of the MN. If the MN has two home mobile routers, two 2s in the figures indicate a first home mobile router of the MN and a second home mobile router of the MN. 3 indicates a current mobile router of the MN. 4 indicates a next mobile router (namely, a Next-MR) to which the MN is attached. In some embodiments, the next mobile router to which the MN is attached is also the current mobile router of the MN. 5 indicates a current mobile router of a destination node 1, 6 indicates a current mobile router of a destination node 2, 7 indicates the MN, 8 indicates the destination node 1, 9 indicates the destination node 2, and 10 indicates the designated routing node. In all the figures, a pipe-like connecting line indicates a tunnel.

I. IP Granularity

Embodiment 1

Figure 4:
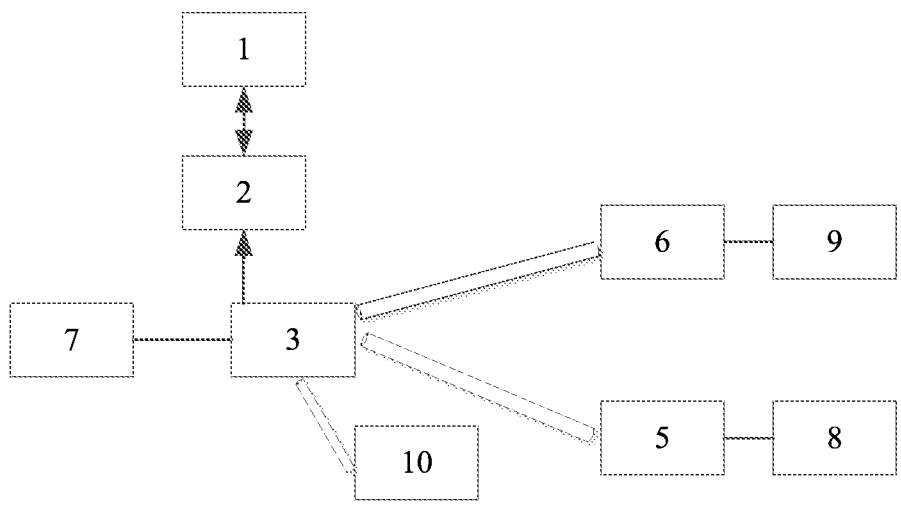
FIG. 4 is a first schematic diagram when routing control is enabled in an IP granularity according to an embodiment.

Referring to FIG. 4, the MN is attached to the current mobile router of the MN. The current mobile router of the MN allocates a new home address, for example, indicated by HoA2, to the MN. An old home address of the MN, for example, indicated by HoA1, is allocated by the home mobile router of the MN.

nated routing nodes, the designated routing nodes may be distinguished by using x. HoAx indicates the home address allocated by the home mobile router of the MN to the MN, and is generally indicated by an IP address. When multiple home addresses are allocated to the MN, the home addresses may be distinguished by using x. HoAx_AnchorIDx_Status indicates the home address status information, where HoAx_AnchorIDx_Status_Open indicates that routing control is enabled and that a routing path passes through the designated routing node, and HoAX_AnchorIDx_Status_Close indicates that routing control is disabled and that a routing path does not pass through the designated routing node. All embodiments are described by referring to Table 1 and centering on Table 1. The embodiments are all described from the perspective of the IP granularity or the MN granularity.

TABLE 1

| | MN_AnchorIDx_status | HoAx_AnchorIDx_status | Meaning |
|---|---|---|---|
| IP granularity | MN_AnchorIDx_Status_Open | HoAx_AnchorIDx_Status_Open | Routing control is enabled for data from the HoAx of the MN, and the data is routed to the designated routing node, but route optimization is still performed on other services of the MN. That is, routing control is enabled. |
| | MN_AnchorIDx_Status_Open | HoAx_AnchorIDx_Status_Close | Routing control is disabled for data from the HoAx of the MN, and route optimization is still performed on other services of the MN. That is, routing control is disabled. |
| MN granularity | MN_AnchorIDx_Status_Open | / | Route optimization is enabled, and route optimization is performed on all data of the MN, that is, routing control is disabled. |
| | MN_AnchorIDx_Status_Close | / | Route optimization is disabled, no route optimization is performed on any data of the MN, and the data is routed to the designated network node, that is, routing control is enabled. |

The current mobile router of the MN receives the routing control request, where the routing control request includes the routing control policy information. For example, the routing control request includes parameters such as {MNID, MN_AnchorID1_Status_Open, HoA1, AnchorID1, and HoA1_AnchorID1_Status_Open}. The routing control request may be sent by an OAM (Operation Administration and Maintenance, operation, administration and maintenance) entity, or a lawful interception entity, or another network element.

MNID indicates a unique identifier of the MN in a DMM network. MN_AnchorIDx_Status indicates the status information of the MN. MN_AnchorIDx_Status_Open indicates that route optimization is performed on all data of the MN and that data routing control is disabled for the MN. MN_AnchorIDx_Status_Close indicates that no route optimization is performed on any data of the MN, that the data is routed to a designated network node, and that data routing control is enabled for the MN. AnchorIDx indicates an identifier of the designated routing node, and is generally indicated by an IP address. When there are multiple desig- It can be seen from Table 1 that the routing control policy information indicates that routing control is enabled.

The current mobile router of the MN compares route optimization status data structure parameters stored by the current mobile router of the MN with parameters such as (MNID, MN_AnchorID1_Status_Open, HoA1, AnchorID1, and HoA1_AnchorID1_Status_Open) in the routing control request. If they are consistent, the routing control request is ignored. If they are inconsistent, each parameter in the routing control request is updated to the current mobile router of the MN. Afterward, the current mobile router of the MN performs authentication, and if the authentication succeeds, sends the routing request message to the home mobile router of the MN.

The current mobile router of the MN forwards the routing control request to the home mobile router of the MN, and updates each parameter value in the routing control request to the home mobile router of the MN.

The home mobile router of the MN sends the routing control request to the home location manager of the MN, and updates each parameter value in the routing control request to the home location manager of the MN.

The current mobile router of the MN establishes a tunnel with the designated routing node according to values of MN_AnchorID1_Status_Open and HoA1_AnchorID1_Status_Open in the received routing control request, and at the same time updates the routing control policy information to the designated routing node.

When the current mobile router of the MN receives data coming from the first home address (for example, indicated by HoA1), the current mobile router of the MN detects the values of MN_AnchorID1_Status_Open and HoA1_AnchorID1_Status_Open, and sends the data packet to the designated routing node through the tunnel between the current mobile router of the MN and the designated routing node according to the home address status information.

After receiving the data packet sent by the current mobile router of the MN, the designated routing node returns a processed data packet to the current mobile router of the MN. In this period, the designated routing node may perform some particular operations on the data packet, such as lawful interception and charging, and thereby obtain the processed data packet.

If a tunnel between the current mobile router of the MN and the current mobile router of the destination node exists, when the current mobile router of the MN receives the data packet coming from the first home address and sent by the MN, the data packet may be sent to the designated routing node according to the foregoing steps. When the current mobile router of the MN receives the processed data packet returned by the designated routing node, the processed data packet is sent to the current mobile router of the destination node through the tunnel between the current mobile router of the MN and the current mobile router of the destination node, and finally arrives at the destination node. For example, the destination node is one of numerous destination nodes, and therefore, the destination node is indicated by the destination node 1.

If no tunnel between the current mobile router of the MN and the current mobile router of the destination node 1 exists, when the current mobile router of the MN receives the processed data packet returned by the designated routing node, the current mobile router of the MN establishes a tunnel with the current mobile router of the destination node 1.

In this case, the data packet coming from the first home address is routed to the designated routing node through the current mobile router of the MN, and after being processed by the designated routing node, is returned to the current mobile router of the MN. Finally the processed data packet is sent to the current mobile router of the destination node 1 through the current mobile router of the MN, and arrives at the destination node 1. However, because route optimization continues to be enabled for other data of the MN, a data packet coming from the second home address (for example, indicated by HoA2) is not affected, and continues to be directly sent to the current mobile router of the destination node 2 through the current mobile router of the MN.

In this case, a problem of whether the MN moves may be involved.

Embodiment 2

Figure 5:
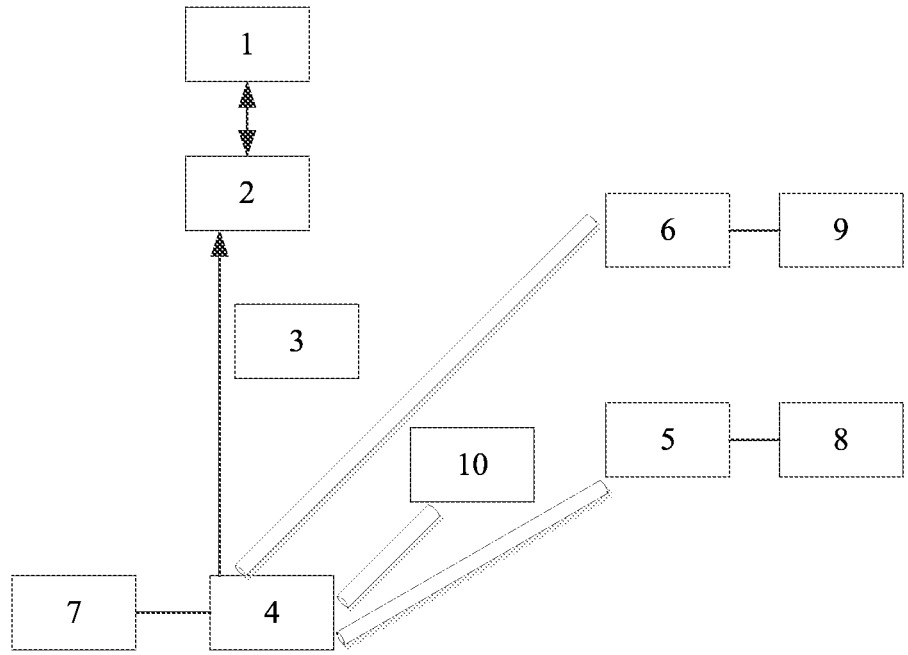
FIG. 5 is a first schematic diagram when routing control is enabled and an MN moves in an IP granularity according to an embodiment.

Referring to FIG. 5, when the MN moves and is attached to a Next-MR, the Next-MR may become the current mobile router of the MN. The current mobile router of the MN sends a location update (LU) message to the home location manager of the MN, where the location update message includes parameters such as (MNID, and address of the Next-MR), and updates information such as the address of the Next-MR to which the MN is currently attached, to the home location manager of the MN.

The home location manager of the MN receives the LU message, updates the information in the LU message to the home location manager of the MN, and returns location acknowledgement (LUA) information to the current mobile router of the MN, where the LUA message includes all parameters in MN route optimization status information, that is, includes the routing control policy information.

The current mobile router of the MN detects that the current mobile router itself is a mobile router to which the MN is currently attached, and establishes a tunnel with the home mobile router of the MN. In route optimization of a DMM scenario, a network node to which the MN is currently attached (namely, the current mobile router of the MN) needs to always keep a tunnel with a home network node of the MN (namely, the home mobile router of the MN).

When the home mobile router of the MN determines that the MR to which the MN is currently attached in the MN route optimization status information is the Next-MR and that the tunnel between the home mobile router of the MN and the Next-MR is established, the home mobile router of the MN releases a tunnel between the home mobile router of the MN and the mobile router to which the MN is previously attached.

The current mobile router of the MN receives a data packet coming from the first home address, and establishes a tunnel with the designated routing node according to values of MN_AnchorID1_Status_Open and HoA1_AnchorID1_Status_Open. At the same time, the current mobile router of the MN updates the MN route optimization status information parameters, namely, the routing control policy information, to the designated routing node.

In this case, when the current mobile router of the MN receives the data packet coming from the first home address and sent by the MN, the current mobile router of the MN sends the data packet to the designated routing node through the tunnel between the current mobile router of the MN and the designated routing node.

After receiving the data packet sent by the current mobile router of the MN, the designated routing node returns a processed data packet to the current mobile router of the MN. In this period, the designated routing node may perform some particular operations on the data packet, such as lawful interception and charging, and obtain the processed data packet.

The designated routing node determines that the MN is currently attached to the current mobile router of the MN and already leaves the mobile router to which the MN is previously attached. Therefore, the designated routing node releases a tunnel between the designated routing node and the mobile router to which the MN is previously attached.

If a tunnel between the current mobile router of the MN and the current mobile router of the destination node 1 exists, when the current mobile router of the MN receives the processed data packet returned by the designated routing node, the current mobile router of the MN sends the processed data packet to the current mobile router of the destination node 1 through the tunnel between the current mobile router of the MN and the current mobile router of the destination node 1, and the current mobile router of the destination node 1 sends the processed data packet to the destination node 1.

If no tunnel between the current mobile router of the MN and the current mobile router of the destination node 1 exists, when the current mobile router of the MN receives the processed data packet returned by the designated routing node, the current mobile router of the MN establishes a tunnel with the current mobile router of the destination node 1 and sends the processed data packet to the current mobile router of the destination node 1 through the tunnel with the current mobile router of the destination node 1, and the current mobile router of the destination node 1 sends the processed data packet to the destination node 1.

In this case, the data packet coming from the first home address is routed to the designated routing node through the current mobile router of the MN, and after being processed by the designated routing node, is returned to the current mobile router of the MN. Finally the processed data arrives at the destination node 1 through the current mobile router of the destination node 1. However, because route optimization continues to be enabled for other data of the MN, a data packet coming from the second home address (for example, indicated by HoA2) is not affected, and continues to be directly sent to the current mobile router of the destination node 2 through the current mobile router of the MN.

In addition to a possibility that the MN moves, a case in which the destination node moves may be involved.

Embodiment 3

Figure 6:
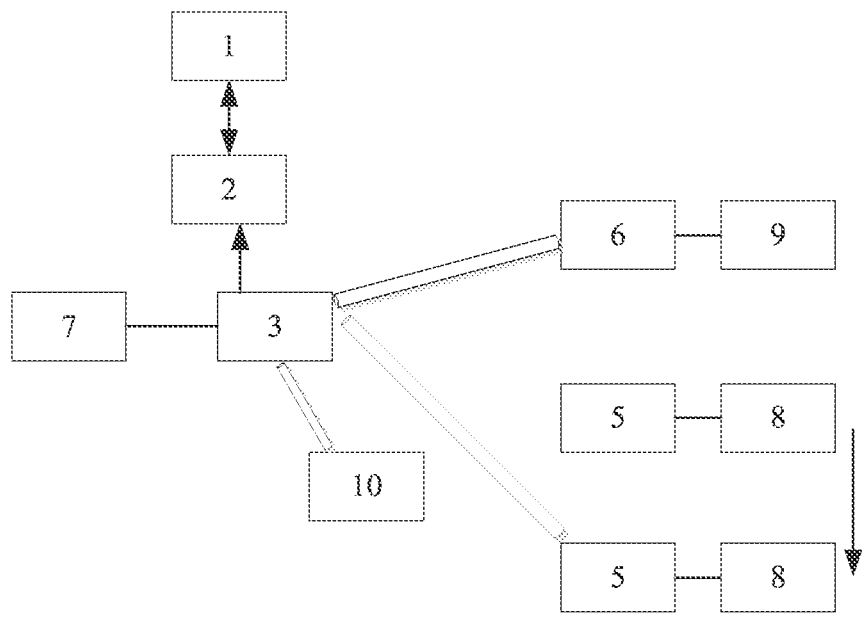
FIG. 6 is a first schematic diagram when routing control is enabled and a destination node moves in an IP granularity according to an embodiment.

Referring to FIG. 6, on a basis of Embodiment 1, after the destination node 1 moves and is attached to a Next-MR, the Next-MR may become the current mobile router of the destination node 1. An arrow in FIG. 6 indicates that the destination node 1 moves. When the current mobile router of the destination node 1 receives a data packet that needs to be sent by the destination node 1 to the MN, the current mobile router of the destination node 1 may acquire an address of the home location manager of the MN according to a destination address of the data packet, and then request the home location manager of the MN for an address of the mobile router to which the MN is currently attached, namely, the address of the current mobile router of the MN.

After the current mobile router of the destination node 1 acquires the address of the current mobile router of the MN, the current mobile router of the destination node 1 establishes a tunnel between the current mobile router of the destination node 1 and the current mobile router of the MN.

In this case, the data packet sent by the destination node to the MN arrives at the current mobile router of the MN through the tunnel between the current mobile router of the destination node 1 and the current mobile router of the MN, and then arrives at the designated routing node. Then the designated routing node returns a processed data packet to the current mobile router of the MN, and the current mobile router of the MN sends the processed data packet to the MN. The processed data packet is obtained after the designated routing node processes the data packet.

Embodiment 4

Figure 7A:
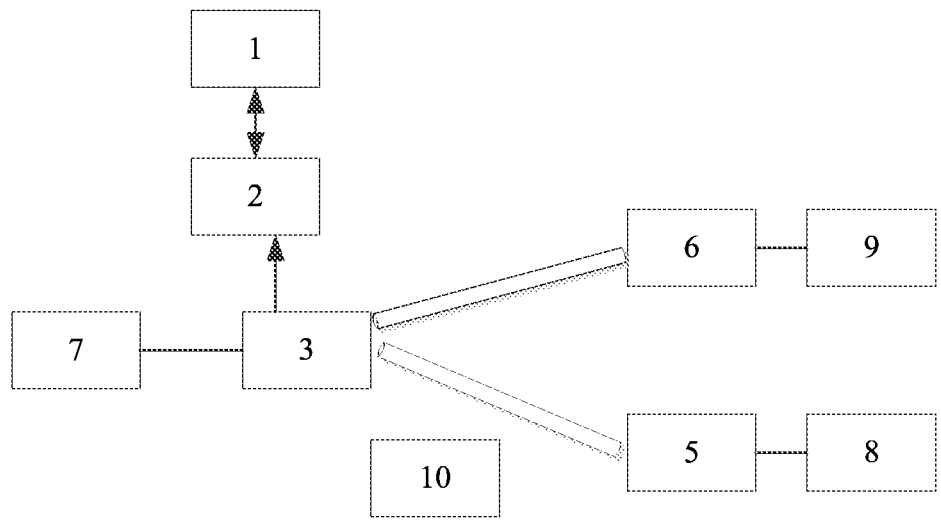
FIG. 7A is a first schematic diagram when routing control is disabled in an IP granularity according to an embodiment.

Referring to FIG. 7A, the current mobile router of the MN receives the routing control request, where the routing control request includes the routing control policy information, where the routing control policy information includes parameters such as {MNID, MN_AnchorID1_Status_Open, HoA1, AnchorID1, and HoA1_AnchorID1_Status_Close}. The message may be sent by an OAM, or a lawful interception entity, or another network element.

The current mobile router of the MN compares locally stored route optimization status data structure parameters with parameters in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the request message to the home mobile router of the MN.

The current mobile router of the MN sends the routing control request to the home mobile router of the MN, and updates each parameter in the routing control policy information to the home mobile router of the MN. The home mobile router of the MN sends the routing control request to the home location manager of the MN, and at the same time also updates each parameter in the routing control policy information to the home location manager of the MN.

The current mobile router of the MN determines, according to the routing control policy information, to disable routing control. Therefore, the current mobile router of the MN releases a tunnel with the designated routing node.

Afterward, a data packet coming from the first home address directly arrives at the destination node 1 through an optimized tunnel between the current mobile router of the MN and the current mobile router of the destination node 1. However, because route optimization continues to be enabled for other data of the MN, a data packet coming from the second home address (for example, indicated by HoA2) is not affected, and continues to be directly sent to the current mobile router of the destination node 2 through the current mobile router of the MN.

After the MN moves again, the procedure is consistent with the normal route optimization step of DMM. After the destination node 1 moves, the method is the same as the solution method in Embodiment 3, and is not further described.

II. MN Granularity

Embodiment 5

Figure 7B:
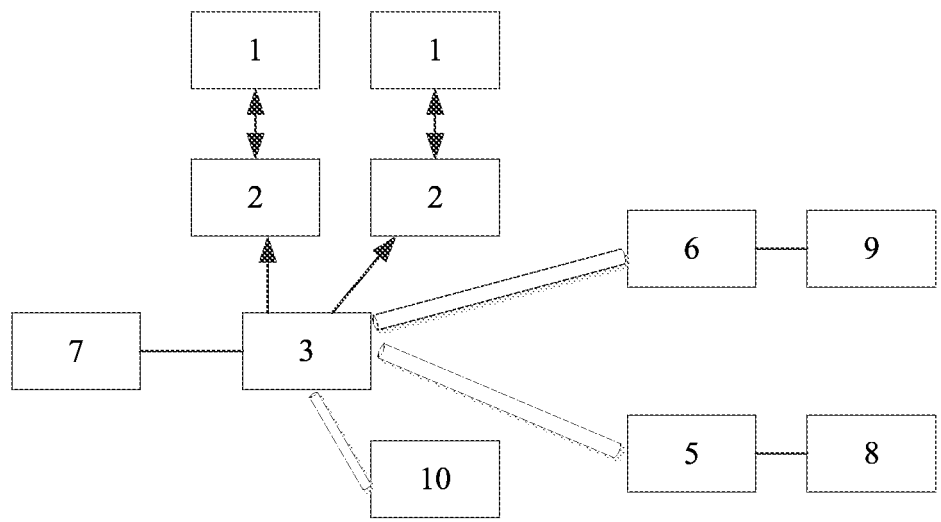
FIG. 7B is a first schematic diagram when routing control is enabled in an MN granularity according to an embodiment.

Referring to FIG. 7B, two home addresses are used as an example in this embodiment. In an actual application, data packets that pass through the MN may belong to multiple home addresses.

The MN is attached to the current mobile router of the MN. The current mobile router of the MN allocates a new home address to the MN, which may be referred to as the second home address, for example, indicated by HoA2. An old home address of the MN, for example, indicated by HoA1, which may be referred to as the first home address, is allocated by the home mobile router of the MN.

The current mobile router of the MN receives the routing control request, where the routing control request includes the routing control policy information, where the routing control policy information includes parameters such as {MNID, MN_AnchorID1_Status_Close, and AnchorID1}. The routing control request may be sent by an OAM, or a lawful interception entity, or another network element.

The current mobile router of the MN compares locally stored route optimization status data structure parameters with parameters (MNID and MN_AnchorID1_ Status_ Close) in the routing control request. If they are consistent, the routing control request is ignored. If they are inconsistent, each parameter in the routing control policy information is updated to the current mobile router of the MN. Finally the current mobile router of the MN performs authentication, and if the authentication succeeds, sends the routing control request to the first home mobile router of the MN, for example, indicated by H-MR1, and to the second home mobile router of the MN, for example, indicated by H-MR2.

The current mobile router of the MN forwards the routing control request to the first home mobile router of the MN and the second home mobile router of the MN, and updates each parameter value in the routing control policy information to the first home mobile router of the MN and the second home mobile router of the MN.

The first home mobile router of the MN and the second home mobile router of the MN respectively send the routing control request to the corresponding first home location manager of the MN, for example, indicated by H-LM1, and to the second home location manager of the MN, for example, indicated by H-LM2, and update each parameter value in the routing control policy information to the first home location manager of the MN and the second home location manager of the MN.

The current mobile router of the MN establishes a tunnel with the designated routing node according to a value of MN_AnchorID1_Status_Close in the received routing control request. At the same time, the current mobile router of the MN updates MN route optimization status information parameters to the designated routing node.

When the current mobile router of the MN receives a data packet coming from the first home address or the second home address, the current mobile router of the MN detects MN_AnchorID1_Status_Close, and if the tunnel between the current mobile router of the MN and the designated routing node exists, sends the data packet to the designated routing node. If the tunnel with the designated routing node does not exist, the current mobile router of the MN establishes a tunnel with the designated routing node, and afterward sends the data packet to the designated routing node through the tunnel with the designated routing node.

After receiving the data packet coming from the first home address or the second home address and sent by the current mobile router of the MN, the designated routing node returns a processed data packet to the current mobile router of the MN. In this period, the designated routing node may perform some particular operations on the data packet, such as lawful interception and charging, and thereby obtain the processed data packet.

When the current mobile router of the MN receives the processed data packet coming from the first home address and returned by the designated routing node, if a tunnel between the current mobile router of the MN and the current mobile router of the destination node 1 exists, the current mobile router of the MN sends the processed data packet to the destination node 1 through the tunnel with the current mobile router of the destination node 1, or if no tunnel with the current mobile router of the destination node 1 exists, the current mobile router of the MN establishes a tunnel with the current mobile router of the destination node 1, and then sends the processed data packet to the destination node 1.

When the current mobile router of the MN receives the processed data packet coming from the second home address and returned by the designated routing node, the current mobile router of the MN sends the data packet to the current mobile router of the destination node 2 by using a normal IP routing method without passing through a tunnel. This is because for the home address HoA2, the current mobile router of the MN may directly send the data packet to a peer end without requiring a tunnel.

In this case, the data packet coming from the first home address or the second home address is routed to the designated routing node through the current mobile router of the MN, and after being processed by the designated routing node, is returned to the current mobile router of the MN. Finally the current mobile router of the MN sends a corresponding processed data packet to the current mobile router of the destination node 1 and the current mobile router of the destination node 2 respectively, and then the current mobile router of the destination node 1 and the current mobile router of the destination node 2 send the corresponding processed data packet to the destination node 1 and destination node 2 respectively.

Embodiment 6

Figure 8:
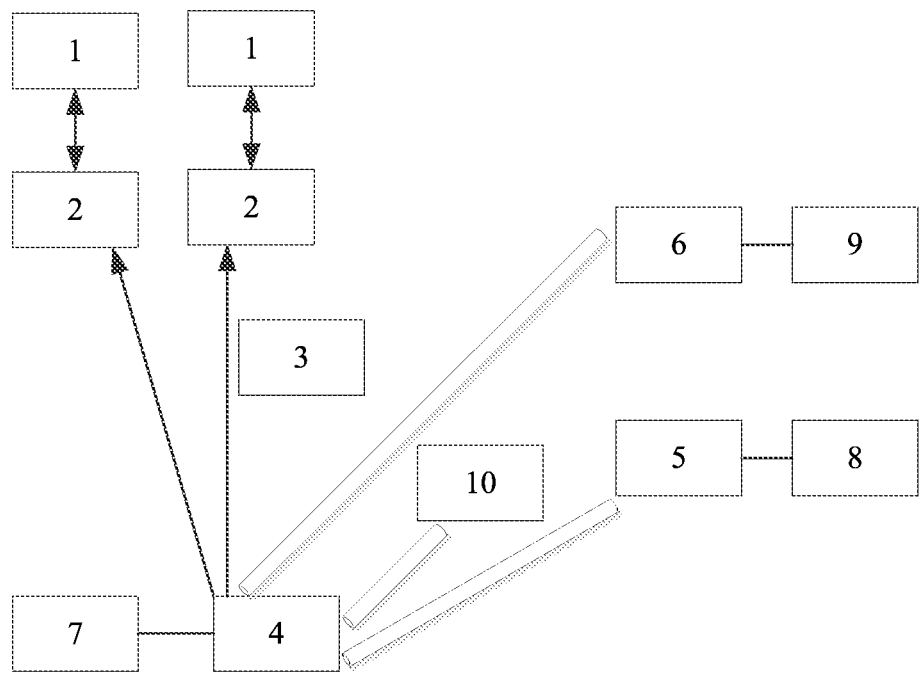
FIG. 8 is a first schematic diagram when routing control is enabled and an MN moves in an MN granularity according to an embodiment.

Referring to FIG. 8, this embodiment deals with a case in which the MN moves.

When the MN moves and is attached to a Next-MR, the Next-MR may become the current mobile router of the MN. The current mobile router of the MN sends a location update (LU) message to the first home location manager of the MN, for example, indicated by H-LM1, and to the second home location manager of the MN, for example, indicated by H-LM2, where the LU message includes parameters such as (MNID and Next-MR), and updates information such as an address of the current mobile router of the MN to the first home location manager of the MN and the second home location manager of the MN.

The first home location manager of the MN and the second home location manager of the MN receive the LU message, update the address of the current mobile router of the MN in the LU message to the first home location manager of the MN and the second home location manager of the MN respectively, and return location acknowledgement (LUA) information to the current mobile router of the MN respectively, where the LUA message includes all parameters in MN route optimization status information, that is, includes the routing control policy information.

The current mobile router of the MN detects that the current mobile router itself is a mobile router to which the MN is currently attached, and establishes a tunnel with the first home mobile router of the MN, for example, indicated by H-MR1, and a tunnel with the second home mobile router of the MN, for example, indicated by H-MR2, respectively. In route optimization of a DMM scenario, a network node to which the MN is currently attached (namely, the current mobile router of the MN) always keeps a tunnel with the home mobile router of the MN. Herein the first home mobile router of the MN is a home mobile router of HoA1 (the first home address), and the second home mobile router of the MN is a home mobile router of HoA2 (the second home address).

The first home mobile router of the MN and the second home mobile router of the MN determine that the mobile router to which the MN is currently attached in the MN route optimization status information is the current mobile router of the MN, and that the tunnels between the first home mobile router of the MN and the current mobile router of the MN and between the second home mobile router of the MN and the current mobile router of the MN are both already established. The first home mobile router of the MN and the second home mobile router of the MN respectively release tunnels between the first home mobile router of the MN and the current mobile router of the MN and between the second home mobile router of the MN and the current mobile router of MN.

When the current mobile router of the MN receives a data packet coming from the first home address or the second home address and sent by the MN, the current mobile router of the MN first detects, according to a value of MN_AnchorID1_Status_Close, whether a tunnel between the current mobile router of the MN and the designated routing node exists, and if the tunnel with the designated routing node exists, sends the data packet to the designated routing node. If the tunnel with the designated routing node does not exist, the current mobile router of the MN establishes a tunnel with the designated routing node, and afterward sends the data packet to the designated routing node through the tunnel with the designated routing node.

After receiving the data packet coming from the first home address or the second home address, the designated routing node returns a processed data packet to the current mobile router of the MN through the tunnel between the designated routing node and the current mobile router of the MN. In this period, the designated routing node may perform some processing on the data packet, such as lawful interception and charging, and thereby obtain the processed data packet.

The designated routing node detects that the MN currently moves and is attached to the current mobile router of the MN, and that the tunnel between the designated routing node and the current mobile router of the MN is established, the designated routing node releases a tunnel between the designated routing node and the current mobile router of the MN.

When the current mobile router of the MN receives the processed data packet coming from the first home address or the second home address and returned by the designated routing node, if a tunnel between the current mobile router of the MN and the current mobile router of the destination node 1 exists, the current mobile router of the MN directly sends the processed data packet coming from the first home address to the current mobile router of the destination node 1 through the tunnel with the current mobile router of the destination node 1, and the current mobile router of the destination node 1 sends the processed data packet to the destination node 1. If no tunnel between the current mobile router of the MN and the current mobile router of the destination node 1 exists, the current mobile router of the MN establishes a tunnel with the current mobile router of the destination node 1, and then sends the processed data packet coming from the first home address to the destination node 1 through the tunnel with the current mobile router of the destination node 1. Likewise, a manner of processing the processed data packet coming from the second home address is the same as the manner of processing the processed data packet coming from the first home address, and is not further described.

In this case, all data packets coming from the first home address or the second home address are routed to the designated routing node through the current mobile router of the MN, and after being processed by the designated routing node, are returned to the current mobile router of the MN. Finally the processed data packets arrive at the destination node 1 and the destination node 2 respectively through the current mobile router of the destination node 1.

Embodiment 7

Figure 9:
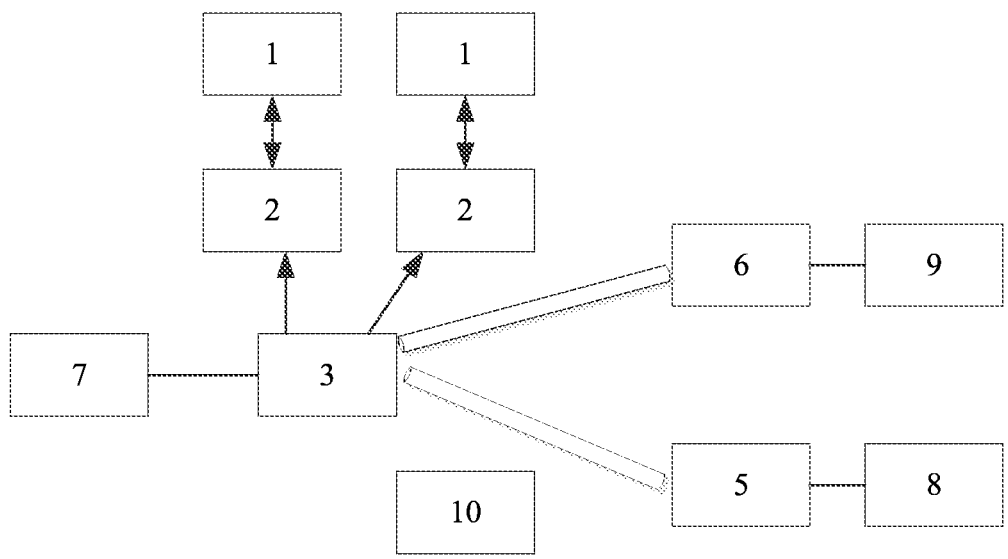
FIG. 9 is a first schematic diagram when routing control is disabled in an MN granularity according to an embodiment.

Referring to FIG. 9, on a basis of Embodiment 5, the current mobile router of the MN receives the routing control request, where the routing control request includes the routing control policy information, where the routing control policy information includes parameters such as {MNID and MN_AnchorID1_Status_Open}. The routing control request may be sent by an OAM, or a lawful interception entity, or another network element.

The current mobile router of the MN compares locally stored route optimization status data structure parameters with parameters (MNID and MN_AnchorID1_Status_Open) in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the first home mobile router of the MN, for example, indicated by H-MR1, and to the second home mobile router of the MN, for example, indicated by H-MR2.

The first home mobile router of the MN and the second home mobile router of the MN respectively send the routing control request to the corresponding first home location manager of the MN, for example, indicated by H-LM1, and to the corresponding second home location manager of the MN, for example, indicated by H-LM2.

The MN determines, according to values of (MNID and MN_AnchorID1_Status_Open) in the routing control policy information, to disable routing control, and releases a tunnel between the current mobile router of the MN and the designated routing node.

In the foregoing several embodiments, an example in which the current mobile router of the MN receives the routing control request is used. It should be noted that, the routing control request may also be received by another network node, for example, the current location manager of the MN. After receiving the routing control request, the current location manager of the MN may send the routing control request to the current mobile router of the MN. Subsequent procedures are the same as those in the foregoing several embodiments.

Alternatively, for example, the routing control request may be received by the home mobile router of the MN. In this case, the home mobile router of the MN is equivalent to the current mobile router of the MN, and all steps are the same as those in the foregoing several embodiments, except that it is unnecessary to establish a tunnel with the home mobile router of the MN.

Alternatively, for example, the routing control request may be received by the home location manager of the MN. After receiving the routing control request, the home location manager of the MN sends the routing control request to the home mobile router of the MN. Subsequent steps are the same as steps executed when the routing control request is received by the home mobile router of the MN.

Third Aspect of Embodiments

Figure 10:
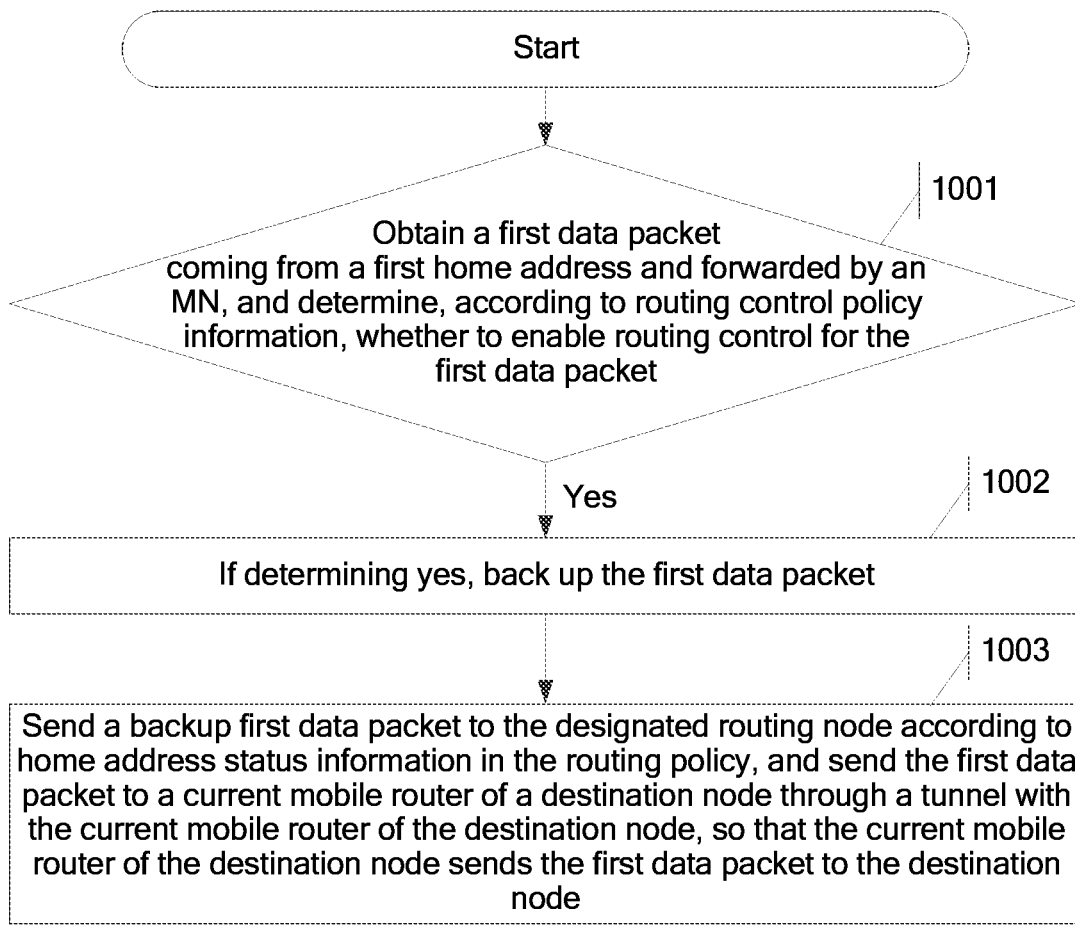
FIG. 10 is a main flowchart of a third data packet sending method according to an embodiment.

Referring to FIG. 10, an embodiment provides a data packet sending method. The method may be applied to a mobile router. Preferably, herein the mobile router is a mobile router of the MN. A main procedure of the method is as follows.

Step 1001: Obtain a first data packet coming from a first home address and forwarded by an MN, and determine, according to routing control policy information, whether to enable routing control for the first data packet, where the routing control policy information includes indication information about whether routing control is enabled, and in a case in which the indication information indicates that routing control is enabled, the routing control policy information further includes home address status information.

Step 1002: If a determining result is yes, back up the first data packet.

Step 1003: Send a backup first data packet to the designated routing node according to the home address status information in the routing policy, and send the first data packet to a current mobile router of a destination node through a tunnel with the current mobile router of the destination node, so that the current mobile router of the destination node sends the first data packet to the destination node.

Preferably, the embodiment is described from a perspective of an IP granularity or an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the IP granularity, the routing control policy information further includes a home address of the MN, and the indication information includes status information of the MN. That the routing control policy information includes home address status information may be specifically that the indication information includes the home address status information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

Preferably, in the embodiment, the MN has one or more home addresses.

Preferably, in the embodiment, when described from the MN granularity, the indication information includes status information of the MN.

If the status information of the MN indicates that routing control is enabled, the indication information indicates that routing control is enabled for all data packets of the MN.

If the status information of the MN indicates that routing control is disabled, the indication information indicates that routing control is disabled for all data packets of the MN.

Preferably, in the embodiment, in step 1003, the sending the first data packet to a current mobile router of a destination node through a tunnel with the current mobile router of the destination node may be specifically determining whether the tunnel is established with the current mobile router of the destination node, and if the tunnel is established with the current mobile router of the destination node, sending the first data packet to the current mobile router of the destination node through the tunnel with the current mobile router of the destination node, or if the tunnel is not established with the current mobile router of the destination node, establishing the tunnel with the current mobile router of the destination node, and sending the first data packet to the current mobile router of the destination node through the tunnel with the current mobile router of the destination node.

That is, before the first data packet is sent, whether the tunnel with the current mobile router of the destination nod is established may be determined first, and after it is determined that the tunnel is established, the first data packet is sent. This may avoid a packet loss as much as possible, and ensure a data packet sending success rate.

Preferably, in the embodiment, before step 1001, the method may further include receiving a routing control request, where the routing control request includes the routing control policy information.

Preferably, in the embodiment, after the routing control request is received, the method may further include forwarding the routing control request to a home location manager of the mobile node and a home mobile router of the mobile node, so that the home location manager of the mobile node and the home mobile router of the mobile node update locally stored information according to the information included in the routing control request. Specifically, this step may occur before step 1001.

For the data packet sending method in FIG. 10, the following describes several specific embodiments.

I. IP Granularity

Embodiment 8

Figure 11:
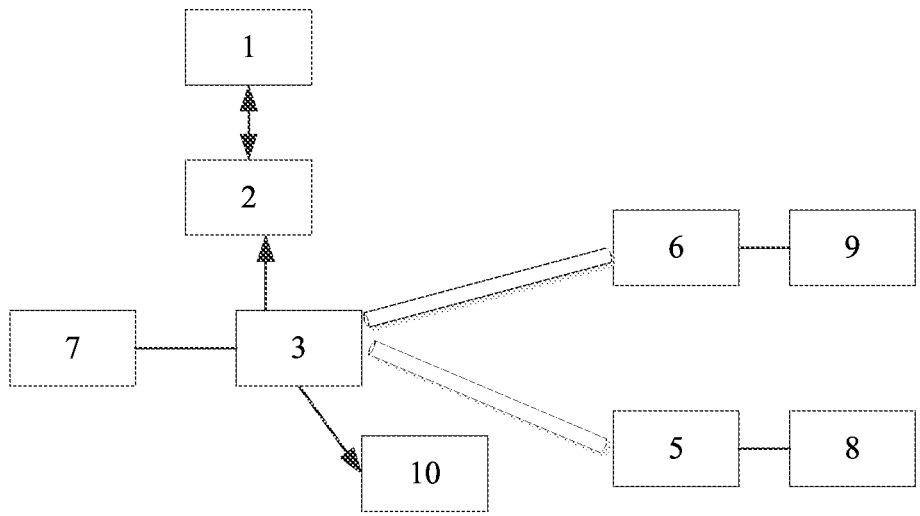
FIG. 11 is a second schematic diagram when routing control is enabled in an IP granularity according to an embodiment.

Referring to FIG. 11, the current mobile router of the MN receives the routing control request, where the routing control request includes the routing control policy information, where the routing control policy information includes parameters such as {MNID, MN_AnchorID1_Status_Open, HoA1, AnchorID1, and HoA1_AnchorID1_Status_Open}. The routing control request may be sent by an OAM, or a lawful interception entity, or another network element.

The current mobile router of the MN compares locally stored route optimization status data structure parameters with parameters such as (MNID, MN_AnchorID1_Status_Open, HoA1, AnchorID1, and HoA1_AnchorID1_Status_Open) in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the home mobile router of the MN.

The current mobile router of the MN forwards the routing control request to the home mobile router of the MN, and updates each parameter value in the routing control policy information to the home mobile router of the MN.

The home mobile router of the MN sends the routing control request to the home location manager of the MN, and updates each parameter value in the routing control policy information to the home location manager of the MN.

When receiving a data packet coming from the first home address, the current mobile router of the MN backs up the data packet according to parameters such as MNID, MN_AnchorID1_Status_Open, HoA1, AnchorID1, and HoA1_AnchorID1_Status_Open in the routing control policy information, and sends a backup data packet to the designated routing node, where the first home address may be indicated by, for example, HoA1. The current mobile router of the MN directly sends the original data packet to the current mobile router of the destination node 1 through a tunnel with the current mobile router of the destination node 1. In this embodiment, two destination nodes are used as an example, and are the destination node 1 and the destination node 2 respectively, where the destination node 1 corresponds to HoA1, and the destination node 2 corresponds to HoA2, where HoA2 indicates the second home address.

When the current mobile router of the MN receives a data packet coming from the second home address, because routing control is enabled for only the first home address, the current mobile router of the MN directly sends the data packet to a current mobile router of the destination node 2 through normal IP routing.

In this case, the current mobile router of the MN sends only the backup data packet from the first home address to the designated routing node, but the data packet coming from the second home address is not affected.

Embodiment 9

Figure 12:
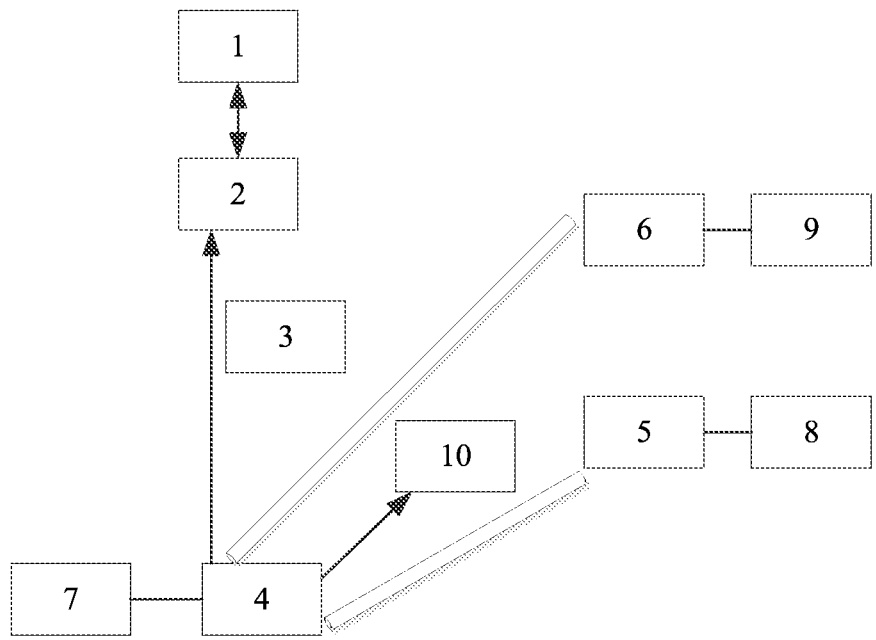
FIG. 12 is a second schematic diagram when routing control is enabled and an MN moves in an IP granularity according to an embodiment.

Referring to FIG. 12, this embodiment deals with a case in which the MN moves.

When the MN moves and is attached to a Next-MR, the Next-MR may become the current mobile router of the MN. The current mobile router of the MN sends a location update (LU) message to the home location manager of the MN, where the LU message includes parameters such as (MNID and Next-MR), and updates an address of the Next-MR to which the MN is currently attached, namely, information such as an address of the current mobile router of the MN, to the home location manager of the MN.

The home location manager of the MN receives the LU message, updates the address of the current mobile router of the MN in the LU message to the home location manager of the MN, and returns location acknowledgement (LUA) information to the current mobile router of the MN, where the LUA message includes all parameters in MN route optimization status information, that is, includes the routing control policy information.

The current mobile router of the MN detects that the current mobile router itself is a mobile router to which the MN is currently attached, and establishes a tunnel with the home mobile router of the MN. In route optimization of a DMM scenario, a network node to which the MN is currently attached (namely, the current mobile router of the MN) needs to always keep a tunnel with a home network node of the MN (namely, the home mobile router of the MN).

When the home mobile router of the MN determines that the mobile router to which the MN is currently attached in the MN route optimization status information is the current mobile router of the MN, and that the tunnel between the home mobile router of the MN and the current mobile router of the MN is already established, the home mobile router of the MN releases a tunnel between the home mobile router of the MN and the mobile router to which the MN is previously attached.

The current mobile router of the MN receives a data packet coming from the first home address. For example, the first home address is indicated by HoA1. The current mobile router of the MN backs up the data packet according to parameters such as MNID, MN_AnchorID1_Status_Open, HoA1, AnchorID1, and HoA1_AnchorID1_Status_Open in the routing control policy information, and sends a backup data packet to the designated routing node.

In addition, the current mobile router of the MN sends the original data packet to the current mobile router of the destination node 1.

Before the sending, the current mobile router of the MN may perform detection. If a tunnel between the current mobile router of the MN and the current mobile router of the destination node 1 exists, the current mobile router of the MN directly sends the original data packet to the current mobile router of the destination node 1 through the tunnel with the current mobile router of the destination node 1, and the current mobile router of the destination node 1 sends the data packet to the destination node 1.

If no tunnel between the current mobile router of the MN and the current mobile router of the destination node 1 exists, the current mobile router of the MN first establishes a tunnel with the current mobile router of the destination node 1, and then sends the data packet to the current mobile router of the destination node 1 through the tunnel with the current mobile router of the destination node 1, and the current mobile router of the destination node 1 sends the data packet to the destination node 1.

When receiving a data packet coming from the second home address, the current mobile router of the MN sends the data packet to the current mobile router of the destination node 2 through a tunnel with the current mobile router of the destination node 2 according to route optimization of DMM, and the current mobile router of the destination node 2 sends the data packet to the destination node 2.

Embodiment 10

Figure 13:
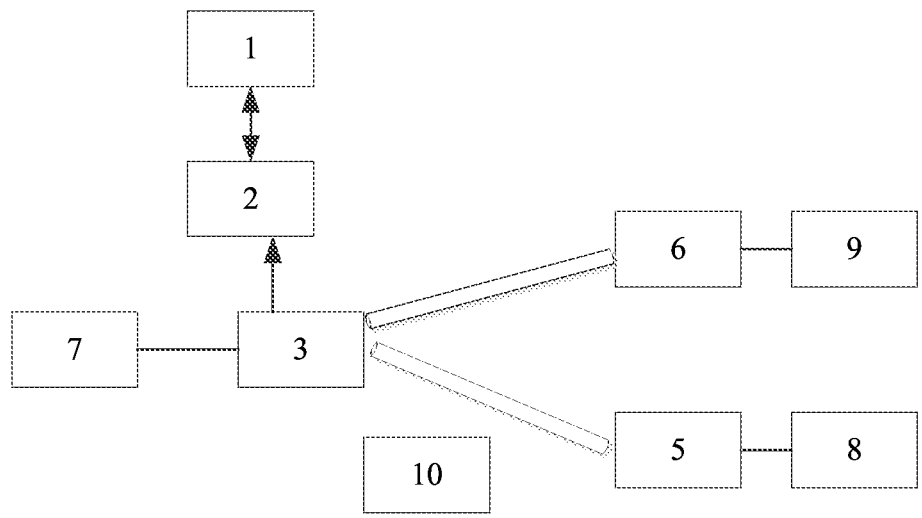
FIG. 13 is a second schematic diagram when routing control is disabled in an IP granularity according to an embodiment.

Referring to FIG. 13, on a basis of Embodiment 8, the current mobile router of the MN receives the routing control request, where the routing control request includes the routing control policy information, where the routing control policy information includes parameters such as {MNID, MN_AnchorID1_Status_Open, HoA1, AnchorID1, and HoA1_AnchorID1_Status_Close}. The message may be sent by an OAM, or a lawful interception entity, or another network element.

The current mobile router of the MN compares locally stored route optimization status data structure parameters with parameters in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the request message to the home mobile router of the MN.

The current mobile router of the MN sends the routing control request to the home mobile router of the MN, and updates each parameter in the routing control policy information to the home mobile router of the MN. The home mobile router of the MN sends the routing control request to the home location manager of the MN, and at the same time also updates each parameter in the routing control policy information to the home location manager of the MN.

The current mobile router of the MN determines, according to the routing control policy information, to disable routing control.

Afterward, a data packet coming from the first home address directly arrives at the destination node 1 through an optimized tunnel between the current mobile router of the MN and the current mobile router of the destination node 1. The current mobile router of the destination node 1 neither replicates the data packet nor sends the data packet to the designated routing node. However, because route optimization continues to be enabled for other data of the MN, a data packet coming from the second home address (for example, indicated by HoA2) is not affected, and continues to be directly sent to the current mobile router of the destination node 2 through the current mobile router of the MN.

After the MN moves again, the procedure is consistent with the normal route optimization step of DMM. After the destination node 1 moves, the method is the same as the solution method in Embodiment 3, and is not further described.

II. MN Granularity

Embodiment 11

Figure 14:
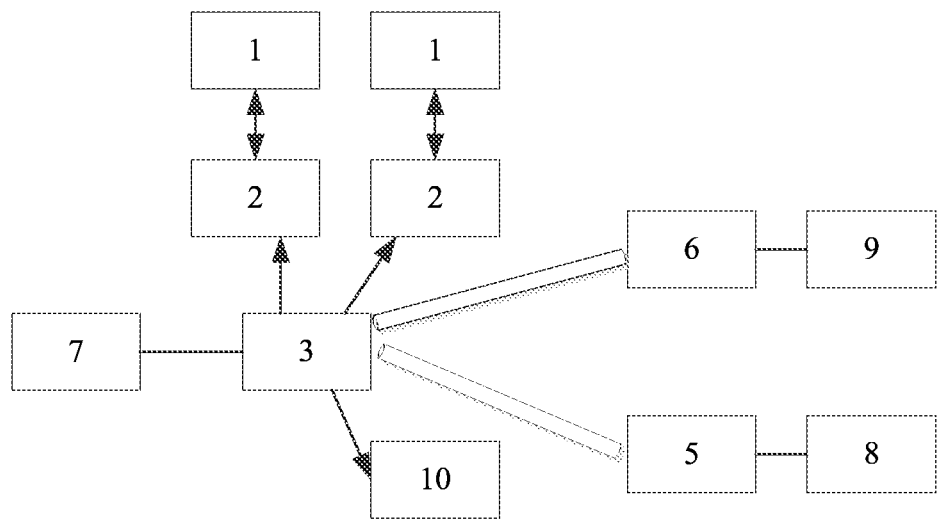
FIG. 14 is a second schematic diagram when routing control is enabled in an MN granularity according to an embodiment.

Referring to FIG. 14, the current mobile router of the MN receives the routing control request, where the routing control request includes the routing control policy information, where the routing control policy information includes parameters such as {MNID, MN_AnchorID1_Status_Close, and AnchorID1}. The message may be sent by an OAM, or a lawful interception entity, or another network element.

The current mobile router of the MN compares locally stored route optimization status data structure parameters with parameters (MNID, MN_AnchorID1_Status_Close, and AnchorID1) in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the home mobile router of the MN.

The current mobile router of the MN forwards the routing control request to the first home mobile router of the MN, for example, indicated by H-MR1, and to the second home mobile router of the MN, for example, indicated by H-MR2, and updates each parameter value in the routing control policy information to the first home mobile router of the MN and the second home mobile router of the MN.

The first home mobile router of the MN and the second home mobile router of the MN respectively send the request message to the first home location manager of the MN, for example, indicated by MN H-LM1, and to the second home location manager of the MN, for example, indicated by H-LM2, and update each parameter value in the routing control policy information to the first home location manager of the MN and the second home location manager of the MN.

When receiving a data packet coming from the first home address or the second home address, the current mobile router of the MN backs up, according to parameters such as MNID, MN_AnchorID1_Status_Close, and AnchorID1 in the routing control policy information, the data packet coming from the first home address, sends a backup data packet to the designated routing node, and sends the original data packet to the current mobile router of the destination node 1 through a tunnel with the current mobile router of the first destination node (for example, indicated by the destination node 1). Same processing is also performed on a data packet coming from the second home address. The first home address is indicated by, for example, HoA1, and the second home address is indicated by, for example, HoA1.

Embodiment 12

Figure 15:
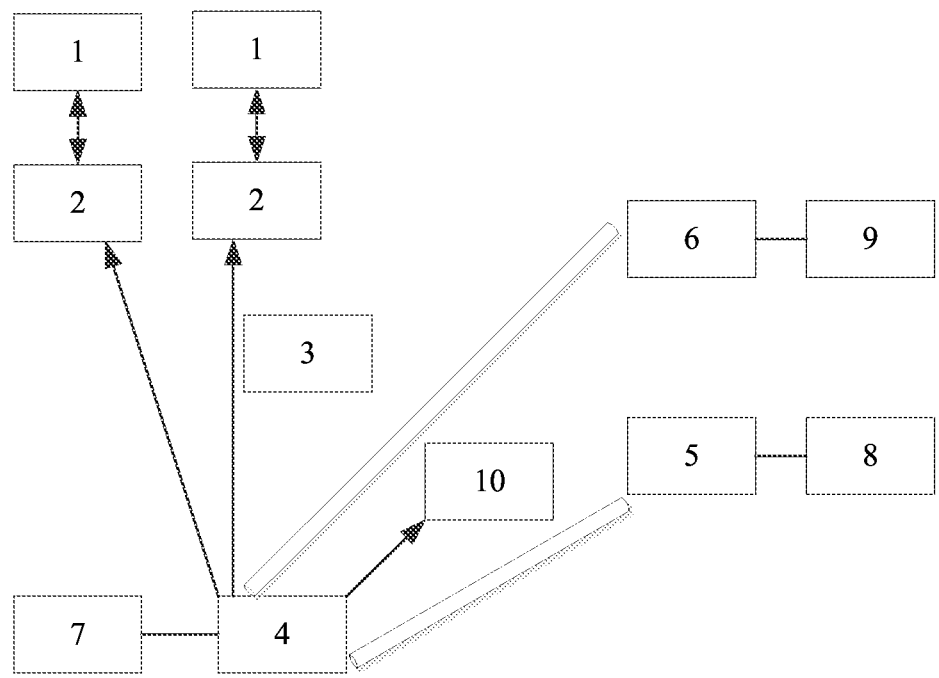
FIG. 15 is a second schematic diagram when routing control is enabled and an MN moves in an MN granularity according to an embodiment.

Referring to FIG. 15, when the MN moves and is attached to a Next-MR, the Next-MR may become the current mobile router of the MN. The current mobile router of the MN sends a location update (LU) message to the first home location manager of the MN, for example, indicated by MN H-LM1, and to the second home location manager of the MN, for example, indicated by H-LM2, where the LU message includes parameters such as (MNID, and an address of the current mobile router of the MN), and updates the address of the Next-MR to which the MN is currently attached, namely, information such as the address of the current mobile router of the MN, to the first home location manager of the MN and the second home location manager of the MN.

When receiving the LU message, the first home location manager of the MN and the second home location manager of the MN update information of the current mobile router of the MN in the LU message to the first home location manager of the MN and the second home location manager of the MN respectively, and return location acknowledgement (LUA) information to the current mobile router of the MN respectively, where the LUA information includes all parameters in the routing control policy information.

The current mobile router of the MN detects that the current mobile router itself is a mobile router to which the MN is currently attached, and establishes a tunnel with the first home mobile router of the MN, for example, indicated by H-MR1, and a tunnel with the second home mobile router of the MN, for example, indicated by H-MR2. In route optimization of a DMM scenario, a network node to which the MN is currently attached (namely, the current mobile router of the MN) always keeps a tunnel with a home network node of the MN (namely, the home mobile router of the MN).

The first home mobile router of the MN and the second home mobile router of the MN determine that the mobile router to which the MN is currently attached is the current mobile router of the MN, and that the tunnels between the first home mobile router of the MN and the current mobile router of the MN and between the second home mobile router of the MN and the current mobile router of the MN are both already established. The first home mobile router of the MN and the second home mobile router of the MN respectively release tunnels between the first home mobile router of the MN and the mobile router to which the MN is previously attached and between the second home mobile router of the MN and the mobile router to which the MN is previously attached.

When receiving a data packet coming from the first home address or the second home address, the current mobile router of the MN backs up, according to parameters such as MNID, MN_AnchorID1_Status_Close, and AnchorID1 in the routing control policy information, the data packet coming from the first home address, sends a backup data packet to the designated routing node, and sends the original data packet to the current mobile router of the destination node 1 through a tunnel with the current mobile router of the first destination node (for example, indicated by the destination node 1). Same processing is also performed on the data packet coming from the second home address. The first home address is indicated by, for example, HoA1, and the second home address is indicated by, for example, HoA1.

The current mobile router of the MN may first perform detection before sending the data packet to the current mobile router of the destination node 1.

If it is detected that the tunnel between the current mobile router of the MN and the current mobile router of the destination node 1 exists, the current mobile router of the MN directly sends the data packet to the current mobile router of the destination node 1 through the tunnel with the current mobile router of the destination node 1, and the current mobile router of the destination node 1 sends the data packet to the destination node 1.

If it is detected that the tunnel between the current mobile router of the MN and the current mobile router of the destination node 1 does not exist, the current mobile router of the MN establishes the tunnel with the current mobile router of the destination node 1, and then sends the data packet to the current mobile router of the destination node 1 through the tunnel with the current mobile router of the destination node 1, and the current mobile router of the destination node 1 sends the data packet to the destination node 1.

Embodiment 12

Figure 16:
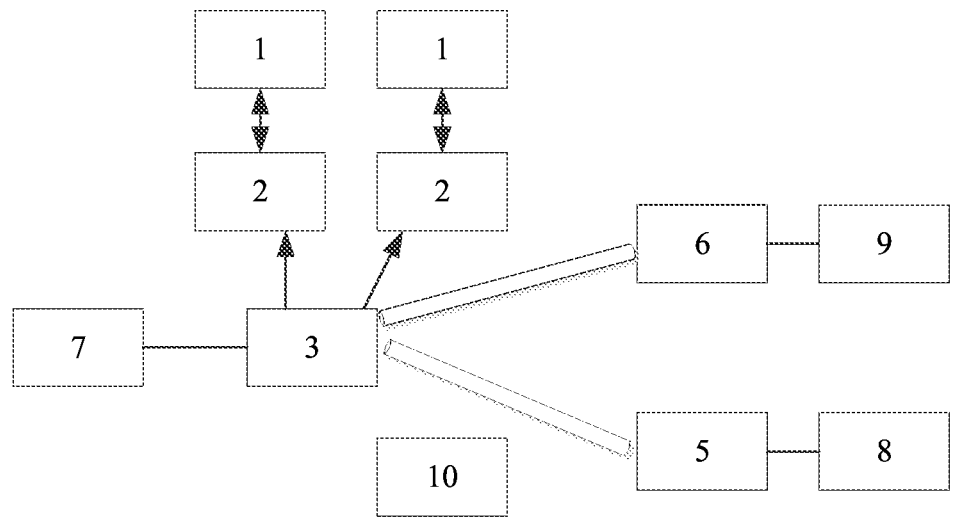
FIG. 16 is a second schematic diagram when routing control is disabled in an MN granularity according to an embodiment.

Referring to FIG. 16, on a basis of Embodiment 10, the current mobile router of the MN receives the routing control request, where the routing control request includes the routing control policy information, where the routing control policy information includes parameters such as {MNID and MN_AnchorID1_Status_Open}. The message may be sent by an OAM, or a lawful interception entity, or another network element.

The current mobile router of the MN compares locally stored route optimization status data structure parameters with parameters in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the request message to the home mobile router of the MN.

The current mobile router of the MN sends the routing control request to the home mobile router of the MN, and updates each parameter in the routing control policy information to the home mobile router of the MN. The home mobile router of the MN sends the routing control request to the home location manager of the MN, and at the same time also updates each parameter in the routing control policy information to the home location manager of the MN.

The current mobile router of the MN determines, according to the routing control policy information, to disable routing control.

Afterward, all data packets passing through the MN directly arrive at the destination node through an optimized tunnel between the current mobile router of the MN and the current mobile router of the destination node. The current mobile router of the MN neither replicates the data packets nor sends the data packets to the designated routing node.

In the foregoing several embodiments, an example in which the current mobile router of the MN receives the routing control request is used. It should be noted that, the routing control request may also be received by another network node, for example, the current location manager of the MN. After receiving the routing control request, the current location manager of the MN may send the routing control request to the current mobile router of the MN. Subsequent procedures are the same as those in the foregoing several embodiments.

Alternatively, for example, the routing control request may be received by the home mobile router of the MN. In this case, the home mobile router of the MN is equivalent to the current mobile router of the MN, and all steps are the same as those in the foregoing several embodiments, except that it is unnecessary to establish a tunnel with the home mobile router of the MN.

Alternatively, for example, the routing control request may be received by the home location manager of the MN. After receiving the routing control request, the home location manager of the MN sends the routing control request to the home mobile router of the MN. Subsequent steps are the same as steps executed when the routing control request is received by the home mobile router of the MN.

Fourth Aspect of Embodiments

Figure 17:
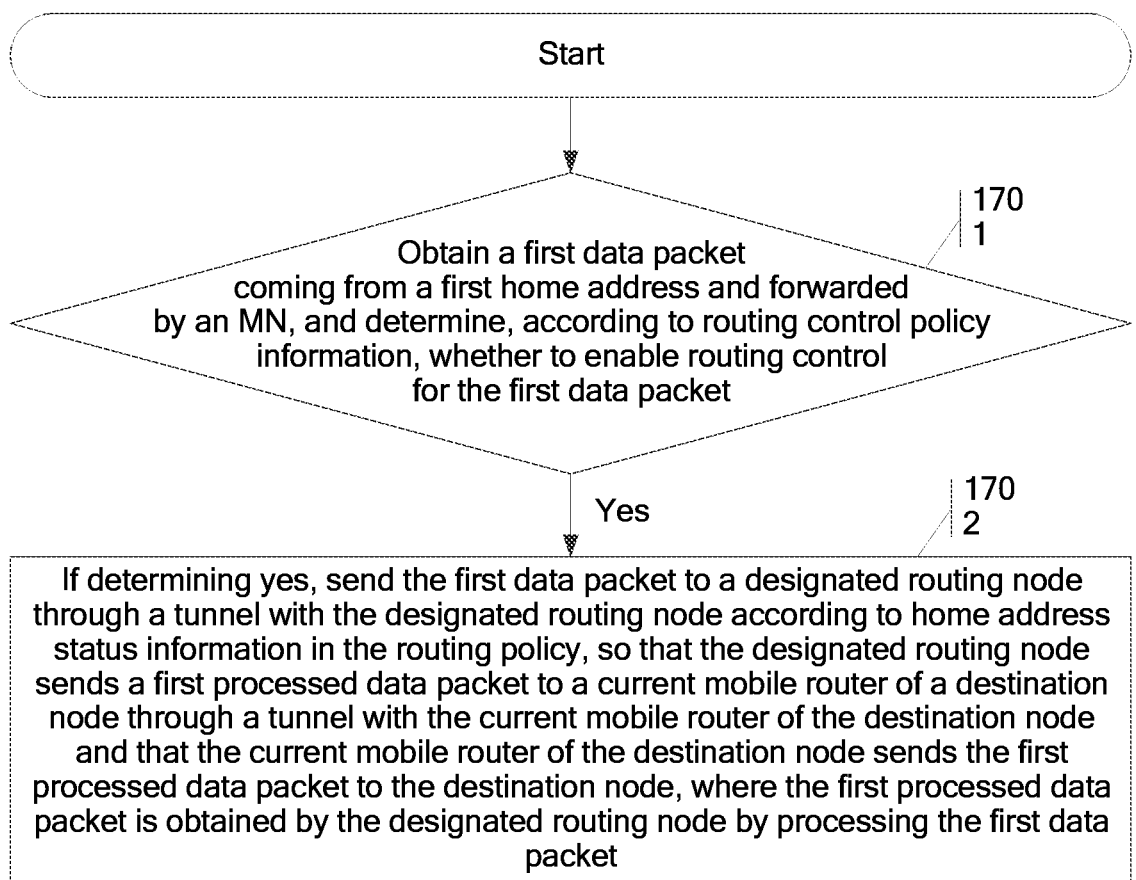
FIG. 17 is a main flowchart of a fourth data packet sending method according to an embodiment.

Referring to FIG. 17, an embodiment provides a data packet sending method. The method may be applied to a mobile router. Preferably, herein the mobile router is a mobile router of the MN. A main procedure of the method is as follows.

Step 1701: Obtain a first data packet coming from a first home address and forwarded by an MN, and determine, according to routing control policy information, whether to enable routing control for the first data packet, where the routing control policy information includes indication information about whether routing control is enabled, and in a case in which the indication information indicates that routing control is enabled, the routing control policy information further includes home address status information.

Step 1702: If a determining result is yes, send the first data packet to the designated routing node through a tunnel with the designated routing node according to the home address status information in the routing policy, so that the designated routing node sends a first processed data packet to a current mobile router of a destination node through a tunnel with the current mobile router of the destination node and that the current mobile router of the destination node sends the first processed data packet to the destination node, where the first processed data packet is obtained by the designated routing node by processing the first data packet.

Preferably, the embodiment is described from two perspectives, an IP granularity and an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the perspective of the IP granularity, the routing control policy information further includes a home address of the MN, and the indication information includes status information of the MN. That the routing control policy information includes home address status information may be specifically that the indication information includes the home address status information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

That is, in this case, both enabling routing control and disabling routing control are intended for a certain IP address, and specifically, intended for a certain home address of the MN.

Preferably, in the embodiment, the MN has one or more home addresses.

Preferably, in the embodiment, when described from the perspective of the MN granularity, the indication information includes status information of the MN.

In this case, if the status information of the MN indicates that routing control is enabled, the indication information indicates that routing control is enabled for all data packets of the MN.

In this case, if the status information of the MN indicates that routing control is disabled, the indication information indicates that routing control is disabled for all data packets of the MN.

That is, in this case, both enabling routing control and disabling routing control are intended for the MN.

Preferably, in the embodiment, in step 1702, the sending the first data packet to a designated routing node through a tunnel with the designated routing node may include detecting whether the tunnel with the designated routing node exists, and when detecting that the tunnel with the designated routing node exists, sending the first data packet to the designated routing node through the tunnel with the designated routing node, or when detecting that the tunnel with the designated routing node does not exist, establishing the tunnel with the designated routing node, and sending the first data packet to the designated routing node through the tunnel with the designated routing node.

That is, before the data packet is sent, whether the tunnel with the designated routing node exists may be first detected, and after it is determined that the tunnel exists, the data packet is sent. In this way, a packet loss may be avoided as much as possible.

Preferably, in the embodiment, before the obtaining a first data packet coming from a first home address and forwarded by an MN, the method may further include receiving a routing control request, where the routing control request includes the routing control policy information.

Preferably, in the embodiment, before step 1701, and after the routing control request is received, the method may further include if the indication information in the routing control policy information carried in the routing control request indicates that routing control is enabled, establishing the tunnel with the designated routing node according to the home address status information in the routing control policy information carried in the routing control request.

Preferably, in the embodiment, before step 1701, and after the tunnel is established with the designated routing node according to the home address status information in the routing control policy information carried in the routing control request, the method may further include sending a path switch instruction to the current mobile router of the destination node according to the indication information in the routing control policy information carried in the routing control request and an address of the current mobile router of the destination node, so that the current mobile router of the destination node establishes the tunnel between the current mobile router of the destination node and the designated routing node and that the current mobile router of the destination node releases a tunnel between the current mobile router of the destination node and a current mobile router of the mobile node. This may ensure that the data packet arrives at the current mobile router of the destination node through the designated routing node instead of directly arriving at the current mobile router of the destination node through normal optimized routing, and may ensure that the designated routing node can perform corresponding processing on the data packet.

Preferably, in the embodiment, after the routing control request is received, the method may further include, if the indication information in the routing control policy information carried in the routing control request indicates that routing control is disabled, releasing the tunnel with the designated routing node. This ensures that the data packet directly arrives at the current mobile router of the destination node through normal optimized routing without passing through the designated routing node.

Preferably, in the embodiment, after the routing control request is received, the method may further include forwarding the routing control request to a home location manager of the mobile node and a home mobile router of the mobile node, so that the home location manager of the mobile node and the home mobile router of the mobile node update locally stored information according to the information included in the routing control request.

Preferably, in the embodiment, after the first data packet is sent to the designated routing node through the tunnel with the designated routing node, the method may further include, if the indication information in the routing control policy information carried in the routing control request indicates that routing control is disabled, requesting to obtain the address of the current mobile router of the destination node from a home location manager of the destination node, and sending the path switch instruction to the current mobile router of the destination node, so that the current mobile router of the destination node establishes the tunnel between the current mobile router of the destination node and the current mobile router of the mobile node according to the path switch instruction.

Fifth Aspect of Embodiments

Figure 18:
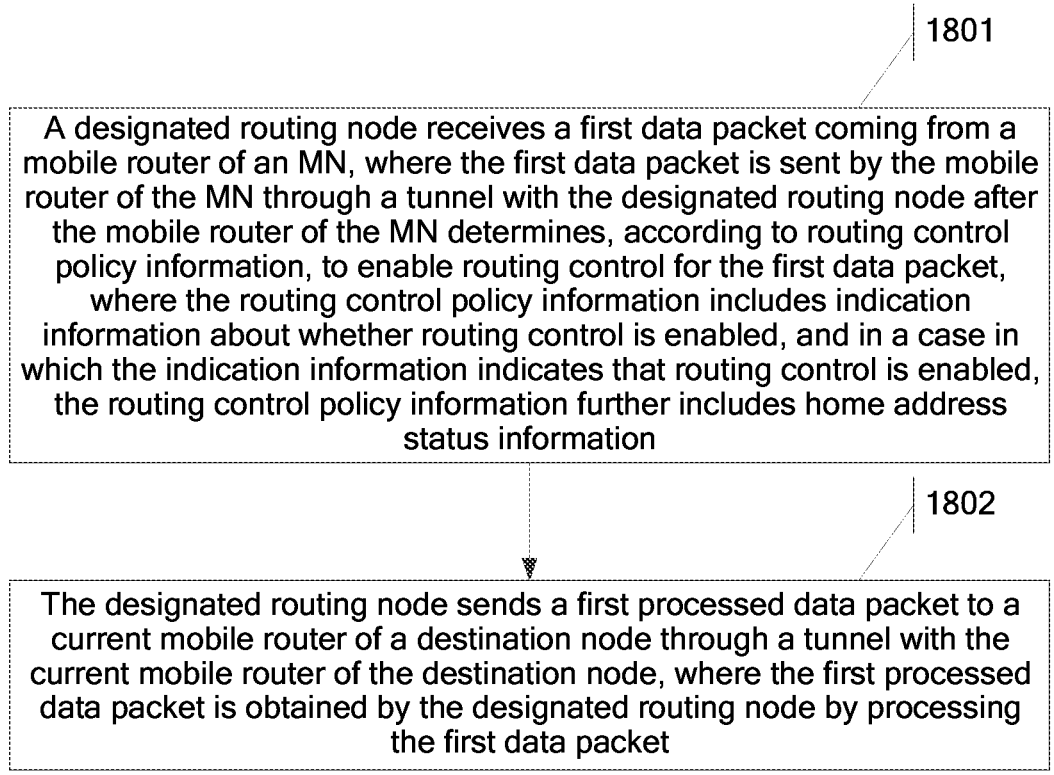
FIG. 18 is a main flowchart of a fifth data packet sending method according to an embodiment.

Referring to FIG. 18, an embodiment provides a data packet sending method. A main procedure of the method is as follows.

Step 1801: A designated routing node receives a first data packet coming from a mobile router of an MN, where the first data packet is sent by the mobile router of the MN through a tunnel with the designated routing node after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information.

Step 1802: The designated routing node sends a first processed data packet to a current mobile router of a destination node through a tunnel with the current mobile router of the destination node, where the first processed data packet is obtained by the designated routing node by processing the first data packet.

Preferably, in the embodiment, before the designated routing node receives the first data packet coming from the MN, the method may further include the designated routing node receives the routing control policy information sent by the mobile router of the MN, where the routing control policy information includes the indication information about whether routing control is enabled.

Preferably, in the embodiment, before the designated routing node receives the first data packet coming from the mobile router of the MN, the method may further include, if the indication information in the routing control policy information indicates that routing control is enabled, the designated routing node establishes the tunnel with the current mobile router of the destination node, and updates the routing control policy information to the current mobile router of the destination node.

Preferably, in the embodiment, after the designated routing node receives the routing control policy information sent by the mobile router of the MN, the method may further include, if the indication information in the routing control policy information indicates that routing control is disabled, the designated routing node releases the tunnel with the current mobile router of the destination node.

Preferably, in the embodiment, after the MN moves from a source mobile router to a target mobile router, the designated routing node releases a tunnel with the source mobile router.

For the two data packet sending methods in FIG. 17 and FIG. 18, the following describes several specific embodiments.

I. IP Granularity

Embodiment 13

Figure 19:
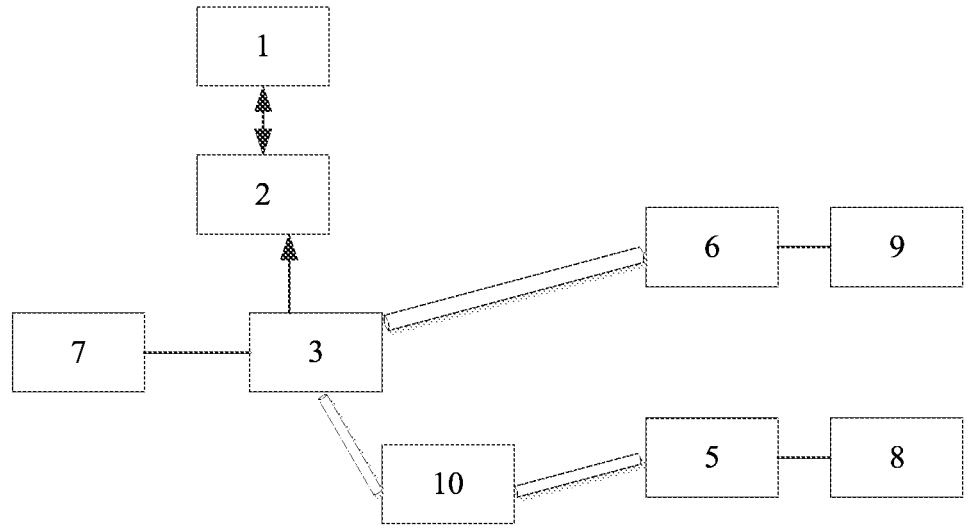
FIG. 19 is a third schematic diagram when routing control is enabled in an IP granularity according to an embodiment.

Referring to FIG. 19, the current mobile router of the MN receives the routing control request, where the routing control request includes the routing control policy information, where the routing control policy information includes parameters such as {MNID, MN_AnchorID1_Status_Open, HoA1, AnchorID1, and HoA1_AnchorID1_Status_Open}. The routing control request may be sent by an OAM, or a lawful interception entity, or another network element.

The current mobile router of the MN compares locally stored route optimization status data structure parameters with parameters (MNID, MN_AnchorID1_Status_Open, HoA1, AnchorID1, and HoA1_AnchorID1_Status_Open) in the routing control request. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the home mobile router of the MN.

The current mobile router of the MN forwards the routing control request to the home mobile router of the MN, and updates each parameter value in the routing control policy information to the home mobile router of the MN.

The home mobile router of the MN sends the routing control request to the home location manager of the MN, and updates each parameter value in the routing control policy information to the home location manager of the MN.

The current mobile router of the MN establishes a tunnel with the designated routing node according to values of MN_AnchorID1_Status_Open and HoA1_AnchorID1_Status_Open in the received routing control policy information, and at the same time updates each parameter in the routing control policy information to the designated routing node.

The designated routing node establishes a tunnel with the current mobile router of the destination node 1 according to values of MN_AnchorID1_Status_Open and HoA1_AnchorID1_Status_Open in the updated routing control policy information, and at the same time updates each parameter in the routing control policy information to the current mobile router of the destination node 1.

The current mobile router of the destination node 1 releases a tunnel with the current mobile router of the MN according to the values of MN_AnchorID1_Status_Open and HoA1_AnchorID1_Status_Open in the updated routing control policy information.

In this case, a data packet coming from the first home address is routed to the designated routing node, and then the designated routing node processes the data packet to obtain a processed data packet. The designated routing node sends the processed data packet to the current mobile router of the destination node 1, and the current mobile router of the destination node 1 sends the processed data packet to the destination node 1. However, a data packet coming from the second home address is not affected, and continues to be directly sent to the current mobile router of the destination node 2 through the current mobile router of the MN, and the current mobile router of the destination node 2 sends the data packet to the destination node 2.

Embodiment 14

Figure 20:
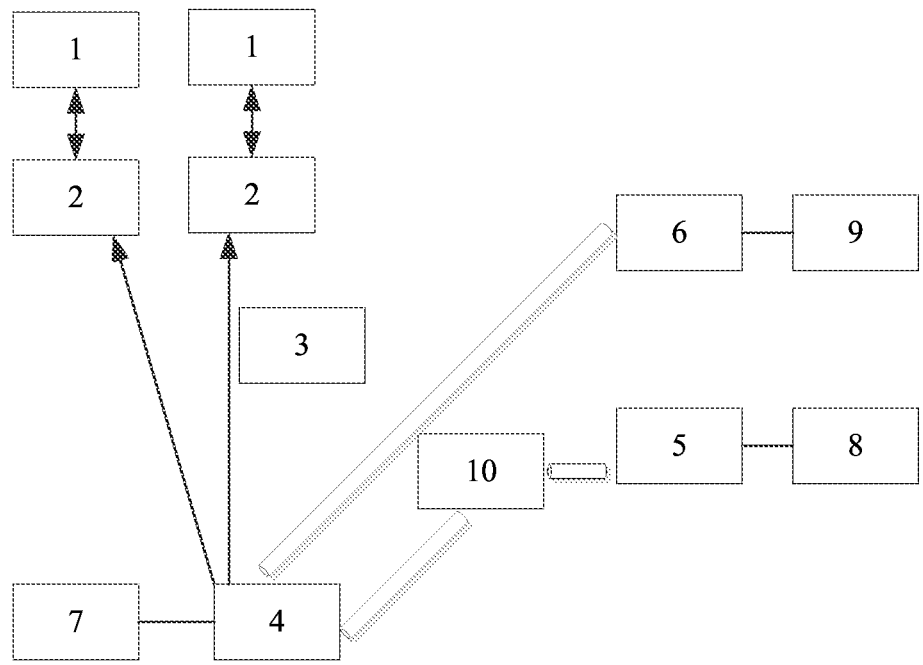
FIG. 20 is a third schematic diagram when routing control is enabled and an MN moves in an IP granularity according to an embodiment.

Referring to FIG. 20, when the MN moves and is attached to a Next-MR, the Next-MR may be referred to as the current mobile router of the MN. The current mobile router of the MN sends a location update (LU) message to the home location manager of the MN, where the LU message includes parameters such as (MNID, and address of the current mobile router of the MN), and updates information such as the address of the current mobile router of the MN to the home location manager of the MN.

The home location manager of the MN receives the LU message, and sends location acknowledgement (LUA) information to the current mobile router of the MN, where the LUA information includes the routing control policy information.

The current mobile router of the MN determines that the mobile router to which the MN is currently attached is the current mobile router of the MN, and establishes a tunnel with the home mobile router of the MN.

The home mobile router of the MN determines that the mobile router to which the MN is currently attached is the current mobile router of the MN, and releases a tunnel between the home mobile router of the MN and the mobile router to which the MN is previously attached.

The current mobile router of the MN establishes a tunnel between the current mobile router of the MN and the designated routing node according to values of MN_AnchorID1_Status_Open and HoA1_AnchorID1_Status_Open in the updated routing control policy information, and updates each parameter in the routing control policy information to the designated routing node.

The designated routing node determines that the MN is currently attached to the current mobile router of the MN and already leaves the mobile router to which the MN is previously attached. Therefore, the designated routing node releases a tunnel between the designated routing node and the mobile router to which the MN is previously attached.

In this case, a data packet coming from the first home address is routed to the designated routing node, and the designated routing node processes the data packet to obtain a processed data packet. The designated router sends the processed data packet to the current mobile router of the destination node 1 through the tunnel with the current mobile router of the destination node 1, and the current mobile router of the destination node 1 sends the processed data packet to the destination node 1. A data packet coming from the second home address is not affected, and still arrives at the current mobile router of the destination node 2 through an optimized tunnel between the current mobile router of the MN and the current mobile router of the destination node 2, and is sent by the current mobile router of the destination node 2 to the destination node 2.

Embodiment 15

Figure 21:
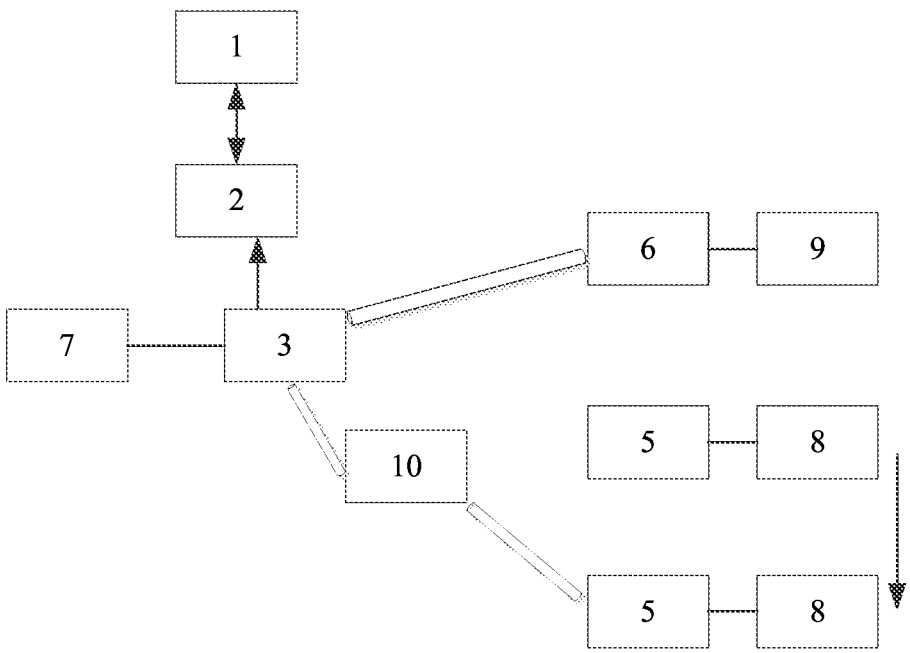
FIG. 21 is a third schematic diagram when routing control is enabled and a destination node moves in an IP granularity according to an embodiment.

Referring to FIG. 21, when the destination node 1 moves and is attached to a Next-MR, the Next-MR may be referred to as the current mobile router of the destination node 1.

The current mobile router of the destination node 1 learns an address of the home location manager of the MN according to uplink packet header information of the destination node 1 (a destination address is the first home address). The current mobile router of the destination node 1 requests routing control policy information of the first home address from the home location manager of the MN, where the routing control policy information includes {MNID, MN_AnchorID1_Status_Open, HoA1, AnchorID1, HoA1_AnchorID1_Status_Open, H-MR ID, and C-MR ID}.

The home location manager of the MN returns the routing control policy information.

The current mobile router of the destination node 1 establishes a tunnel between the designated routing node and the current mobile router of the destination node 1 according to status information of the learned home address.

The designated routing node releases a tunnel between the designated routing node and the mobile router to which the destination node 1 is previously attached.

In this case, a data packet coming from the first home address is still routed to the designated routing node, and after being processed by the designated routing node, arrives at the current mobile router of the destination node 1 through the tunnel between designated routing node and the current mobile router of the destination node 1.

Embodiment 16

Figure 22:
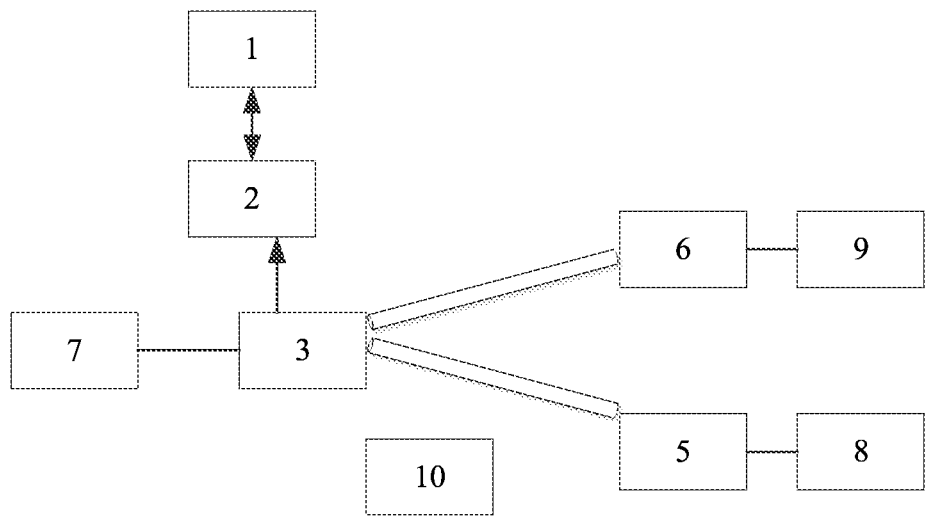
FIG. 22 is a third schematic diagram when routing control is disabled in an IP granularity according to an embodiment.

Referring to FIG. 22, the current mobile router of the MN receives the routing control request, where the routing control request includes the routing control policy information, where the routing control policy information includes parameters such as {MNID, MN_AnchorID1_Status_Open, HoA1, AnchorID1, and HoA1_AnchorID1_Status_Close}. The routing control request may be sent by an OAM, or a lawful interception entity, or another network element.

The current mobile router of the MN compares locally stored route optimization status data structure parameters with parameters (MNID, MN_AnchorID1_Status_Open, HoA1, AnchorID1, and HoA1_AnchorID1_Status_Close) in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the home mobile router of the MN.

The current mobile router of the MN sends the routing control request to the home mobile router of the MN, and updates each parameter in the routing control policy information to the home mobile router of the MN. The home mobile router of the MN sends the routing control request to the home location manager of the MN, and at the same time also updates each parameter in the routing control policy information to the home location manager of the MN.

The current mobile router of the MN determines that the routing control policy information indicates that routing control is disabled, and releases a tunnel with the designated routing node according to values of MN_AnchorID1_ Status_Open and HoA1_AnchorID1_Status_Close in the routing control policy information, and at the same time updates the routing control policy information to the designated routing node.

The designated routing node releases a tunnel between the designated routing node and the current mobile router of the destination node 1 according to the values of MN_AnchorID1_Status_Open and HoA1_AnchorID1_ Status_Close in the updated routing control policy information.

After the tunnel between the designated routing node and the current mobile router of the destination node 1 is released, the current mobile router of the MN receives a first data packet coming from the first home address, learns an address of the home location manager of the destination node 1 according to a destination address (namely, a home address of the destination node 1) in the data packet, and obtains an address of the current mobile router of the destination node 1 by requesting the home location manager of the destination node 1. Afterward, the current mobile router of the MN establishes an optimized tunnel with the current mobile router of the destination node 1.

Afterward, data coming from the first home address arrives at the destination node 1 through the optimized tunnel between the current mobile router of the MN and the current mobile router of the destination node 1, but data coming from the second home address is not affected.

Embodiment 17

Still referring to FIG. 19, the current mobile router of the MN receives the routing control request, where the routing control request includes the routing control policy information, where the routing control policy information includes parameters such as {MNID, MN_AnchorID1_Status_Open, HoA1, AnchorID1, and HoA1_AnchorID1_Status_Open}. The routing control request may be sent by an OAM, or a lawful interception entity, or another network element.

The current mobile router of the MN compares locally stored route optimization status data structure parameters with parameters (MNID, MN_AnchorID1_Status_Open, HoA1, AnchorID1, and HoA1_AnchorID1_Status_Open) in the routing control request. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the home mobile router of the MN.

The current mobile router of the MN forwards the routing control request to the home mobile router of the MN, and updates each parameter value in the routing control policy information to the home mobile router of the MN.

The home mobile router of the MN sends the routing control request to the home location manager of the MN, and updates each parameter value in the routing control policy information to the home location manager of the MN.

The current mobile router of the MN establishes a tunnel with the designated routing node according to values of MN_AnchorID1_Status_Open and HoA1_AnchorID1_Status_Open in the received routing control policy information, and at the same time updates each parameter in the routing control policy information to the designated routing node.

The designated routing node receives a first data packet coming from the first home address, learns an address of the home location manager of the destination node 1 according to the first home address, and obtains an address of the current mobile router of the destination node 1 by requesting the current location manager of the destination node 1.

The designated routing node establishes a tunnel between the designated routing node and the current mobile router of the destination node 1 according to values of MN_AnchorID1_Status_Open and HoA1_AnchorID1_Status_Open in the updated routing control policy information and the obtained address of the current mobile router of the destination node 1, and at the same time updates each parameter in the routing control policy information to the current mobile router of the destination node 1.

The current mobile router of the destination node 1 releases a tunnel with the current mobile router of the MN according to the values of MN_AnchorID1_Status_Open and HoA1_AnchorID1_Status_Open in the updated routing control policy information.

In this case, a data packet coming from the first home address is routed to the designated routing node, and then the designated routing node processes the data packet to obtain a processed data packet. The designated routing node sends the processed data packet to the current mobile router of the destination node 1, and the current mobile router of the destination node 1 sends the processed data packet to the destination node 1. However, a data packet coming from the second home address is not affected, and continues to be directly sent to the current mobile router of the destination node 2 through the current mobile router of the MN, and the current mobile router of the destination node 2 sends the data packet to the destination node 2.

A case in which the MN moves is similar to that in Embodiment 14, and is not further described.

A case in which the destination node 1 moves is similar to that in Embodiment 15, and is not further described.

Embodiment 18

Still referring to FIG. 22, the current mobile router of the MN receives the routing control request, where the routing control request includes the routing control policy information, where the routing control policy information includes parameters such as {MNID, MN_AnchorID1_Status_Open, HoA1, AnchorID1, and HoA1_AnchorID1_Status_Close}. The routing control request may be sent by an OAM, or a lawful interception entity, or another network element.

The current mobile router of the MN compares locally stored route optimization status data structure parameters with parameters (MNID, MN_AnchorID1_Status_Open, HoA1, AnchorID1, and HoA1_AnchorID1_Status_Close) in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the home mobile router of the MN.

The current mobile router of the MN sends the routing control request to the home mobile router of the MN, and updates each parameter in the routing control policy information to the home mobile router of the MN. The home mobile router of the MN sends the routing control request to the home location manager of the MN, and at the same time also updates each parameter in the routing control policy information to the home location manager of the MN.

The current mobile router of the MN receives a first data packet coming from the first home address, and requests to obtain an address of the current mobile router of the destination node 1 from the home location manager of the destination node 1 according to values of MN_AnchorID1_Status_Open and HoA1_AnchorID1_Status_Close in the routing control policy information.

The current mobile router of the MN determines that the routing control policy information indicates that routing control is disabled, and releases a tunnel with the designated routing node according to values of MN_AnchorID1_Status_Open and HoA1_AnchorID1_Status_Close in the routing control policy information, and at the same time updates the routing control policy information to the designated routing node.

That the current mobile router of the MN receives a first data packet coming from the first home address, and requests to obtain an address of the current mobile router of the destination node 1 from the home location manager of the destination node 1 according to values of MN_AnchorID1_Status_Open and HoA1_AnchorID1_Status_Close in the routing control policy information, and that the current mobile router of the MN determines that the routing control policy information indicates that routing control is disabled, and releases a tunnel with the designated routing node according to values of MN_AnchorID1_Status_Open and HoA1_AnchorID1_Status_Close in the routing control policy information, and at the same time updates the routing control policy information to the designated routing node, may be performed according to a random sequence.

The current mobile router of the MN sends a path switch instruction to the current mobile router of the destination node 1, where the path switch instruction includes (MNID, HoA1, destination node 1 C-MR ID, MN C-MR ID, Tunnel_Status_Setup, AnchorID1, and Tunnel_Status_Release). Destination node 1 C-MR ID indicates an identifier of the current mobile router of the destination node 1, MN C-MR ID indicates an identifier of the current mobile router of the MN, and Tunnel_Status indicates tunnel status information.

The current mobile router of the destination node 1 establishes a tunnel between the current mobile router of the destination node 1 and the current mobile router of the MN according to parameters such as (destination node 1 C-MR ID, MN C-MR ID, and Tunnel_Status_Setup).

The current mobile router of the destination node 1 determines that routing control is disabled, and releases a tunnel between the current mobile router of the destination node 1 and the designated routing node according to parameters such as (AnchorID1, destination node C-MR ID, and Tunnel_Status_Release).

Afterward, a data packet coming from the first home address is directly sent to the current mobile router of the destination node 1 through the optimized tunnel between the current mobile router of the MN and the current mobile router of the destination node 1, and is sent by the current mobile router of the destination node 1 to the destination node 1, but a data packet coming from the second home address is not affected.

In all embodiments, a home address wherever mentioned is a home address of the MN if who owns the home address is not further specified.

Embodiment 19

Still referring to FIG. 19, the current mobile router of the MN receives the routing control request, where the routing control request includes the routing control policy information, where the routing control policy information includes parameters such as {MNID, MN_AnchorID1_Status_Open, HoA1, AnchorID1, and HoA1_AnchorID1_Status_Open}. The routing control request may be sent by an OAM, or a lawful interception entity, or another network element.

The current mobile router of the MN compares locally stored route optimization status data structure parameters with parameters (MNID, MN_AnchorID1_Status_Open, HoA1, AnchorID1, and HoA1_AnchorID1_Status_Open) in the routing control request. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the home mobile router of the MN.

The current mobile router of the MN forwards the routing control request to the home mobile router of the MN, and updates each parameter value in the routing control policy information to the home mobile router of the MN.

The home mobile router of the MN sends the routing control request to the home location manager of the MN, and updates each parameter value in the routing control policy information to the home location manager of the MN.

The current mobile router of the MN establishes a tunnel between the current mobile router of the MN and the designated routing node according to values of MN_AnchorID1_Status_Open and HoA1_AnchorID1_Status_Open in the routing control policy information.

The current mobile router of the MN sends a path switch instruction to the current mobile router of the destination node 1 according to the values of MN_AnchorID1_Status_Open and HoA1_AnchorID1_Status_Open in the routing control policy information and an address of the current mobile router of the destination node 1, where the path switch instruction includes parameters such as (MNID, HoA1, AnchorID1, destination node 1 C-MR ID, Tunnel_Status_Setup, destination node 1 C-MR ID, MN C-MR ID, and Tunnel_Status_Release).

The current mobile router of the destination node 1 establishes a tunnel with the designated routing node according to parameters such as (AnchorID1, destination node 1 C-MR ID, and Tunnel_Status_Setup).

At the same time, the current mobile router of the destination node 1 releases a tunnel between the current mobile router of the destination node 1 and the current mobile router of the MN according to parameters such as (destination node 1 C-MR ID, MN C-MR ID, and Tunnel_Status_Release).

A case in which the MN moves is similar to that in Embodiment 14 and is not further described.

A case in which the destination node 1 moves is similar to that in Embodiment 15 and is not further described.

A case in which routing control is disabled is similar to that in Embodiment 18 and is not further described.

II. MN Granularity

Embodiment 20

Figure 23:
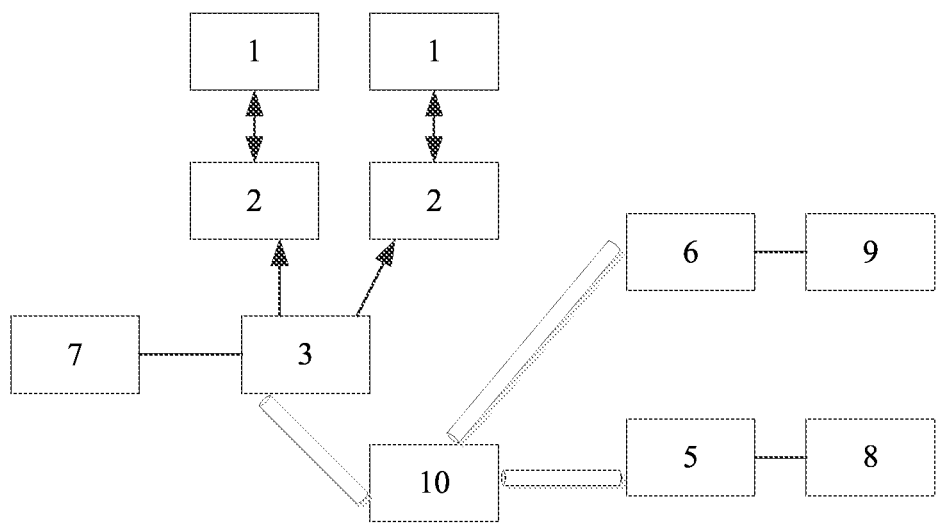
FIG. 23 is a third schematic diagram when routing control is enabled in an MN granularity according to an embodiment.

Referring to FIG. 23, in all embodiments with the MN granularity, the MN may have multiple addresses, and generally two home addresses are used for description.

The current mobile router of the MN receives the routing control request, where the routing control request includes the routing control policy information, where the routing control policy information includes parameters such as {MNID, MN_AnchorID1_Status_Close, and AnchorID1}. The routing control request may be sent by an OAM, or a lawful interception entity, or another network element.

The current mobile router of the MN compares locally stored route optimization status data structure parameters with parameters (MNID, MN_AnchorID1_Status_Close, and AnchorID1) in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the first home mobile router of the MN and the second home mobile router of the MN.

The current mobile router of the MN forwards the routing control request to the first home mobile router of the MN and the second home mobile router of the MN, and updates each parameter value in the routing control policy information to the first home mobile router of the MN and the second home mobile router of the MN.

The first home mobile router of the MN and the second home mobile router of the MN respectively send the routing control request to the first home location manager of the MN and the second home location manager of the MN, and update each parameter value in the routing control policy information to the first home location manager of the MN and the second home location manager of the MN.

The current mobile router of the MN establishes a tunnel between the current mobile router of the MN and the designated routing node according to values of MN_AnchorID1_Status_Close and AnchorID1 in the received routing control policy information, and updates each parameter in the routing control policy information to the designated routing node.

The designated routing node establishes a tunnel between the designated routing node and the current mobile router of the destination node 1 according to values of MN_AnchorID1_Status_Close and destination node 1 C-MR ID in the routing control policy information.

When receiving a first data packet coming from the second home address, the designated routing node requests to acquire an address of the current mobile router of the destination node 2 through the home location manager of the destination node 2, establishes a tunnel between the designated routing node and the current mobile router of the destination node 2 according to a value of MN_AnchorID1_Status_Close in the routing control policy information, and at the same time updates each parameter in the routing control policy information to the designated routing node.

The designated routing node establishes a tunnel between the designated routing node and the current mobile router of the destination node 2 according to values of MN_AnchorID1_Status_Close and destination node 2 C-MR ID in the routing control policy information.

After establishing the tunnel with the designated routing node, the current mobile router of the destination node 1 releases a tunnel between the current mobile router of the destination node 1 and the current mobile router of the MN according to the value of MN_AnchorID1_Status_Close in the routing control policy information.

After establishing the tunnel with the designated routing node, the current mobile router of the destination node 2 releases a tunnel between the current mobile router of the destination node 2 and the current mobile router of the MN according to the value of MN_AnchorID1_Status_Close in the routing control policy information.

In this case, all data packets coming from the first home address and the second home address are routed to the designated routing node, and then after being processed by the designated routing node, processed data packets are sent to the destination node 1 and the destination node 2 through different tunnels respectively.

Embodiment 21

Figure 24:
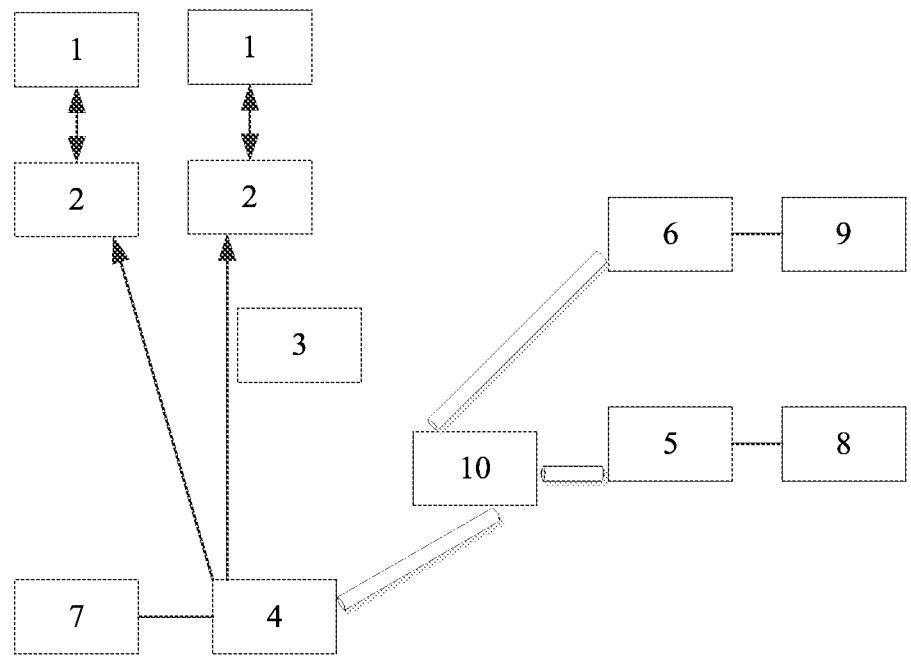
FIG. 24 is a third schematic diagram when routing control is enabled and an MN moves in an MN granularity according to an embodiment.

Referring to FIG. 24, when the MN moves and is attached to a Next-MR, the Next-MR may be referred to as the current mobile router of the MN. The current mobile router of the MN sends a location update (LU) message to the first home location manager of the MN and the second home location manager of the MN, where the LU message includes parameters such as (MNID, and address of the current mobile router of the MN), and updates information such as the address of the current mobile router to which the MN is currently attached, to the first home location manager of the MN and the second home location manager of the MN.

The first home location manager of the MN and the second home location manager of the MN receive the LU message, and respectively return location acknowledgement (LUA) information, where the LUA information includes the routing control policy information, and at the same time update the routing control policy information to the current mobile router of the MN.

The current mobile router of the MN establishes a tunnel between the current mobile router of the MN and the first home mobile router of the MN and a tunnel between the current mobile router of the MN and the second home mobile router of the MN respectively.

The first home mobile router of the MN and the second home mobile router of the MN respectively release a tunnel between the first home mobile router of the MN and the current mobile router of the MN and a tunnel between the second home mobile router of the MN and the current mobile router of the MN.

The current mobile router of the MN establishes a tunnel between the current mobile router of the MN and the designated routing node according to a value of MN_AnchorID1_Status_Close in the routing control policy information, and updates the routing control policy information to the designated routing node.

The designated routing node determines that the MN is currently attached to the current mobile router of the MN and already leaves the mobile router to which the MN is previously attached. Therefore, the designated routing node releases a tunnel between the designated routing node and the current mobile router of MN.

In this case, all data packets passing through the MN are routed to the designated routing node. After being processed by the designated routing node, processed data packets from the first home address arrive at the current mobile router of the destination node 1 through the designated routing node, and finally arrive at the destination node 1, processed data packets from the second home address arrive at the current mobile router of the destination node 2 through the designated routing node, and finally arrive at the destination node 2.

Embodiment 22

Figure 25:
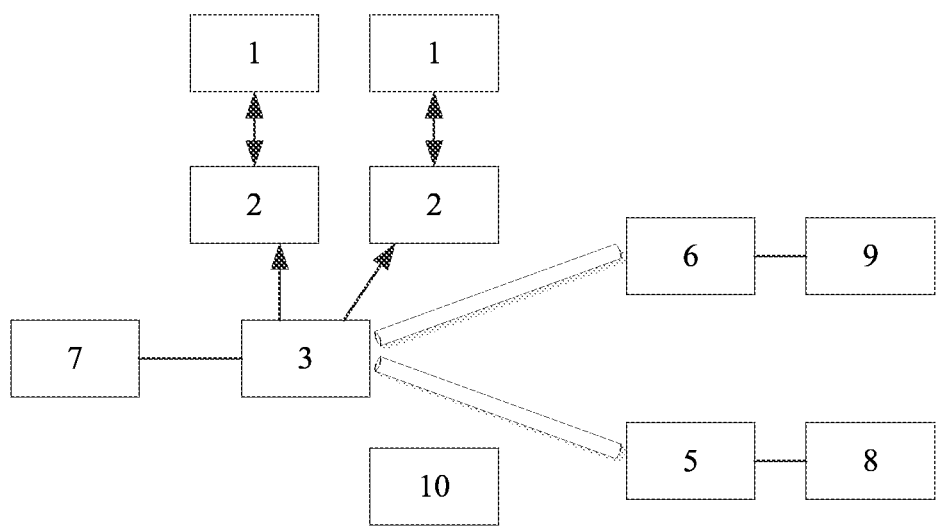
FIG. 25 is a third schematic diagram when routing control is disabled in an MN granularity according to an embodiment.

Referring to FIG. 25, the current mobile router of the MN receives the routing control request, where the routing control request includes the routing control policy information, where the routing control policy information includes parameters such as {MNID and MN_AnchorID1_ Status_Open}. The routing control request may be sent by an OAM, or a lawful interception entity, or another network element.

The current mobile router of the MN compares locally stored route optimization status data structure parameters with parameters (MNID and MN_AnchorID1_ Status_Open) in the routing control policy information. If they are consistent, the routing control request is ignored. If they are inconsistent, the routing control policy information is updated to the current mobile router of the MN. Afterward, the current mobile router of the MN performs authentication, and if the authentication succeeds, sends the routing control request to the home mobile router of the MN.

The current mobile router of the MN sends the routing control request to the first home mobile router of the MN and the second home mobile router of the MN, and updates the routing control policy information to the first home mobile router of the MN and the second home mobile router of the MN.

The first home mobile router of the MN and the second home mobile router of the MN update the routing control policy information to the first home location manager of the MN and the second home location manager of the MN respectively.

The current mobile router of the MN determines, according to a value of MN_AnchorID1_Status_Open in the routing control policy information, to disable routing control, releases a tunnel with the designated routing node, and at the same time updates the routing control policy information to the designated routing node.

The designated routing node releases a tunnel between the designated routing node and the current mobile router of the destination node 1 and a tunnel between the designated routing node and the current mobile router of the destination node 2 respectively according to the value of MN_AnchorID1_Status_Open in the updated routing control policy information.

After the tunnels are released, the current mobile router of the MN receives a first data packet sent from the first home address. In this case, the MN determines the value of MN_AnchorID1_Status_Open in the routing control policy information, learns an address of the home location manager of the destination node 1 according to a destination address (namely, a home address of the destination node 1) in the data packet, and obtains an address of the current mobile router of the destination node 1 by sending a request to the home location manager of the destination node 1. Afterward, the current mobile router of the MN establishes an optimized tunnel with the current mobile router of the destination node 1.

When the current mobile router of the MN receives a first data packet from the second home address, processing is the same as that of the data packet from the first home address.

Afterward, the data packet coming from the first home address is directly sent to the current mobile router of the destination node 1 through the optimized tunnel between the current mobile router of the MN and the current mobile router of the destination node 1, and is sent by the current mobile router of the destination node 1 to the destination node 1. The data packet coming from the second home address is directly sent to the current mobile router of the destination node 2 through the optimized tunnel between the current mobile router of the MN and the current mobile router of the destination node 2, and is sent by the current mobile router of the destination node 2 to the destination node 2.

After the MN moves, a procedure is consistent with that of route optimization of DMM, after the destination node 1 or the destination node 2 moves, a process is similar to that of Embodiment 15 and is not further described.

Embodiment 23

Still referring to FIG. 23, in all embodiments with the MN granularity, the MN may have multiple addresses, and generally two home addresses are used for description.

The current mobile router of the MN receives the routing control request, where the routing control request includes the routing control policy information, where the routing control policy information includes parameters such as {MNID, MN_AnchorID1_Status_Close, and AnchorID1}. The routing control request may be sent by an OAM, or a lawful interception entity, or another network element.

The current mobile router of the MN compares locally stored route optimization status data structure parameters with parameters (MNID, MN_AnchorID1_Status_Close, and AnchorID1) in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the first home mobile router of the MN and the second home mobile router of the MN.

The current mobile router of the MN forwards the routing control request to the first home mobile router of the MN and the second home mobile router of the MN, and updates each parameter value in the routing control policy information to the first home mobile router of the MN and the second home mobile router of the MN.

The current mobile router of the MN establishes a tunnel between the current mobile router of the MN and the designated routing node according to MN_AnchorID1_Status_Close and AnchorID1 in the routing control policy information, and updates the routing control policy information to the designated routing node.

The designated routing node learns, according to MN_AnchorID1_Status_Close in the updated routing control policy information, an address of the home location manager of the destination node 1 according to the first home address when the designated routing node receives a first data packet coming from the first home address, and obtains an address of the current mobile router of the destination node 1 by sending a request to the current location manager of the destination node 1.

When receiving a first data packet coming from the second home address, the designated routing node learns an address of the home location manager of the destination node 2 according to the second home address, and obtains an address of the current mobile router of the destination node 2 by sending a request to the current location manager of the destination node 2.

The designated routing node establishes a tunnel between the designated routing node and the current mobile router of the destination node 1 according to MN_AnchorID1_Status_Close in the updated routing control policy information and the obtained address of the current mobile router of the destination node 1.

The designated routing node establishes a tunnel between the designated routing node and the current mobile router of the destination node 2 according to MN_AnchorID1_Status_Close in the updated routing control policy information and the obtained address of the current mobile router of the destination node 2.

After establishing the tunnel with the designated routing node, the current mobile router of the destination node 1 releases a tunnel between the current mobile router of the destination node 1 and the current mobile router of the MN according to MN_AnchorID1_Status_Close in the routing control policy information.

In this case, all data packets coming from the first home address and the second home address are routed to the designated routing node, and after being processed by the designated routing node, obtained processed data packets are sent to the destination node 1 and the destination node 2 through different tunnels respectively.

When the MN moves, processing is similar to that in Embodiment 21 and is not further described.

Embodiment 24

Still referring to FIG. 25, the current mobile router of the MN receives the routing control request, where the routing control request includes the routing control policy information, where the routing control policy information includes parameters such as {MNID and MN_AnchorID1_ Status_Open}. The routing control request may be sent by an OAM, or a lawful interception entity, or another network element. In this case, the routing control policy information indicates that routing control is disabled.

The current mobile router of the MN compares locally stored route optimization status data structure parameters with parameters (MNID and MN_AnchorID1_Status_Open) in the routing control policy information. If they are consistent, the routing control request is ignored. If they are inconsistent, the routing control policy information is updated to the current mobile router of the MN. Afterward, the current mobile router of the MN performs authentication, and if the authentication succeeds, sends the routing control request to the home mobile router of the MN.

The current mobile router of the MN sends the routing control request to the first home mobile router of the MN and the second home mobile router of the MN, and updates the routing control policy information to the first home mobile router of the MN and the second home mobile router of the MN.

The first home mobile router of the MN and the second home mobile router of the MN update the routing control policy information to the first home location manager of the MN and the second home location manager of the MN respectively.

The current mobile router of the MN determines, according to a value of MN_AnchorID1_Status_Open in the routing control policy information, to disable routing control, releases a tunnel with the designated routing node, and at the same time updates the routing control policy information to the designated routing node.

When receiving a first data packet coming from the first home address and sent by the MN, the current mobile router of the MN acquires, according to an identifier MN_AnchorID1_Status_Open in the routing control policy information, an address of the current mobile router of the destination node 1 by sending a request to the home location manager of the destination node 1.

When receiving a first data packet coming from the second home address and sent by the MN, the current mobile router of the MN acquires an address of the current mobile router of the destination node 2 by sending a request to the home location manager of the destination node 2.

When receiving the address of the current mobile router of the destination node 1, the current mobile router of the MN sends a path switch instruction to the current mobile router of the destination node 1 according to the identifier MN_AnchorID1_Status_Open in the routing control policy information, where the path switch instruction includes parameters such as (MNID, HoA1, destination node 1 C-MR ID, MN C-MR ID, Tunnel_Status_Setup, AnchorID1, destination node 1 C-MR ID, and Tunnel_Status_Release).

The current mobile router of the destination node 1 establishes a tunnel between the current mobile router of the destination node 1 and the current mobile router of the MN according to parameters such as (destination node 1 C-MR ID, MN C-MR ID, and Tunnel_Status_Setup).

When receiving the address of the current mobile router of the destination node 2, the current mobile router of the MN sends a path switch instruction to the current mobile router of the destination node 2, where the path switch instruction includes parameters such as (MNID, HoA2, destination node 2 C-MR ID, MN C-MR ID, Tunnel_Status_Setup, AnchorID1, destination node C-MR ID, and Tunnel_Status_Release).

The current mobile router of the destination node 2 establishes a tunnel between the current mobile router of the destination node 2 and the current mobile router of the MN according to parameters such as (destination node 2 C-MR ID, MN C-MR ID, and Tunnel_Status_Setup).

The current mobile router of the destination node 1 releases a tunnel between the current mobile router of the destination node 1 and the designated routing node according to parameters such as (AnchorID1, destination node 1 C-MR ID, and Tunnel_Status_Release).

The current mobile router of the destination node 2 releases a tunnel between the current mobile router of the destination node 2 and the designated routing node according to parameters such as (AnchorID1, destination node 2 C-MR ID, and Tunnel_Status_Release).

Embodiment 25

Still referring to FIG. 23, the current mobile router of the MN receives the routing control request, where the routing control request includes the routing control policy information, where the routing control policy information includes parameters such as {MNID, MN_AnchorID1_Status_Close, and AnchorID1}. The routing control request may be sent by an OAM, or a lawful interception entity, or another network element.

The current mobile router of the MN compares locally stored route optimization status data structure parameters with parameters (MNID, MN_AnchorID1_Status_Close, and AnchorID1) in the routing control policy information. If they are consistent, the routing control request is ignored. If they are inconsistent, each parameter in the routing control policy information is updated to the current mobile router of the MN. Afterward, the current mobile router of the MN performs authentication, and if the authentication succeeds, sends the routing control request to the first home mobile router of the MN and the second home mobile router of the MN.

The current mobile router of the MN forwards the routing control request to the first home mobile router of the MN and the second home mobile router of the MN, and updates each parameter value in the routing control policy information to the first home mobile router of the MN and the second home mobile router of the MN.

The first home mobile router of the MN and the second home mobile router of the MN respectively send the routing control request to the first home location manager of the MN and the second home location manager of the MN, and update each parameter value in the routing control policy information to the first home location manager of the MN and the second home location manager of the MN.

The current mobile router of the MN establishes a tunnel between the current mobile router of the MN and the designated routing node according to a value of MN_AnchorID1_Status_Close in the received routing control policy information.

For a data packet coming from the first home address, the current mobile router of the MN sends a path switch instruction to the current mobile router of the destination node 1 according to MN_AnchorID1_Status_Close in the routing control policy information and an address of the current mobile router of the destination node 1, where the path switch instruction includes parameters such as (MNID, HoA1, AnchorID1, destination node 1 C-MR ID, Tunnel_Status_Setup, destination node 1 C-MR ID, MN C-MR ID, and Tunnel_Status_Release).

For a data packet coming from the second home address, when there is no tunnel between the current mobile router of the MN and the current mobile router of the destination node 2, the current mobile router of the MN first acquires an address of the current mobile router of the destination node 2 through the home location manager of the destination node 2, and then sends a path switch instruction to the current mobile router of the destination node 2 according to MN_AnchorID1_Status_Close and the address of the current mobile router of the destination node 2, where the path switch instruction includes parameters such as (MNID, HoA2, AnchorID1, destination node 2 C-MR ID, Tunnel_Status_Setup, destination node 1 C-MR ID, MN C-MR ID, and Tunnel_Status_Release).

For the data packet coming from the first home address, the current mobile router of the destination node 1 establishes a tunnel between the current mobile router of the destination node 1 and the designated routing node according to parameters such as (AnchorID1, destination node 1 C-MR ID, and Tunnel_Status_Setup), and at the same time, the current mobile router of the destination node 1 releases a tunnel between the current mobile router of the destination node 1 and the current mobile router of the MN according to parameters such as (destination node 1 C-MR ID, MN C-MR ID, and Tunnel_Status_Release).

For the data packet coming from the second home address, the current mobile router of the destination node 2 establishes a tunnel between the current mobile router of the destination node 2 and the designated routing node according to parameters such as (AnchorID1, destination node 2 C-MR ID, and Tunnel_Status_Setup). Because there is no tunnel between the current mobile router of the destination node 2 and the current mobile router of the MN, parameters such as (destination node 1 C-MR ID, MN C-MR ID, and Tunnel_Status_Release) are ignored.

When the MN moves, processing is similar to that in Embodiment 21 and is not further described.

When routing control is disabled, processing is similar to that in Embodiment 24 and is not further described.

In the foregoing several embodiments, an example in which the current mobile router of the MN receives the routing control request is used. It should be noted that, the routing control request may also be received by another network node, for example, the current location manager of the MN. After receiving the routing control request, the current location manager of the MN may send the routing control request to the current mobile router of the MN. Subsequent procedures are the same as those in the foregoing several embodiments.

Alternatively, for example, the routing control request may be received by the home mobile router of the MN. In this case, the home mobile router of the MN is equivalent to the current mobile router of the MN, and all steps are the same as those in the foregoing several embodiments, except that it is unnecessary to establish a tunnel with the home mobile router of the MN.

Alternatively, for example, the routing control request may be received by the home location manager of the MN. After receiving the routing control request, the home location manager of the MN sends the routing control request to the home mobile router of the MN. Subsequent steps are the same as steps executed when the routing control request is received by the home mobile router of the MN.

Based on a same idea as the method embodiments, the following describes apparatus embodiments.

Sixth Aspect of Embodiments

Figure 26:
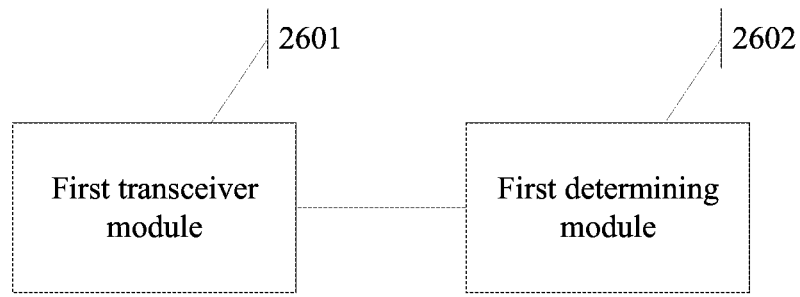
FIG. 26 is a structural diagram of a mobile router serving an MN according to an embodiment.

Referring to FIG. 26, an embodiment provides a mobile router. The mobile router is a mobile router of the MN. The mobile router may include a first transceiver module 2601 and a first determining module 2602.

The first transceiver module 2601 may be configured to obtain a first data packet coming from a first home address and forwarded by a mobile node MN, if a determining result is yes, send the first data packet to the designated routing node through a tunnel with the designated routing node according to home address status information in the routing policy information, and obtain a first processed data packet returned by the designated routing node, and send the first processed data packet to a current mobile router of a destination node, so that the current mobile router of the destination node sends the first processed data packet to the destination node, where the first processed data packet is obtained by the designated routing node by processing the first data packet.

The first determining module 2602 may be configured to determine, according to the routing control policy information, whether to enable routing control for the first data packet, where the routing control policy information includes indication information about whether routing control is enabled, and in a case in which the indication information indicates that routing control is enabled, the routing control policy information further includes the home address status information.

Preferably, the embodiment is described from two perspectives, an IP (Internet Protocol) granularity and an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the perspective of the IP granularity, the routing control policy information further includes a home address of the MN, and the indication information includes status information of the MN. That the routing control policy information includes home address status information may be specifically that the indication information includes the home address status information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

That is, in this case, both enabling routing control and disabling routing control are intended for a certain IP address, and specifically, intended for a certain home address of the MN.

Preferably, in the embodiment, the MN has one or more home addresses.

Preferably, in the embodiment, when described from the perspective of the MN granularity, the indication information includes status information of the MN.

In this case, if the status information of the MN indicates that routing control is enabled, the indication information indicates that routing control is enabled for all data packets of the MN.

In this case, if the status information of the MN indicates that routing control is disabled, the indication information indicates that routing control is disabled for all data packets of the MN.

That is, in this case, both enabling routing control and disabling routing control are intended for the MN.

Preferably, in the embodiment, the first transceiver module 2601 may be specifically configured to detect whether the tunnel with the designated routing node exists, and when detecting that the tunnel with the designated routing node exists, send the first data packet to the designated routing node through the tunnel with the designated routing node, or when detecting that the tunnel with the designated routing node does not exist, establish the tunnel with the designated routing node, and send the first data packet to the designated routing node through the tunnel with the designated routing node.

Preferably, in the embodiment, the first transceiver module 2601 may be specifically configured to determine whether the tunnel with the current mobile router of the destination node is established, and if the tunnel with the current mobile router of the destination node is established, send the first processed data packet to the current mobile router of the destination node through the tunnel with the current mobile router of the destination node, or if the tunnel with the current mobile router of the destination node is not established, establish the tunnel with the current mobile router of the destination node, and send the first processed data packet to the current mobile router of the destination node through the tunnel with the current mobile router of the destination node.

Preferably, in the embodiment, the first transceiver module 2601 may be further configured to receive a routing control request, where the routing control request includes the routing control policy information.

Preferably, in the embodiment, the mobile router may further include a first establishing module, which may be configured to, if the indication information in the routing control policy information carried in the routing control request indicates that routing control is enabled, establish the tunnel with the designated routing node according to the home address status information in the routing control policy information carried in the routing control request.

Preferably, in the embodiment, the mobile router may further include a first releasing module, which may be configured to, if the indication information in the routing control policy information carried in the routing control request indicates that routing control is disabled, release the tunnel with the designated routing node.

Preferably, in the embodiment, the first transceiver module 2601 may be further configured to forward the routing control request to a home location manager of the mobile node and a home mobile router of the mobile node, so that the home location manager of the mobile node and the home mobile router of the mobile node update locally stored information according to the information included in the routing control request.

Seventh Aspect of Embodiments

Figure 27:
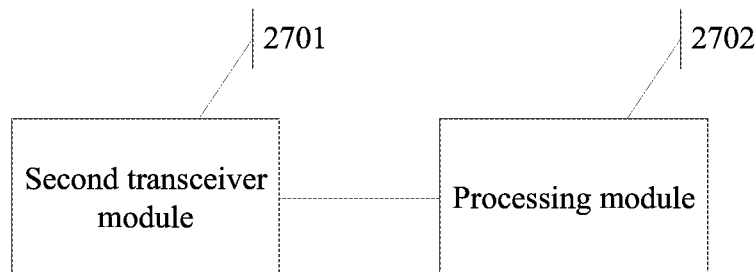
FIG. 27 is a structural diagram of a designated routing node according to an embodiment.

Referring to FIG. 27, an embodiment provides a network device, where the network device may be the designated routing node in the foregoing embodiments. The network device may include a second transceiver module 2701 and a processing module 2702.

The second transceiver module 2701 may be configured to receive a first data packet coming from a mobile router of a mobile node MN, where the first data packet is sent by the mobile router of the MN through a tunnel with the network device after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information, and send a first processed data packet to the mobile router of the MN, so that the mobile router of the MN sends the first processed data packet to a current mobile router of a destination node.

The processing module 2702 may be configured to process the first data packet to obtain the first processed data packet.

Preferably, in the embodiment, the second transceiver module 2701 may be further configured to receive the routing control policy information sent by the mobile router of the MN, where the routing control policy information includes the indication information indicating that routing control is enabled and the home address status information.

Preferably, in the embodiment, the network device further includes a second establishing module, which may be configured to establish the tunnel with the mobile router of the MN according to an establishment request sent by the mobile router of the MN.

Preferably, in the embodiment, the network device may further include a second releasing module, which may be configured to release a tunnel with a source mobile router after the MN moves from the source mobile router to a target mobile router.

Eighth Aspect of Embodiments

Figure 28:
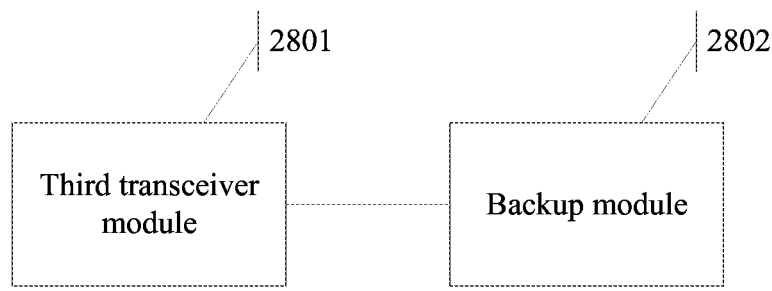
FIG. 28 is a structural diagram of a mobile router serving an MN according to an embodiment.

Referring to FIG. 28, an embodiment provides a mobile router, where the mobile router may be a mobile router of the MN. The mobile router may include a third transceiver module 2801 and a backup module 2802.

The third transceiver module 2801 may be configured to obtain a first data packet coming from a first home address and forwarded by a mobile node MN, and determine, according to routing control policy information, whether to enable routing control for the first data packet, where the routing control policy information includes indication information about whether routing control is enabled, and in a case in which the indication information indicates that routing control is enabled, the routing control policy information further includes home address status information, and send a backup first data packet to the designated routing node according to the home address status information in the routing policy, and send the first data packet to a current mobile router of a destination node through a tunnel with the current mobile router of the destination node, so that the current mobile router of the destination node sends the first data packet to the destination node.

The backup module 2802 may be configured to back up the first data packet if a determining result is yes.

Preferably, the embodiment is described from two perspectives, an IP (Internet Protocol) granularity and an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the perspective of the IP granularity, the routing control policy information further includes a home address of the MN, and the indication information includes status information of the MN. That the routing control policy information includes home address status information may be specifically that the indication information includes the home address status information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

That is, in this case, both enabling routing control and disabling routing control are intended for a certain IP address, and specifically, intended for a certain home address of the MN.

Preferably, in the embodiment, the MN has one or more home addresses.

Preferably, in the embodiment, when described from the perspective of the MN granularity, the indication information includes status information of the MN.

In this case, if the status information of the MN indicates that routing control is enabled, the indication information indicates that routing control is enabled for all data packets of the MN.

In this case, if the status information of the MN indicates that routing control is disabled, the indication information indicates that routing control is disabled for all data packets of the MN.

That is, in this case, both enabling routing control and disabling routing control are intended for the MN.

Preferably, in the embodiment, the third transceiver module 2801 may be specifically configured to determine whether the tunnel is established with the current mobile router of the destination node, and if the tunnel is established with the current mobile router of the destination node, send the first data packet to the current mobile router of the destination node through the tunnel with the current mobile router of the destination node, or if the tunnel is not established with the current mobile router of the destination node, establish the tunnel with the current mobile router of the destination node, and send the first data packet to the current mobile router of the destination node through the tunnel with the current mobile router of the destination node.

Preferably, in the embodiment, the third transceiver module 2801 may be further configured to receive a routing control request, where the routing control request includes the routing control policy information.

Preferably, in the embodiment, the third transceiver module 2801 may be further configured to forward the routing control request to a home location manager of the mobile node and a home mobile router of the mobile node, so that the home location manager of the mobile node and the home mobile router of the mobile node update locally stored information according to the information included in the routing control request.

Ninth Aspect of Embodiments

Figure 29:
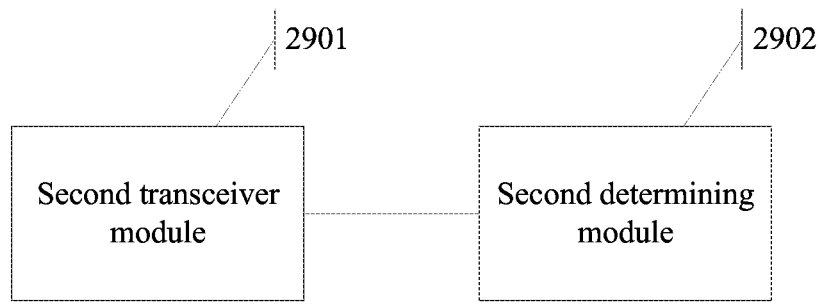
FIG. 29 is a structural diagram of a mobile router serving an MN according to an embodiment.

Referring to FIG. 29, an embodiment provides a mobile router, where the mobile router may be a mobile router of the MN. The mobile router may include a fourth transceiver module 2901 and a second determining module 2902.

The fourth transceiver module 2901 may be configured to obtain a first data packet coming from a first home address and forwarded by a mobile node MN, and if a determining result is yes, send the first data packet to the designated routing node through a tunnel with the designated routing node according to home address status information in the routing policy, so that the designated routing node sends a first processed data packet to a current mobile router of a destination node through a tunnel with the current mobile router of the destination node and that the current mobile router of the destination node sends the first processed data packet to the destination node, where the first processed data packet is obtained by the designated routing node by processing the first data packet.

The second determining module 2902 may be configured to determine, according to the routing control policy information, whether to enable routing control for the first data packet, where the routing control policy information includes indication information about whether routing control is enabled, and in a case in which the indication information indicates that routing control is enabled, the routing control policy information further includes the home address status information.

Preferably, the embodiment is described from two perspectives, an IP granularity and an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the perspective of the IP granularity, the routing control policy information further includes a home address of the MN, and the indication information includes status information of the MN. That the routing control policy information includes home address status information may be specifically that the indication information includes the home address status information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

That is, in this case, both enabling routing control and disabling routing control are intended for a certain IP address, and specifically, intended for a certain home address of the MN.

Preferably, in the embodiment, the MN has one or more home addresses.

Preferably, in the embodiment, when described from the perspective of the MN granularity, the indication information includes status information of the MN.

In this case, if the status information of the MN indicates that routing control is enabled, the indication information indicates that routing control is enabled for all data packets of the MN.

In this case, if the status information of the MN indicates that routing control is disabled, the indication information indicates that routing control is disabled for all data packets of the MN.

That is, in this case, both enabling routing control and disabling routing control are intended for the MN.

Preferably, in the embodiment, the fourth transceiver module 2901 may be specifically configured to detect whether the tunnel with the designated routing node exists, and when detecting that the tunnel with the designated routing node exists, send the first data packet to the designated routing node through the tunnel with the designated routing node, or when detecting that the tunnel with the designated routing node does not exist, establish the tunnel with the designated routing node, and send the first data packet to the designated routing node through the tunnel with the designated routing node.

Preferably, in the embodiment, the fourth transceiver module 2901 may be further configured to receive a routing control request, where the routing control request includes the routing control policy information.

Preferably, in the embodiment, the mobile router may further include a third establishing module, which may be configured to, if the indication information in the routing control policy information carried in the routing control request indicates that routing control is enabled, establish the tunnel with the designated routing node according to the home address status information in the routing control policy information carried in the routing control request.

Preferably, in the embodiment, the fourth transceiver module 2901 may be further configured to send a path switch instruction to the current mobile router of the destination node according to the indication information in the routing control policy information carried in the routing control request and an address of the current mobile router of the destination node, so that the current mobile router of the destination node establishes the tunnel between the current mobile router of the destination node and the designated routing node and that the current mobile router of the destination node releases a tunnel between the current mobile router of the destination node and a current mobile router of the mobile node.

Preferably, in the embodiment, the mobile router may further include a third releasing module, which may be configured to, if the indication information in the routing control policy information carried in the routing control request indicates that routing control is disabled, release the tunnel with the designated routing node.

Preferably, in the embodiment, the fourth transceiver module 2901 may be further configured to forward the routing control request to a home location manager of the mobile node and a home mobile router of the mobile node, so that the home location manager of the mobile node and the home mobile router of the mobile node update locally stored information according to the information included in the routing control request.

Preferably, in the embodiment, the fourth transceiver module 2901 may be further configured to, if the indication information in the routing control policy information carried in the routing control request indicates that routing control is disabled, request to obtain the address of the current mobile router of the destination node from a home location manager of the destination node, and send the path switch instruction to the current mobile router of the destination node, so that the current mobile router of the destination node establishes the tunnel between the current mobile router of the destination node and the current mobile router of the mobile node according to the path switch instruction.

Tenth Aspect of Embodiments

Figure 30:
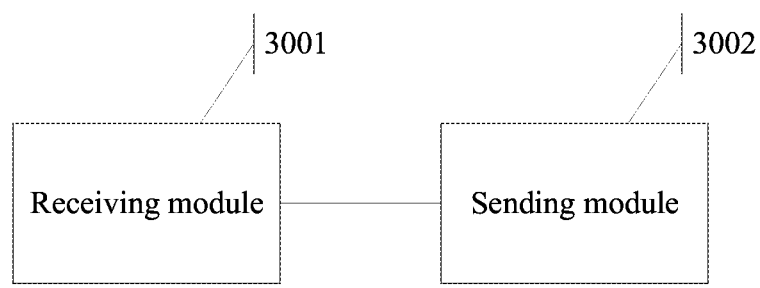
FIG. 30 is a structural diagram of a designated routing node according to an embodiment.

Referring to FIG. 30, an embodiment provides a network device, where the network device may be the designated routing node in the foregoing embodiments. The network device may include a receiving module 3601 and a sending module 3002.

The receiving module 3001 may be configured to receive a first data packet coming from a mobile router of a mobile node MN, where the first data packet is sent by the mobile router of the MN through a tunnel with the network device after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information.

The sending module 3002 may be configured to send a first processed data packet to a current mobile router of a destination node through a tunnel with the current mobile router of the destination node, where the first processed data packet is obtained by the network device by processing the first data packet.

Preferably, in the embodiment, the receiving module 3001 may be further configured to receive the routing control policy information sent by the mobile router of the MN, where the routing control policy information includes the indication information about whether routing control is enabled.

Preferably, in the embodiment, the network device may further include a fourth establishing module, which may be configured to, if the indication information in the routing control policy information indicates that routing control is enabled, establish the tunnel with the current mobile router of the destination node, and update the routing control policy information to the current mobile router of the destination node.

Preferably, in the embodiment, the network device may further include a fourth releasing module, which may be configured to, if the indication information in the routing control policy information indicates that routing control is disabled, release the tunnel with the current mobile router of the destination node.

Preferably, in the embodiment, the network device may further include the fourth releasing module, the fourth releasing module may be configured to release a tunnel with a source mobile router after the MN moves from the source mobile router to a target mobile router.

Eleventh Aspect of Embodiments

Figure 31:
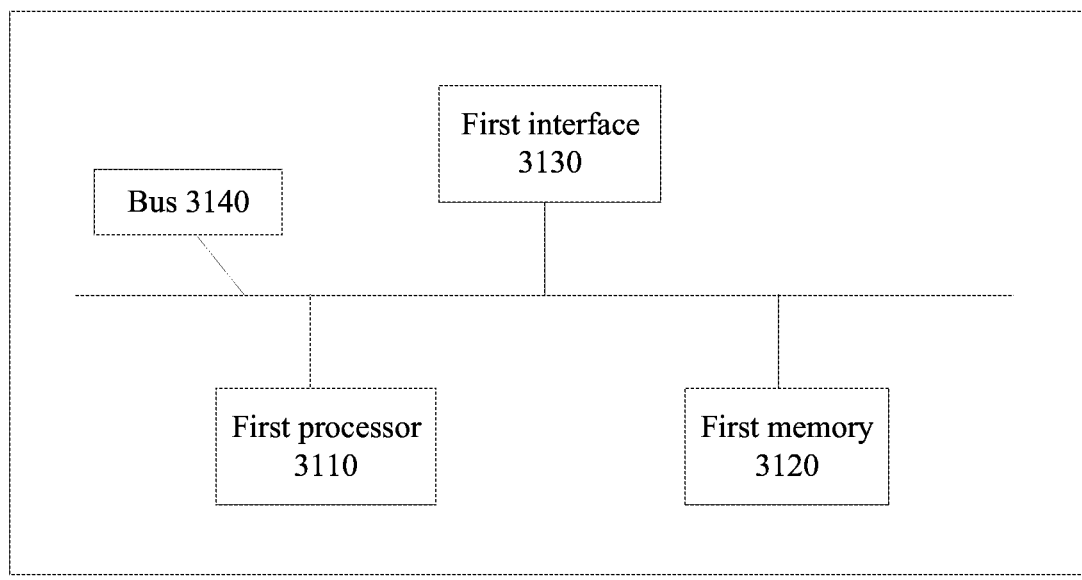
FIG. 31 is a schematic structural diagram of a mobile router serving an MN according to an embodiment.

Referring to FIG. 31, an embodiment provides a mobile router, where the mobile router may be a mobile router of the MN. The mobile router includes a bus 3140, and a first processor 3110, a first memory 3120, and a first interface 3130 that are connected to the bus 3140. The first memory 3120 is configured to store an instruction. The first interface 3130 is configured to obtain a first data packet coming from a first home address and forwarded by a mobile node MN, if a determining result is yes, send the first data packet to the designated routing node through a tunnel with the designated routing node according to home address status information in the routing policy information, and obtain a first processed data packet returned by the designated routing node, and send the first processed data packet to a current mobile router of a destination node, so that the current mobile router of the destination node sends the first processed data packet to the destination node, where the first processed data packet is obtained by the designated routing node by processing the first data packet. The first processor 3110 is configured to execute the instruction, and determine, according to the routing control policy information, whether to enable routing control for the first data packet, where the routing control policy information includes indication information about whether routing control is enabled, and in a case in which the indication information indicates that routing control is enabled, the routing control policy information further includes the home address status information.

Preferably, the embodiment is described from two perspectives, an IP (Internet Protocol) granularity and an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the perspective of the IP granularity, the routing control policy information further includes a home address of the MN, and the indication information includes status information of the MN. That the routing control policy information includes home address status information may be specifically that the indication information includes the home address status information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

That is, in this case, both enabling routing control and disabling routing control are intended for a certain IP address, and specifically, intended for a certain home address of the MN.

Preferably, in the embodiment, the MN has one or more home addresses.

Preferably, in the embodiment, when described from the perspective of the MN granularity, the indication information includes status information of the MN.

In this case, if the status information of the MN indicates that routing control is enabled, the indication information indicates that routing control is enabled for all data packets of the MN.

In this case, if the status information of the MN indicates that routing control is disabled, the indication information indicates that routing control is disabled for all data packets of the MN.

That is, in this case, both enabling routing control and disabling routing control are intended for the MN.

Preferably, in the embodiment, the first processor 3110 is specifically configured to execute the instruction, detect whether the tunnel with the designated routing node exists, and when detecting that the tunnel with the designated routing node does not exist, establish the tunnel with the designated routing node. The first interface 3130 is specifically configured to send the first data packet to the designated routing node through the tunnel with the designated routing node.

Preferably, in the embodiment, the first processor 3110 is specifically configured to execute the instruction, determine whether the tunnel with the current mobile router of the destination node is established, and if the tunnel with the current mobile router of the destination node is not established, establish the tunnel with the current mobile router of the destination node. The first interface 3130 is specifically configured to send the first processed data packet to the current mobile router of the destination node through the tunnel with the current mobile router of the destination node when the tunnel is established with the current mobile router of the destination node, or send the first processed data packet to the current mobile router of the destination node through the tunnel established with the current mobile router of the destination node.

Preferably, in the embodiment, the first interface 3130 is further configured to receive a routing control request, where the routing control request includes the routing control policy information.

Preferably, in the embodiment, the first processor 3110 is further configured to execute the instruction, and if the indication information in the routing control policy information carried in the routing control request indicates that routing control is enabled, establish the tunnel with the designated routing node according to the home address status information in the routing control policy information carried in the routing control request.

Preferably, in the embodiment, the first processor 3110 is specifically configured to execute the instruction, and if the indication information in the routing control policy information carried in the routing control request indicates that routing control is disabled, release the tunnel with the designated routing node.

Preferably, in the embodiment, the first interface 3130 is further configured to forward the routing control request to a home location manager of the mobile node and a home mobile router of the mobile node, so that the home location manager of the mobile node and the home mobile router of the mobile node update locally stored information according to the information included in the routing control request.

Twelfth Aspect of Embodiments

Figure 32:
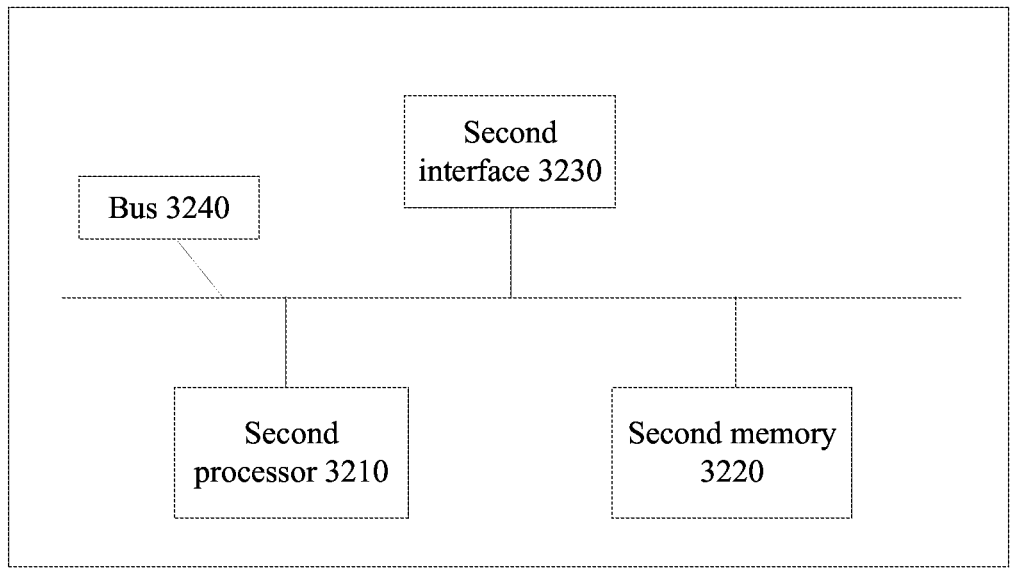
FIG. 32 is a schematic structural diagram of a designated routing node according to an embodiment.

Referring to FIG. 32, an embodiment of provides a network device, where the network device may be the designated routing node in the foregoing embodiments. The network device may include a bus 3240, and a second processor 3210, a second memory 3220, and a second interface 3230 that are connected to the bus 3240. The second memory 3220 is configured to store an instruction. The second interface 3230 is configured to receive a first data packet coming from a mobile router of a mobile node MN, where the first data packet is sent by the mobile router of the MN through a tunnel with the network device after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information, and send a first processed data packet to the mobile router of the MN, so that the mobile router of the MN sends the first processed data packet to a current mobile router of a destination node, where the first processed data packet is obtained by the network device by processing the first data packet. The second processor 3210 is configured to execute the instruction, and process the first data packet to obtain the first processed data packet.

Preferably, in the embodiment, the second interface 3230 is further configured to receive the routing control policy information sent by the mobile router of the MN, where the routing control policy information includes the indication information indicating that routing control is enabled and the home address status information.

Preferably, in the embodiment, the second processor 3210 is further configured to execute the instruction, and establish the tunnel with the mobile router of the MN according to an establishment request sent by the mobile router of the MN.

Preferably, in the embodiment, the second processor 3210 is further configured to execute the instruction, and after the MN moves from a source mobile router to a target mobile router, release a tunnel with the source mobile router.

Thirteenth Aspect of Embodiments

Figure 33:
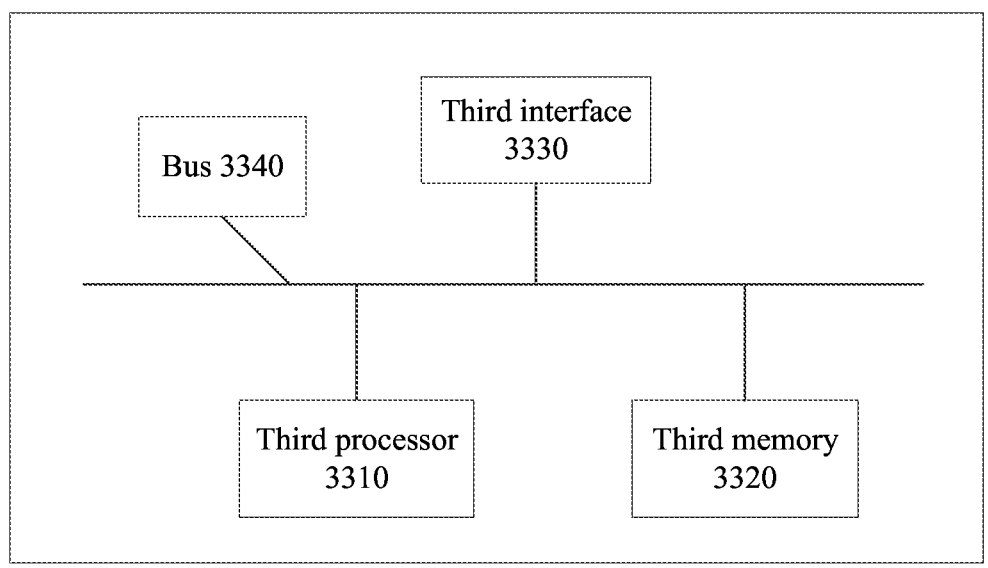
FIG. 33 is a schematic structural diagram of a mobile router serving an MN according to an embodiment.

Referring to FIG. 33, an embodiment provides a mobile router, where the mobile router may be a mobile router of the MN. The mobile router may include a bus 3340, and a third processor 3310, a third memory 3320, and a third interface 3330 that are connected to the bus 3340. The third memory 3320 is configured to store an instruction. The third interface 3330 is configured to obtain a first data packet coming from a first home address and forwarded by a mobile node MN, and determine, according to routing control policy information, whether to enable routing control for the first data packet, where the routing control policy information includes indication information about whether routing control is enabled, and in a case in which the indication information indicates that routing control is enabled, the routing control policy information further includes home address status information, and send a backup first data packet to the designated routing node according to the home address status information in the routing policy, and send the first data packet to a current mobile router of a destination node through a tunnel with the current mobile router of the destination node, so that the current mobile router of the destination node sends the first data packet to the destination node. The third processor 3310 is configured to execute the instruction, and if a determining result is yes, back up the first data packet.

Preferably, the embodiment is described from two perspectives, an IP (Internet Protocol) granularity and an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the perspective of the IP granularity, the routing control policy information further includes a home address of the MN, and the indication information includes status information of the MN. That the routing control policy information includes home address status information may be specifically that the indication information includes the home address status information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

That is, in this case, both enabling routing control and disabling routing control are intended for a certain IP address, and specifically, intended for a certain home address of the MN.

Preferably, in the embodiment, the MN has one or more home addresses.

Preferably, in the embodiment, when described from the perspective of the MN granularity, the indication information includes status information of the MN.

In this case, if the status information of the MN indicates that routing control is enabled, the indication information indicates that routing control is enabled for all data packets of the MN.

In this case, if the status information of the MN indicates that routing control is disabled, the indication information indicates that routing control is disabled for all data packets of the MN.

That is, in this case, both enabling routing control and disabling routing control are intended for the MN.

Preferably, in the embodiment, the third processor 3310 is specifically configured to execute the instruction, determine whether the tunnel is established with the current mobile router of the destination node, and if the tunnel is not established with the current mobile router of the destination node, establish the tunnel with the current mobile router of the destination node. The third interface 3330 is specifically configured to send the first data packet to the current mobile router of the destination node through the tunnel with the current mobile router of the destination node.

Preferably, in the embodiment, the third interface 3330 is further configured to receive a routing control request, where the routing control request includes the routing control policy information.

Preferably, in the embodiment, the third interface 3330 is specifically configured to forward the routing control request to a home location manager of the mobile node and a home mobile router of the mobile node, so that the home location manager of the mobile node and the home mobile router of the mobile node update locally stored information according to the information included in the routing control request.

Fourteenth Aspect of Embodiments

Figure 34:
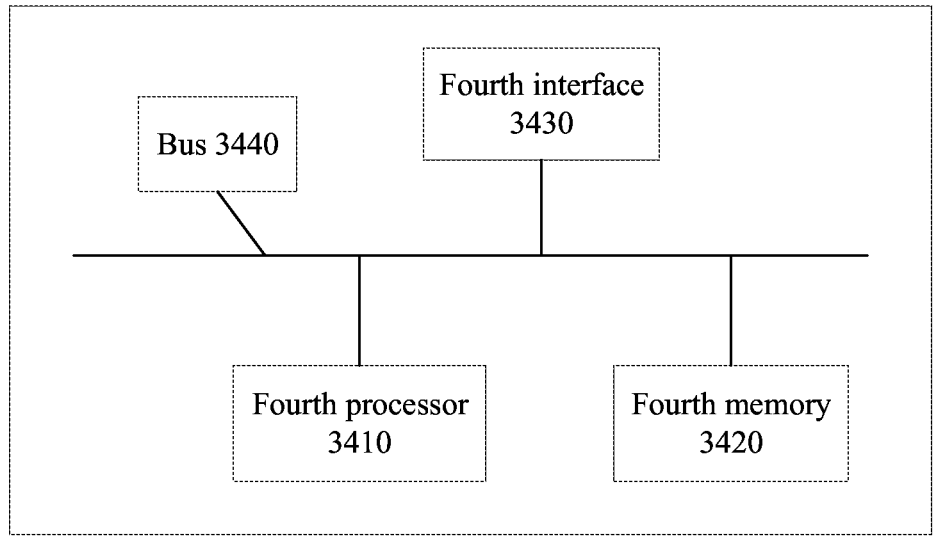
FIG. 34 is a schematic structural diagram of a mobile router serving an MN according to an embodiment.

Referring to FIG. 34, an embodiment provides a mobile router, where the mobile router may be a mobile router of the MN. The mobile router includes a bus 3440, and a fourth processor 3410, a fourth memory 3420, and a fourth interface 3430 that are connected to the bus 3440. The fourth memory 3420 is configured to store an instruction. The fourth interface 3430 is configured to obtain a first data packet coming from a first home address and forwarded by a mobile node MN, and if a determining result is yes, send the first data packet to the designated routing node through a tunnel with the designated routing node according to home address status information in the routing policy, so that the designated routing node sends a first processed data packet to a current mobile router of a destination node through a tunnel with the current mobile router of the destination node and that the current mobile router of the destination node sends the first processed data packet to the destination node, where the first processed data packet is obtained by the designated routing node by processing the first data packet. The fourth processor 3410 is configured to execute the instruction, and determine, according to the routing control policy information, whether to enable routing control for the first data packet, where the routing control policy information includes indication information about whether routing control is enabled, and in a case in which the indication information indicates that routing control is enabled, the routing control policy information further includes the home address status information.

Preferably, the embodiment is described from two perspectives, an IP (Internet Protocol) granularity and an MN granularity. When described from the IP granularity, that routing control is enabled indicates that routing control is enabled for a data packet containing a designated home address of the MN, and that routing control is disabled indicates that routing control is disabled for a designated home address of the MN. When described from the MN granularity, that routing control is enabled indicates that routing control is enabled for all data packets of the MN, and that routing control is disabled indicates that routing control is disabled for all data packets of the MN.

Preferably, in the embodiment, when described from the perspective of the IP granularity, the routing control policy information further includes a home address of the MN, and the indication information includes status information of the MN. That the routing control policy information includes home address status information may be specifically that the indication information includes the home address status information.

If the status information of the MN indicates that routing control is enabled, and the home address status information indicates that routing control is enabled, the indication information indicates that routing control is enabled for a data packet containing the corresponding home address of the MN.

That is, if the status information of the MN indicates that routing control is enabled, and the home address status information indicates that routing control is enabled for the first home address, the indication information indicates that routing control is enabled for a data packet containing the first home address of the MN, where the first home address is one of home addresses of the MN in the routing control policy information.

If the status information of the MN indicates that routing control is enabled, and the home address status information indicates that routing control is disabled, the indication information indicates that routing control is disabled for a data packet containing the corresponding home address of the MN.

That is, if the status information of the MN indicates that routing control is enabled, and the home address status information indicates that routing control is disabled for a second home address, the indication information indicates that routing control is disabled for a data packet containing the second home address of the MN, where the second home address is one of home addresses of the MN in the routing control policy information.

That is, in this case, both enabling routing control and disabling routing control are intended for a certain IP address, and specifically, intended for a certain home address of the MN.

Preferably, in the embodiment, the MN has one or more home addresses.

Preferably, in the embodiment, when described from the perspective of the MN granularity, the indication information includes status information of the MN.

In this case, if the status information of the MN indicates that routing control is enabled, the indication information indicates that routing control is enabled for all data packets of the MN.

In this case, if the status information of the MN indicates that routing control is disabled, the indication information indicates that routing control is disabled for all data packets of the MN.

That is, in this case, both enabling routing control and disabling routing control are intended for the MN.

Preferably, in the embodiment, the fourth processor 3410 is specifically configured to execute the instruction, detect whether the tunnel with the designated routing node exists, and when detecting that the tunnel with the designated routing node does not exist, establish the tunnel with the designated routing node. The fourth interface 3430 is specifically configured to send the first data packet to the designated routing node through the tunnel with the designated routing node when the tunnel is established with the designated routing node, or send the first data packet to the designated routing node through the tunnel established with the designated routing node.

Preferably, in the embodiment, the fourth interface 3430 is further configured to receive a routing control request, where the routing control request includes the routing control policy information.

Preferably, in the embodiment, the fourth processor 3410 is further configured to execute the instruction, and if the indication information in the routing control policy information carried in the routing control request indicates that routing control is enabled, establish the tunnel with the designated routing node according to the home address status information in the routing control policy information carried in the routing control request.

Preferably, in the embodiment, the fourth interface 3430 is further configured to send a path switch instruction to the current mobile router of the destination node according to the indication information in the routing control policy information carried in the routing control request and an address of the current mobile router of the destination node, so that the current mobile router of the destination node establishes the tunnel between the current mobile router of the destination node and the designated routing node and that the current mobile router of the destination node releases a tunnel between the current mobile router of the destination node and a current mobile router of the mobile node.

Preferably, in the embodiment, the fourth processor 3410 is further configured to execute the instruction, and if the indication information in the routing control policy information carried in the routing control request indicates that routing control is disabled, release the tunnel with the designated routing node.

Preferably, in the embodiment, the fourth interface 3430 is further configured to forward the routing control request to a home location manager of the mobile node and a home mobile router of the mobile node, so that the home location manager of the mobile node and the home mobile router of the mobile node update locally stored information according to the information included in the routing control request.

Preferably, in the embodiment, the fourth interface 3430 is further configured to, if the indication information in the routing control policy information carried in the routing control request indicates that routing control is disabled, request to obtain the address of the current mobile router of the destination node from a home location manager of the destination node, and send the path switch instruction to the current mobile router of the destination node, so that the current mobile router of the destination node establishes the tunnel between the current mobile router of the destination node and the current mobile router of the mobile node according to the path switch instruction.

Fifteenth Aspect of Embodiments

Figure 35:
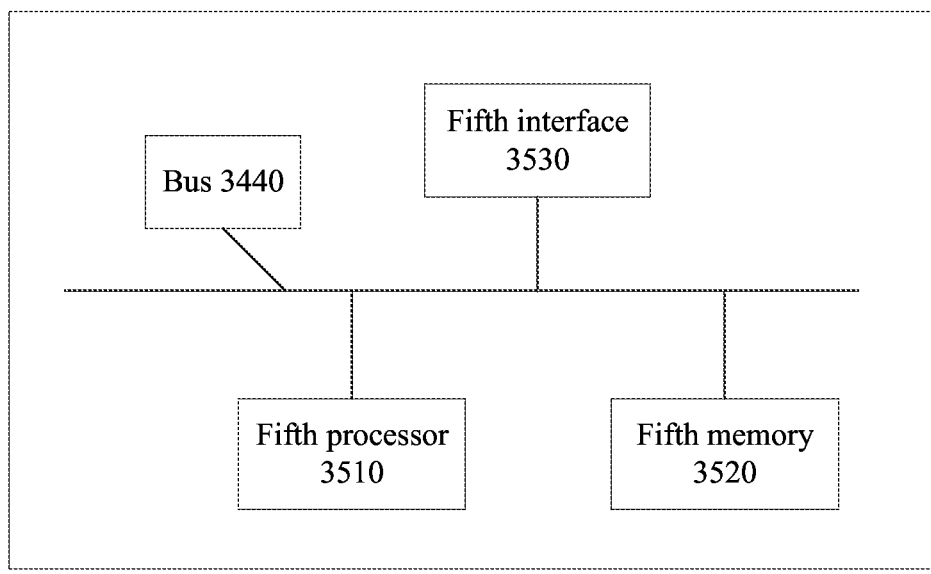
FIG. 35 is a schematic structural diagram of a designated routing node according to an embodiment.

Referring to FIG. 35, an embodiment provides a network device, where the network device may be the designated routing node in the foregoing embodiments. The network device may include a bus 3540, and a fifth processor 3510, a fifth memory 3520, and a fifth interface 3530 that are connected to the bus 3540. The fourth memory 3520 is configured to store an instruction. The fifth interface 3530 is configured to receive a first data packet coming from a mobile router of a mobile node MN, where the first data packet is sent by the mobile router of the MN through a tunnel with the network device after the mobile router of the MN determines, according to routing control policy information, to enable routing control for the first data packet, where the routing control policy information includes indication information about whether routing control is enabled, and in a case in which the indication information indicates that routing control is enabled, the routing control policy information further includes home address status information. The fifth processor 3510 is configured to execute the instruction, and control the fifth interface 3530 to send a first processed data packet to a current mobile router of a destination node through a tunnel with the current mobile router of the destination node, where the first processed data packet is obtained by the network device by processing the first data packet.

Preferably, in the embodiment, the fifth interface 3530 is further configured to receive the routing control policy information sent by the mobile router of the MN, where the routing control policy information includes the indication information about whether routing control is enabled.

Preferably, in the embodiment, the fifth processor 3510 is further configured to execute the instruction, and if the indication information in the routing control policy information indicates that routing control is enabled, establish the tunnel with the current mobile router of the destination node, and update the routing control policy information to the current mobile router of the destination node.

Preferably, in the embodiment, the fifth processor 3510 is further configured to execute the instruction, and if the indication information in the routing control policy information indicates that routing control is disabled, release the tunnel with the current mobile router of the destination node.

Preferably, in the embodiment, the fifth processor 3510 is further configured to execute the instruction, and after the MN moves from a source mobile router to a target mobile router, release a tunnel with the source mobile router.

A data packet sending method in an embodiment may be applied to a mobile router. The method may include obtaining a first data packet coming from a first home address and forwarded by a mobile node MN, and determining, according to routing control policy information, whether to enable routing control for the first data packet, where the routing control policy information includes indication information about whether routing control is enabled, and in a case in which the indication information indicates that routing control is enabled, the routing control policy information further includes home address status information, if a determining result is yes, sending the first data packet to a designated routing node through a tunnel with the designated routing node according to the home address status information in the routing policy information, and obtaining a first processed data packet returned by the designated routing node, and sending the first processed data packet to a current mobile router of a destination node, so that the current mobile router of the destination node sends the first processed data packet to the destination node, where the first processed data packet is obtained by the designated routing node by processing the first data packet.

In the embodiment, the routing control policy information is included, where the routing control policy information may be used to indicate whether routing control is enabled, after the data packet coming from the first home address and forwarded by the MN is obtained, if it is determined to enable routing control, first, the first data packet may be sent to the designated routing node according to the home address status information included in the routing control policy information, and then the first processed data packet processed by the designated routing node is sent to the destination node. In this way, the first data packet may pass through a designated network node in a sending process, and the designated network node may perform some processing on the first data packet, which solves a technical problem in the prior art that data cannot arrive at a designated network node in a sending process. In addition, after the method in the embodiment is used, the first data packet directly arrives at the designated network node, and after being processed, is then directly sent to the destination node. This is still equivalent to route optimization, unlike the prior art in which multiple nodes are generally passed through without route optimization. The path that the first data packet passes through is relatively optimized, and during transmission, an error probability is relatively low.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely used to describe in detail the technical solutions of the present application. The descriptions of the foregoing embodiments are merely intended to help understand the method and core idea of embodiments, and shall not be construed as a limitation to the present invention. Any variation or replacement readily figured out by a person skilled in the art within the technical scope disclosed in embodiments shall fall within the protection scope of the present invention.

What is claimed is:

1. A method, comprising:
   obtaining, by a mobile router of a mobile node (MN), a first data packet from a first home address and sent by the MN;
   determining, by the mobile router of the MN according to routing control policy information, to enable routing control for the first data packet, wherein the routing control policy information comprises indication information indicating that routing control is enabled, and further comprises home address status information, wherein the home address status information comprises address information of a designated routing node, and wherein the indication information indicates that routing control is enabled for data packets containing the first home address of the MN when status information of the MN indicates that routing control is enabled and the home address status information indicates that routing control is enabled;
   sending, by the mobile router of the MN, the first data packet to the designated routing node according to the home address status information in the routing control policy information;
   sending, by the designated routing node, the first data packet to a mobile router of a destination node through a tunnel between the designated routing node and the mobile router of the destination node; and
   sending, by the mobile router of the destination node, the first data packet to the destination node.

2. The method according to claim 1, wherein the indication information indicating that routing control is enabled indicates that routing control is enabled for a data packet containing a designated home address of the MN.

3. The method according to claim 2, wherein:
   the routing control policy information further comprises a home address of the MN; and
   the indication information comprises the status information of the MN.

4. The method according to claim 2, wherein:
   the indication information comprises the status information of the MN; and
   the indication information indicates that routing control is enabled for all data packets of the MN, when the status information of the MN indicates that routing control is enabled.

5. The method according to claim 1, wherein the indication information indicating that routing control is enabled indicates that routing control is enabled for all data packets of the MN.

6. The method according to claim 5, wherein:
   the routing control policy information further comprises a home address of the MN; and
   the indication information comprises the status information of the MN.

7. The method according to claim 5, wherein:
   the indication information comprises the status information of the MN; and
   the indication information indicates that routing control is enabled for all data packets of the MN, when the status information of the MN indicates that routing control is enabled.

8. The method according to claim 1, wherein sending the first data packet to the mobile router of the destination node comprises:
   determining whether the tunnel is established between the designated routing node and the mobile router of the destination node; and
   establishing, based on determining that the tunnel is not established, the tunnel between the designated routing node and the mobile router of the destination node.

9. A mobile router, comprising:
   an interface;
   a processor; and
   a non-transitory computer-readable storage medium storing a program to be executed by the processor, the program including instructions to:
      obtain, using the interface, a first data packet from a first home address and sent by a mobile node (MN);
      determine, according to routing control policy information, to enable routing control for the first data packet, wherein the routing control policy information comprises indication information indicating that routing control is enabled, and further comprises home address status information, wherein the home address status information comprises address information of a designated routing node, and wherein the indication information indicates that routing control is enabled for data packets containing the first home address of the MN when status information of the MN indicates that routing control is enabled and the home address status information indicates that routing control is enabled; and
      send, using the interface, the first data packet to the designated routing node according to the home address status information in the routing control policy information, causing the designated routing node to send the first data packet to a mobile router of a destination node through a tunnel between the designated routing node and the mobile router of the destination node, and further causing the mobile router of the destination node to send the first data packet to the destination node.

10. The mobile router according to claim 9, wherein the indication information indicating that routing control is enabled indicates that routing control is enabled for a data packet containing a designated home address of the MN.

11. The mobile router according to claim 10, wherein:
   the routing control policy information further comprises a home address of the MN; and
   the indication information comprises the status information of the MN.

12. The mobile router according to claim 10, wherein:
   the indication information comprises the status information of the MN; and
   the indication information indicates that routing control is enabled for all data packets of the MN, when the status information of the MN indicates that routing control is enabled.

13. The mobile router according to claim 9, wherein the indication information indicating that routing control is enabled indicates that routing control is enabled for all data packets of the MN.

14. The mobile router according to claim 13, wherein:
wherein the routing control policy information further comprises a home address of the MN; and
the indication information comprises the status information of the MN.

15. The mobile router according to claim 13, wherein:
the indication information comprises the status information of the MN; and
the indication information indicates that routing control is enabled for all data packets of the MN, when the status information of the MN indicates that routing control is enabled.

16. The mobile router according to claim 9, wherein the program further includes instructions to:
determine whether the tunnel is established between the designated routing node and the mobile router of the destination node; and
establish, based on determining that the tunnel is not established, the tunnel between the designated routing node and the mobile router of the destination node.

17. A system, comprising:
a mobile router of a mobile node (MN);
a designated routing node; and
a mobile router of a destination node;
wherein the mobile router of the MN is configured to:
obtain a first data packet from a first home address and sent by the MN;
determine, according to routing control policy information, to enable routing control for the first data packet, wherein the routing control policy information comprises indication information indicating that routing control is enabled, and further comprises home address status information, wherein the home address status information comprises address information of the designated routing node, and wherein the indication information indicates that routing control is enabled for data packets containing the first home address of the MN when status information of the MN indicates that routing control is enabled and the home address status information indicates that routing control is enabled; and
send the first data packet to the designated routing node according to the home address status information in the routing control policy information;
wherein the designated routing node is configured to send the first data packet to the mobile router of the destination node through a tunnel between the designated routing node and the mobile router of the destination node; and
wherein the mobile router of the destination node is configured to send the first data packet to the destination node.

18. The system according to claim 17, wherein:
the indication information indicating that routing control is enabled indicates that routing control is enabled for a data packet containing a designated home address of the MN;
the routing control policy information further comprises a home address of the MN; and
the indication information comprises the status information of the MN.

19. The system according to claim 17, wherein:
the indication information indicating that routing control is enabled indicates that routing control is enabled for all data packets of the MN;
the routing control policy information further comprises a home address of the MN; and
the indication information comprises the status information of the MN.

20. The system according to claim 17, wherein the mobile router of the MN is further configured to:
receive a routing control request, wherein the routing control request comprises the routing control policy information; and
forward the routing control request to a home location manager of the MN and a home mobile router of the MN, causing the home location manager of the MN and the home mobile router of the MN to update locally stored information according to information comprised in the routing control request.

* * * * *